US012725365B2

(12) United States Patent
Cerra et al.

(10) Patent No.: US 12,725,365 B2
(45) Date of Patent: Sep. 1, 2026

(54) SKELETAL DATA TRACKING OF PARTICIPANTS IN MULTI-USER COMMUNICATION SESSIONS

(71) Applicant: Apple Inc., Cupertino, CA (US)

(72) Inventors: Joseph P. Cerra, San Francisco, CA (US); Frank Olivier, San Francisco, CA (US); Patrick Piemonte, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 19/083,245

(22) Filed: Mar. 18, 2025

(65) Prior Publication Data

US 2025/0336156 A1 Oct. 30, 2025

Related U.S. Application Data

(60) Provisional application No. 63/758,960, filed on Feb. 14, 2025, provisional application No. 63/640,792, filed on Apr. 30, 2024.

(51) Int. Cl.

| | |
|---|---|
| ***G06T 19/00*** | (2011.01) |
| ***G06F 3/01*** | (2006.01) |
| ***G06F 3/14*** | (2006.01) |
| ***G06T 7/70*** | (2017.01) |
| ***G06T 15/20*** | (2011.01) |

(52) U.S. Cl.

CPC .............. *G06T 19/00* (2013.01); *G06F 3/012* (2013.01); *G06F 3/1454* (2013.01); *G06T 7/70* (2017.01); *G06T 15/20* (2013.01); *G06T 2200/24* (2013.01); *G06T 2207/30196* (2013.01); *G06T 2219/024* (2013.01)

(58) Field of Classification Search

None

See application file for complete search history.

(56) References Cited

U.S. PATENT DOCUMENTS

| | | | | |
|---|---|---|---|---|
| 2018/0321894 | A1* | 11/2018 | Paulovich | G06F 3/1454 |
| 2021/0241529 | A1 | 8/2021 | Cowburn et al. | |
| 2021/0272373 | A1 | 9/2021 | Fradet et al. | |
| 2021/0350612 | A1 | 11/2021 | Emami et al. | |

(Continued)

FOREIGN PATENT DOCUMENTS

| | | | | |
|---|---|---|---|---|
| CN | 116668659 A * | 8/2023 | | H04N 13/117 |
| WO | 2019/243160 A1 | 12/2019 | | |
| WO | WO-2022056079 A1 * | 3/2022 | | G06F 3/011 |

*Primary Examiner* — Duane N Taylor, Jr.

(74) *Attorney, Agent, or Firm* — Kubota & Basol LLP

(57) ABSTRACT

Some examples of the disclosure are directed to systems and methods for displaying a virtual object within a multi-user communication session based on skeletal data associated with one or more participants in the multi-user communication session. Some examples of the disclosure are directed to systems and methods for displaying a visual indication of a participant within a multi-user communication session based on skeletal data associated with the participant in the multi-user communication session. In some examples, while a first electronic device is in a communication session with a second electronic device that is collocated with the first electronic device in a physical environment, the first electronic device receives first data provided by the second electronic device that includes skeletal data associated with a user of the second electronic device.

24 Claims, 27 Drawing Sheets

(56) References Cited

U.S. PATENT DOCUMENTS

| | | | |
|---|---|---|---|
| 2022/0230399 A1* | 7/2022 | Evangelista | ............ G06T 15/20 |
| 2024/0310971 A1 | 9/2024 | Kawashima et al. | |
| 2025/0111633 A1 | 4/2025 | Robert et al. | |

* cited by examiner

SKELETAL DATA TRACKING OF PARTICIPANTS IN MULTI-USER COMMUNICATION SESSIONS

CROSS-REFERENCE TO RELATED APPLICATIONS

This application claims the benefit of U.S. Provisional Application No. 63/758,960, filed Feb. 14, 2025, and U.S. Provisional Application No. 63/640,792, filed Apr. 30, 2024, the contents of which are herein incorporated by reference in their entireties for all purposes.

FIELD OF THE DISCLOSURE

This relates generally to systems and methods of tracking skeletal data of participants in multi-user communication sessions who are collocated in a same physical environment and facilitating interactions based on the skeletal data.

BACKGROUND OF THE DISCLOSURE

Some computer graphical environments provide two-dimensional and/or three-dimensional environments where at least some objects displayed for a user's viewing are virtual and generated by a computer. In some examples, the three-dimensional environments are presented by multiple devices communicating in a multi-user communication session. In some examples, an avatar (e.g., a representation) of each non-collocated user participating in the multi-user communication session (e.g., via the computing devices) is displayed in the three-dimensional environment of the multi-user communication session. In some examples, content can be shared in the three-dimensional environment for viewing and interaction by multiple users participating in the multi-user communication session.

SUMMARY OF THE DISCLOSURE

Some examples of the disclosure are directed to systems and methods for displaying a virtual object within a multi-user communication session based on skeletal data associated with one or more participants in the multi-user communication session. In some examples, a method is performed at a first electronic device in communication with one or more displays and one or more input devices, wherein the first electronic device is collocated with a second electronic device in a first physical environment. In some examples, while the first electronic device is in a communication session with the second electronic device, the first electronic device receives first data provided by the second electronic device that includes skeletal data associated with a user of the second electronic device. In some examples, after receiving the first data, the first electronic device detects an indication of a request to share content in a three-dimensional environment. In some examples, in response to detecting the indication, the first electronic device presents, via the one or more displays, a first object corresponding to the shared content in the three-dimensional environment. In some examples, while presenting the first object corresponding to the shared content, the first electronic device detects a change in one or more spatial properties between the user of the second electronic device and the first object in the three-dimensional environment. In some examples, in response to detecting the change in the one or more spatial properties between the user of the second electronic device and the first object, the first electronic device updates display, via the one or more displays, of a visual appearance of the first object in accordance with the change in the one or more spatial properties and based on the first data.

Some examples of the disclosure are directed to systems and methods for displaying a visual indication of a participant within a multi-user communication session based on skeletal data associated with the participant in the multi-user communication session. In some examples, a method is performed at a first electronic device in communication with one or more displays and one or more input devices, wherein the first electronic device is collocated with a second electronic device in a first physical environment. In some examples, while the first electronic device is in a communication session with the second electronic device, the first electronic device receives first data provided by the second electronic device that includes skeletal data associated with a user of the second electronic device. In some examples, after receiving the first data, the first electronic device detects movement of the user of the second electronic device in the first physical environment. In some examples, in response to detecting the movement of the user of the second electronic device, in accordance with a determination that the movement of the user of the second electronic device causes at least a portion of the user of the second electronic device to be occluded by at least a portion of the first physical environment relative to a viewpoint of the first electronic device, the first electronic device displays, via the one or more displays, a visual indication corresponding to the at least the portion of the user of the second electronic device at a location in the three-dimensional environment corresponding to the at least the portion of the first physical environment based on the first data.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIGS. 4A-1 through 4I illustrate example interactions with virtual content based on skeletal data associated with participants in a multi-user communication session according to some examples of the disclosure.

FIGS. 5A-1 through 5G illustrate example interactions with virtual content based on skeletal data associated with participants in a multi-user communication session according to some examples of the disclosure.

DETAILED DESCRIPTION

Figure 1:
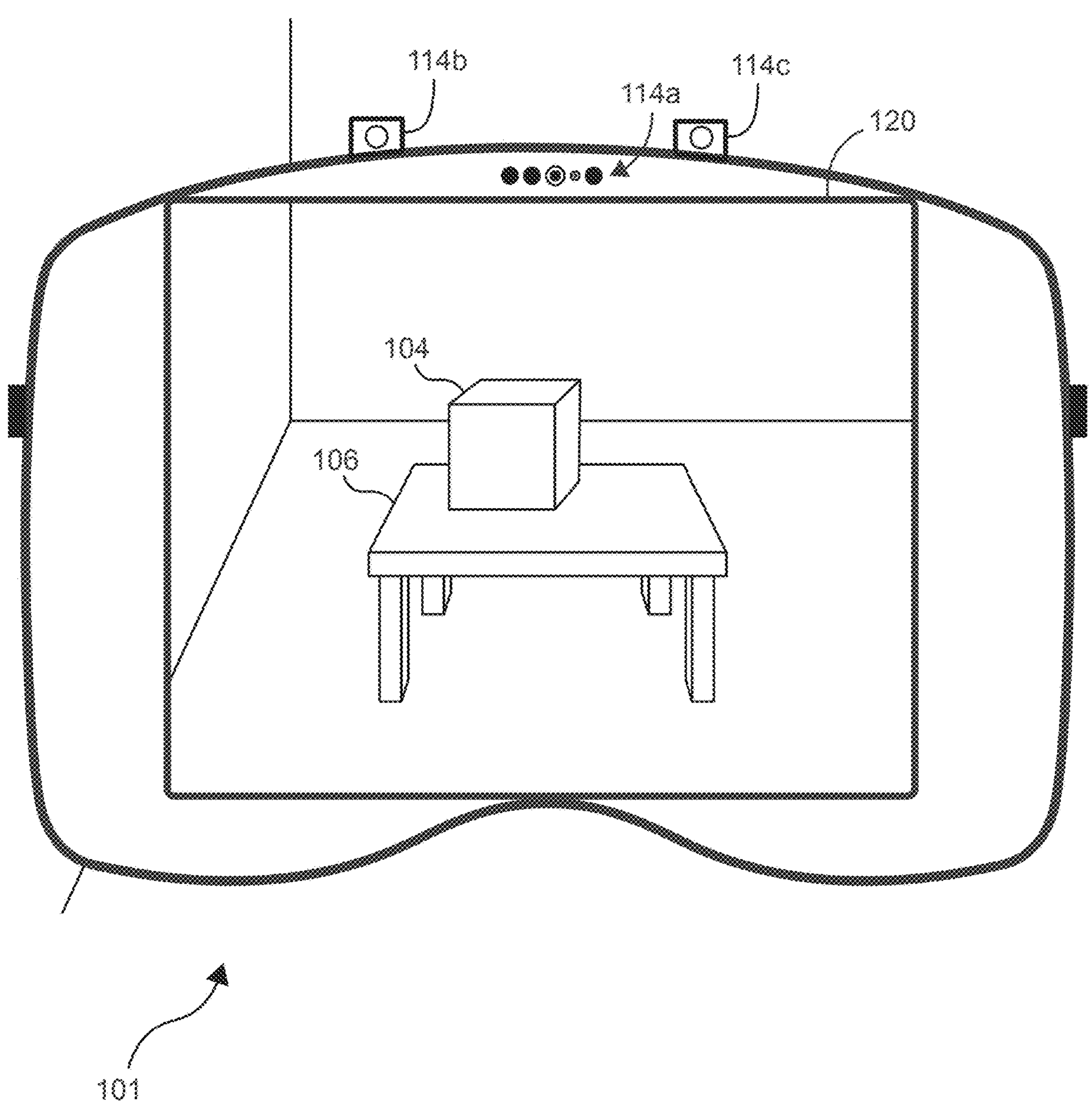
FIG. 1 illustrates an electronic device presenting an extended reality environment according to some examples of the disclosure.

Some examples of the disclosure are directed to systems and methods for displaying a virtual object within a multi-user communication session based on skeletal data associated with one or more participants in the multi-user communication session. In some examples, a method is performed at a first electronic device in communication with one or more displays and one or more input devices, wherein the first electronic device is collocated with a second electronic device in a first physical environment. In some examples, while the first electronic device is in a communication session with the second electronic device, the first electronic device receives first data provided by the second electronic device that includes skeletal data associated with a user of the second electronic device. In some examples, after receiving the first data, the first electronic device detects an indication of a request to share content in a three-dimensional environment. In some examples, in response to detecting the indication, the first electronic device presents, via the one or more displays, a first object corresponding to the shared content in the three-dimensional environment. In some examples, while presenting the first object corresponding to the shared content, the first electronic device detects a change in one or more spatial properties between the user of the second electronic device and the first object in the three-dimensional environment. In some examples, in response to detecting the change in the one or more spatial properties between the user of the second electronic device and the first object, the first electronic device updates display, via the one or more displays, of a visual appearance of the first object in accordance with the change in the one or more spatial properties and based on the first data.

Some examples of the disclosure are directed to systems and methods for displaying a visual indication of a participant within a multi-user communication session based on skeletal data associated with the participant in the multi-user communication session. In some examples, a method is performed at a first electronic device in communication with one or more displays and one or more input devices, wherein the first electronic device is collocated with a second electronic device in a first physical environment. In some examples, while the first electronic device is in a communication session with the second electronic device, the first electronic device receives first data provided by the second electronic device that includes skeletal data associated with a user of the second electronic device. In some examples, after receiving the first data, the first electronic device detects movement of the user of the second electronic device in the first physical environment. In some examples, in response to detecting the movement of the user of the second electronic device, in accordance with a determination that the movement of the user of the second electronic device causes at least a portion of the user of the second electronic device to be occluded by at least a portion of the first physical environment relative to a viewpoint of the first electronic device, the first electronic device displays, via the one or more displays, a visual indication corresponding to the at least the portion of the user of the second electronic device at a location in the three-dimensional environment corresponding to the at least the portion of the first physical environment based on the first data.

As used herein, a spatial group corresponds to a group or number of participants (e.g., users) in a multi-user communication session. In some examples, a spatial group in the multi-user communication session has a spatial arrangement that dictates locations of users and content that are located in the spatial group. In some examples, users in the same spatial group within the multi-user communication session experience spatial truth according to the spatial arrangement of the spatial group. In some examples, when the user of the first electronic device is in a first spatial group and the user of the second electronic device is in a second spatial group in the multi-user communication session, the users experience spatial truth that is localized to their respective spatial groups. In some examples, while the user of the first electronic device and the user of the second electronic device are grouped into separate spatial groups within the multi-user communication session, if the first electronic device and the second electronic device return to the same operating state, the user of the first electronic device and the user of the second electronic device are regrouped into the same spatial group within the multi-user communication session.

As used herein, a hybrid spatial group corresponds to a group or number of participants (e.g., users) in a multi-user communication session in which at least a subset of the participants is non-collocated in a physical environment. For example, as described via one or more examples in this disclosure, a hybrid spatial group includes at least two participants who are collocated in a first physical environment and at least one participant who is non-collocated with the at least two participants in the first physical environment (e.g., the at least one participant is located in a second physical environment, different from the first physical environment). In some examples, a hybrid spatial group in the multi-user communication session has a spatial arrangement that dictates locations of users and content that are located in the spatial group. In some examples, users in the same hybrid spatial group within the multi-user communication session experience spatial truth according to the spatial arrangement of the spatial group, as similarly discussed above.

In some examples, initiating a multi-user communication session may include interaction with one or more user interface elements. In some examples, a user's gaze may be tracked by an electronic device as an input for targeting a selectable option/affordance within a respective user interface element that is displayed in the three-dimensional environment. For example, gaze can be used to identify one or more options/affordances targeted for selection using another selection input. In some examples, a respective option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

FIG. 1 illustrates an electronic device 101 presenting an extended reality (XR) environment (e.g., a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors 114*a* oriented towards a face of the user (e.g., eye tracking cameras described below with reference to FIG. 2). In some examples, internal image sensors 114*a* are used for eye tracking (e.g., detecting a gaze of the user). Internal image sensors 114*a* are optionally arranged on the left and right portions of display 120 to enable eye tracking of the user's left and right eyes. In some examples, electronic device 101 also includes external image sensors 114*b* and 114*c* facing outwards from the user to detect and/or capture the physical environment of the electronic device 101 and/or movements of the user's hands or other body parts.

In some examples, display 120 has a field of view visible to the user (e.g., that may or may not correspond to a field of view of external image sensors 114*b* and 114*c*). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-passthrough device in which display 120 is an opaque display configured to display images of the physical environment captured by external image sensors 114*b* and 114*c*. While a single display 120 is shown, it should be appreciated that display 120 may include a stereo pair of displays.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
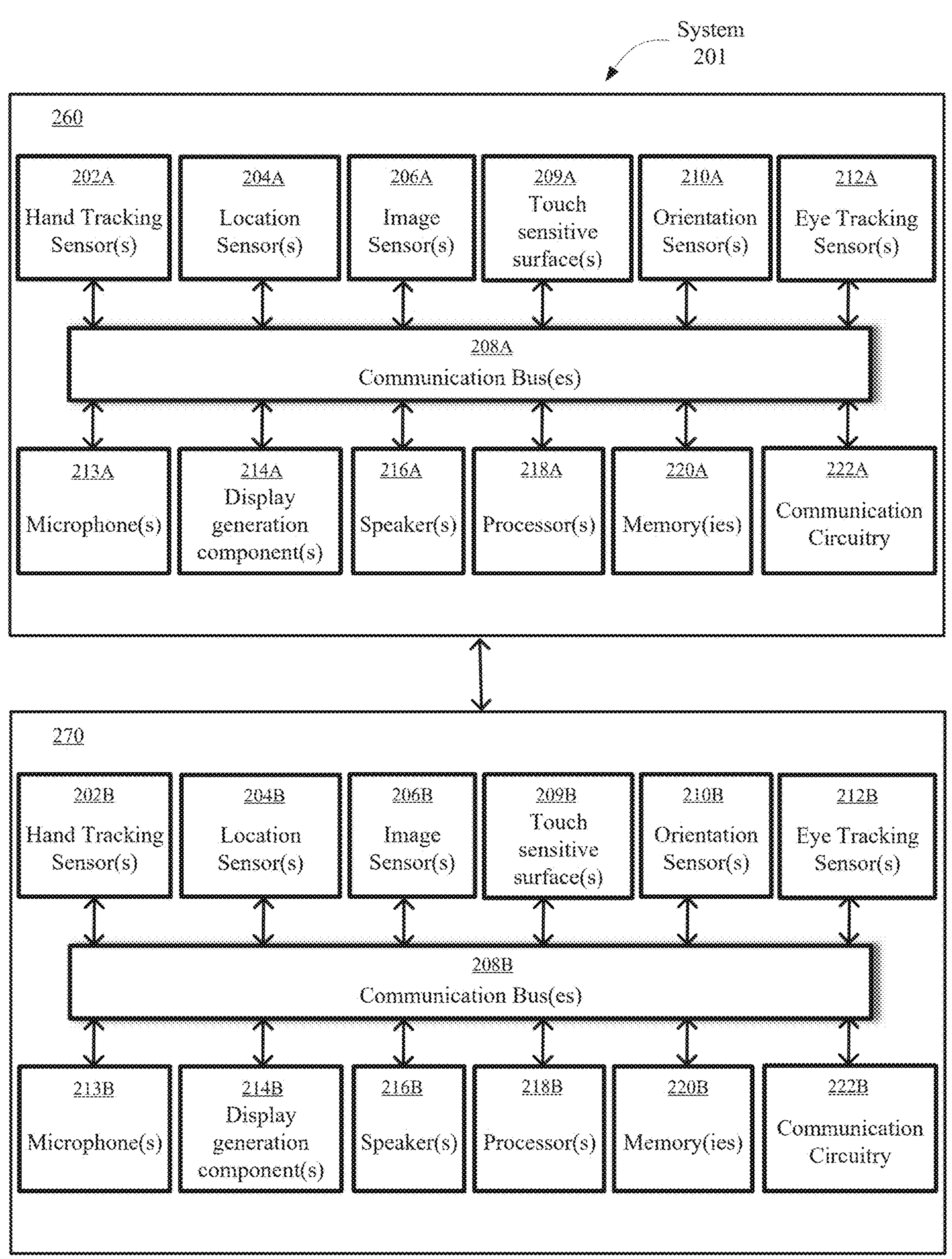
FIG. 2 illustrates a block diagram of an example architecture for a system according to some examples of the disclosure.

FIG. 2 illustrates a block diagram of an example architecture for a system 201 according to some examples of the disclosure. In some examples, system 201 includes multiple devices. For example, the system 201 includes a first electronic device 260 and a second electronic device 270, wherein the first electronic device 260 and the second electronic device 270 are in communication with each other. In some examples, the first electronic device 260 and the second electronic device 270 are a portable device, such as a mobile phone, smart phone, a tablet computer, a laptop computer, an auxiliary device in communication with another device, a head-mounted display, etc., respectively. In some examples, the first electronic device 260 and the second electronic device 270 correspond to electronic device 101 described above with reference to FIG. 1.

As illustrated in FIG. 2, the first electronic device 260 optionally includes various sensors (e.g., one or more hand tracking sensors 202A, one or more location sensors 204A, one or more image sensors 206A, one or more touch-sensitive surfaces 209A, one or more motion and/or orientation sensors 210A, one or more eye tracking sensors 212A, one or more microphones 213A or other audio sensors, one or more body tracking sensors (e.g., torso and/or head tracking sensors), one or more display generation components 214A, one or more speakers 216A, one or more processors 218A, one or more memories 220A, and/or communication circuitry 222A. In some examples, the second electronic device 270 optionally includes various sensors (e.g., one or more hand tracking sensors 202B, one or more location sensors 204B, one or more image sensors 206B, one or more touch-sensitive surfaces 209B, one or more motion and/or orientation sensors 210B, one or more eye tracking sensors 212B, one or more microphones 213B or other audio sensors, one or more body tracking sensors (e.g., torso and/or head tracking sensors), one or more display generation components 214B, one or more speakers 216, one or more processors 218B, one or more memories 220B, and/or communication circuitry 222B. In some examples, the one or more display generation components 214A, 214B correspond to display 120 in FIG. 1. One or more communication buses 208A and 208B are optionally used for communication between the above-mentioned components of electronic devices 260 and 270, respectively. First electronic device 260 and second electronic device 270 optionally communicate via a wired or wireless connection (e.g., via communication circuitry 222A, 222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some examples, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some examples, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214A, 214B include a single display (e.g., a liquid-crystal display (LCD), organic light-emitting diode (OLED), or other types of display). In some examples, display generation component(s) 214A, 214B includes multiple displays. In some examples, display generation component(s) 214A, 214B can include a display with touch capability (e.g., a touch screen), a projector, a holographic projector, a retinal projector, a transparent or translucent display, etc. In some examples, electronic devices 260 and 270 include touch-sensitive surface(s) 209A and 209B, respectively, for receiving user inputs, such as tap inputs and swipe inputs or other gestures. In some examples, display generation component(s) 214A, 214B and touch-sensitive surface(s) 209A, 209B form touch-sensitive display(s) (e.g., a touch screen integrated with electronic devices 260 and 270, respectively, or external to electronic devices 260 and 270, respectively, that is in communication with electronic devices 260 and 270).

Electronic devices 260 and 270 optionally include image sensor(s) 206A and 206B, respectively. Image sensors(s) 206A/206B optionally include one or more visible light image sensors, such as charged coupled device (CCD) sensors, and/or complementary metal-oxide-semiconductor (CMOS) sensors operable to obtain images of physical objects from the real-world environment. Image sensor(s) 206A/206B also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206A/206B also optionally include one or more cameras configured to capture movement of physical objects in the real-world environment. Image sensor(s) 206A/206B also optionally include one or more depth sensors configured to detect the distance of physical objects from electronic device 260/270. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic devices 260 and 270 use CCD sensors, event cameras, and depth sensors in combination to detect the physical environment around electronic devices 260 and 270. In some examples, image sensor(s) 206A/206B include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 260/270 uses image sensor(s) 206A/206B to detect the position and orientation of electronic device 260/270 and/or display generation component(s) 214A/214B in the real-world environment. For example, electronic device 260/270 uses image sensor(s) 206A/206B to track the position and orientation of display generation component(s) 214A/214B relative to one or more fixed objects in the real-world environment.

In some examples, electronic device 260/270 includes microphone(s) 213A/213B or other audio sensors. Device 260/270 uses microphone(s) 213A/213B to detect sound from the user and/or the real-world environment of the user. In some examples, microphone(s) 213A/213B includes an array of microphones (a plurality of microphones) that optionally operate in tandem, such as to identify ambient noise or to locate the source of sound in space of the real-world environment.

In some examples, device 260/270 includes location sensor(s) 204A/204B for detecting a location of device 260/270 and/or display generation component(s) 214A/214B. For example, location sensor(s) 204A/204B can include a global positioning system (GPS) receiver that receives data from one or more satellites and allows electronic device 260/270 to determine the device's absolute position in the physical world.

In some examples, electronic device 260/270 includes orientation sensor(s) 210A/210B for detecting orientation and/or movement of electronic device 260/270 and/or display generation component(s) 214A/214B. For example, electronic device 260/270 uses orientation sensor(s) 210A/210B to track changes in the position and/or orientation of electronic device 260/270 and/or display generation component(s) 214A/214B, such as with respect to physical objects in the real-world environment. Orientation sensor(s) 210A/210B optionally include one or more gyroscopes and/or one or more accelerometers.

Electronic device 260/270 includes hand tracking sensor(s) 202A/202B and/or eye tracking sensor(s) 212A/212B (and/or other body tracking sensor(s), such as leg, torso, and/or head tracking sensor(s)), in some examples. Hand tracking sensor(s) 202A/202B are configured to track the position/location of one or more portions of the user's hands, and/or motions of one or more portions of the user's hands with respect to the extended reality environment, relative to the display generation component(s) 214A/214B, and/or relative to another defined coordinate system. Eye tracking sensor(s) 212A/212B are configured to track the position and movement of a user's gaze (eyes, face, or head, more generally) with respect to the real-world or extended reality environment and/or relative to the display generation component(s) 214A/214B. In some examples, hand tracking sensor(s) 202A/202B and/or eye tracking sensor(s) 212A/212B are implemented together with the display generation component(s) 214A/214B. In some examples, the hand tracking sensor(s) 202A/202B and/or eye tracking sensor(s) 212A/212B are implemented separate from the display generation component(s) 214A/214B.

In some examples, the hand tracking sensor(s) 202A/202B (and/or other body tracking sensor(s), such as leg, torso, and/or head tracking sensor(s)) can use image sensor(s) 206A/206B (e.g., one or more IR cameras, 3D cameras, depth cameras, etc.) that capture three-dimensional information from the real-world including one or more body parts (e.g., hands, legs, or torso of a human user). In some examples, the hands can be resolved with sufficient resolution to distinguish fingers and their respective positions. In some examples, one or more image sensors 206A/206B are positioned relative to the user to define a field of view of the image sensor(s) 206A/206B and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212A/212B includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic device 260/270 and system 201 are not limited to the components and configuration of FIG. 2, but can include fewer, other, or additional components in multiple configurations. In some examples, system 201 can be implemented in a single device. A person or persons using system 201, is optionally referred to herein as a user or users of the device(s). Attention is now directed towards exemplary concurrent displays of a three-dimensional environment on a first electronic device (e.g., corresponding to electronic device 260) and a second electronic device (e.g., corresponding to electronic device 270). As discussed below, the first electronic device may be in communication with the second electronic device in a multi-user communication session. In some examples, an avatar (e.g., a representation of) a user of the first electronic device may be displayed in the three-dimensional environment at the second electronic device, and an avatar of a user of the second electronic device may be displayed in the three-dimensional environment at the first electronic device. In some examples, the user of the first electronic device and the user of the second electronic device may be associated with a spatial group in the multi-user communication session. In some examples, interactions with content in the three-dimensional environment while the first electronic device and the second electronic device are in the multi-user communication session may cause the user of the first electronic device and the user of the second electronic device to become associated with different spatial groups in the multi-user communication session.

Figure 3:
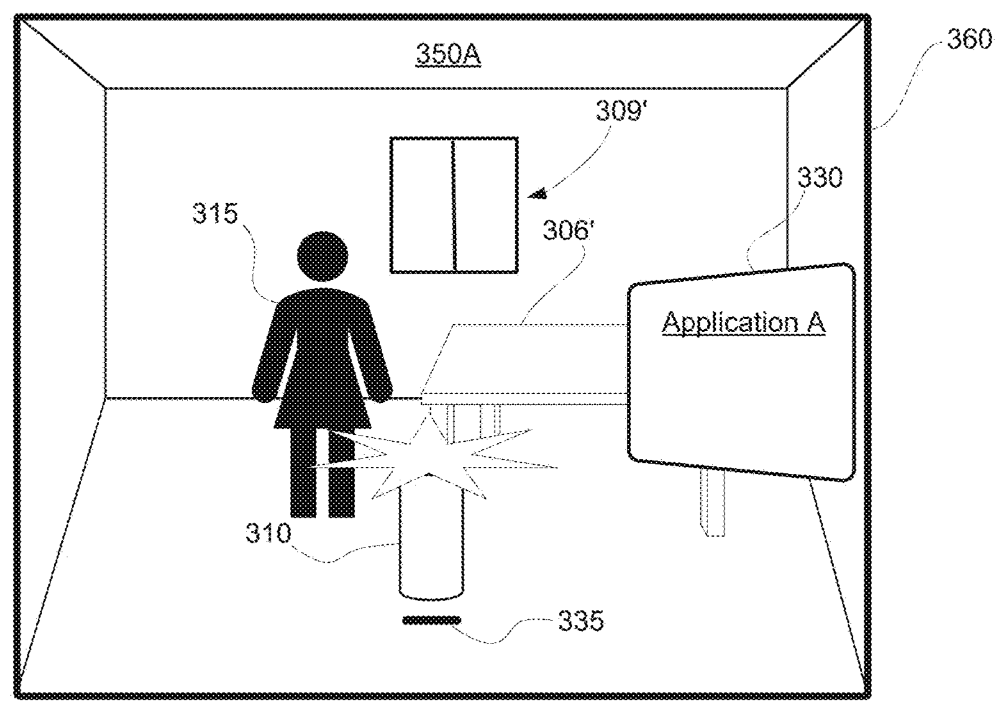
FIG. 3 illustrates an example of a spatial group in a multi-user communication session that includes a first electronic device and a second electronic device according to some examples of the disclosure.
Figure 3:
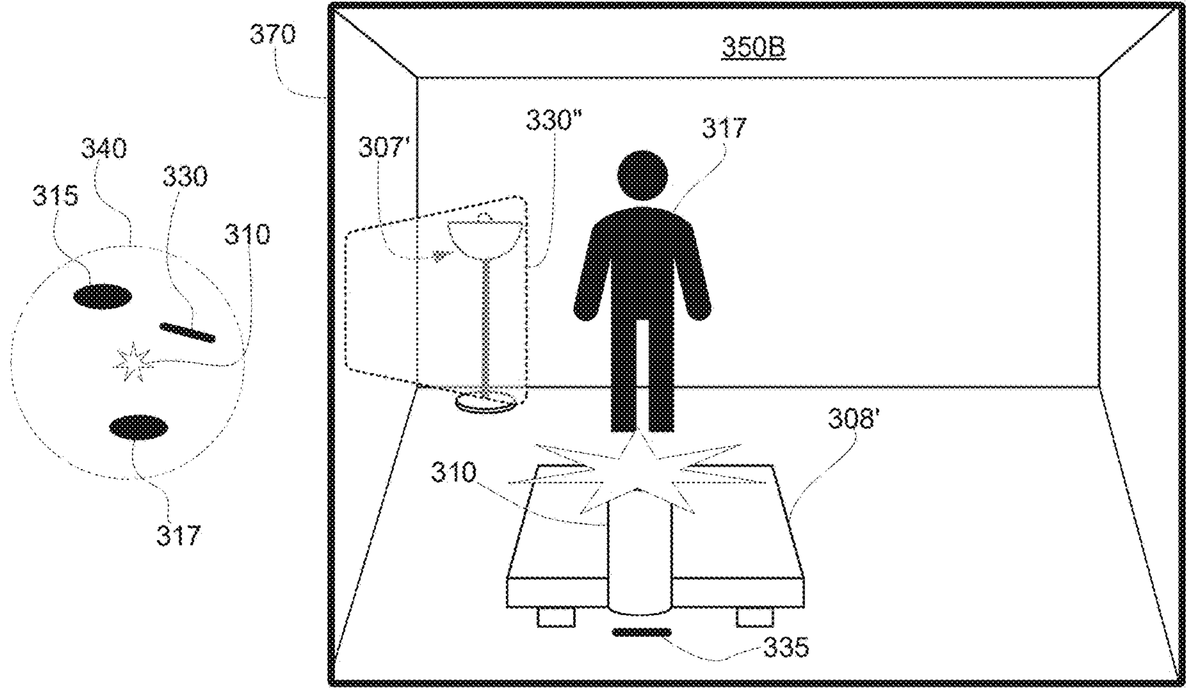

FIG. 3 illustrates an example of a spatial group 340 in a multi-user communication session that includes a first electronic device 360 and a second electronic device 370 according to some examples of the disclosure. In some examples, the first electronic device 360 may present a three-dimensional environment 350A, and the second electronic device 370 may present a three-dimensional environment 350B. The first electronic device 360 and the second electronic device 370 may be similar to electronic device 101 or 260/270, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, displays formed as lenses designed to be placed on a person's eyes (e.g., similar to contact lenses), respectively. In the example of FIG. 3, a first user is optionally wearing the first electronic device 360 and a second user is optionally wearing the second electronic device 370, such that the three-dimensional environment 350A/350B can be defined by X, Y and Z axes as viewed from a perspective of the electronic devices (e.g., a viewpoint associated with the electronic device 360/370, which may be a head-mounted display, for example).

As shown in FIG. 3, the first electronic device 360 may be in a first physical environment that includes a table 306 and a window 309. Thus, the three-dimensional environment 350A presented using the first electronic device 360 optionally includes captured portions of the physical environment surrounding the first electronic device 360, such as a representation of the table 306' and a representation of the window 309'. Similarly, the second electronic device 370 may be in a second physical environment, different from the first physical environment (e.g., separate from the first physical environment), that includes a floor lamp 307 and a coffee table 308. Thus, the three-dimensional environment 350B presented using the second electronic device 370 optionally includes captured portions of the physical environment surrounding the second electronic device 370, such as a representation of the floor lamp 307' and a representation of the coffee table 308'. Additionally, the three-dimensional environments 350A and 350B may include representations of the floor, ceiling, and walls of the room in which the first electronic device 360 and the second electronic device 370, respectively, are located.

As mentioned above, in some examples, the first electronic device 360 is optionally in a multi-user communication session with the second electronic device 370. For example, the first electronic device 360 and the second electronic device 370 (e.g., via communication circuitry 222A/222B) are configured to present a shared three-dimensional environment 350A/350B that includes one or more shared virtual objects (e.g., content such as images, video, audio and the like, representations of user interfaces of applications, etc.). As used herein, the term "shared three-dimensional environment" refers to a three-dimensional environment that is independently presented, displayed, and/or visible at two or more electronic devices via which content, applications, data, and the like may be shared and/or presented to users of the two or more electronic devices. In some examples, while the first electronic device 360 is in the multi-user communication session with the second electronic device 370, an avatar corresponding to the user of one electronic device is optionally displayed in the three-dimensional environment that is displayed via the other electronic device. For example, as shown in FIG. 3, at the first electronic device 360, an avatar 315 corresponding to the user of the second electronic device 370 is displayed in the three-dimensional environment 350A. Similarly, at the second electronic device 370, an avatar 317 corresponding to the user of the first electronic device 360 is displayed in the three-dimensional environment 350B.

In some examples, the presentation of avatars 315/317 as part of a shared three-dimensional environment is optionally accompanied by an audio effect corresponding to a voice of the users of the electronic devices 370/360. For example, the avatar 315 displayed in the three-dimensional environment 350A using the first electronic device 360 is optionally accompanied by an audio effect corresponding to the voice of the user of the second electronic device 370. In some such examples, when the user of the second electronic device 370 speaks, the voice of the user may be detected by the second electronic device 370 (e.g., via the microphone(s) 213B) and transmitted to the first electronic device 360 (e.g., via the communication circuitry 222B/222A), such that the detected voice of the user of the second electronic device 370 may be presented as audio (e.g., using speaker(s) 216A) to the user of the first electronic device 360 in three-dimensional environment 350A. In some examples, the audio effect corresponding to the voice of the user of the second electronic device 370 may be spatialized such that it appears to the user of the first electronic device 360 to emanate from the location of avatar 315 in the shared three-dimensional environment 350A (e.g., despite being outputted from the speakers of the first electronic device 360). Similarly, the avatar 317 displayed in the three-dimensional environment 350B using the second electronic device 370 is optionally accompanied by an audio effect corresponding to the voice of the user of the first electronic device 360. In some such examples, when the user of the first electronic device 360 speaks, the voice of the user may be detected by the first electronic device 360 (e.g., via the microphone(s) 213A) and transmitted to the second electronic device 370 (e.g., via the communication circuitry 222A/222B), such that the detected voice of the user of the first electronic device 360 may be presented as audio (e.g., using speaker(s) 216B) to the user of the second electronic device 370 in three-dimensional environment 350B. In some examples, the audio effect corresponding to the voice of the user of the first electronic device 360 may be spatialized such that it appears to the user of the second electronic device 370 to emanate from the location of avatar 317 in the shared three-dimensional environment 350B (e.g., despite being outputted from the speakers of the first electronic device 360).

In some examples, while in the multi-user communication session, the avatars 315/317 are displayed in the three-dimensional environments 350A/350B with respective orientations that correspond to and/or are based on orientations of the electronic devices 360/370 (and/or the users of electronic devices 360/370) in the physical environments surrounding the electronic devices 360/370. For example, as shown in FIG. 3, in the three-dimensional environment 350A, the avatar 315 is optionally facing toward the viewpoint of the user of the first electronic device 360, and in the three-dimensional environment 350B, the avatar 317 is optionally facing toward the viewpoint of the user of the second electronic device 370. As a particular user moves the electronic device (and/or themself) in the physical environment, the viewpoint of the user changes in accordance with the movement, which may thus also change an orientation of the user's avatar in the three-dimensional environment. For example, with reference to FIG. 3, if the user of the first electronic device 360 were to look leftward in the three-dimensional environment 350A such that the first electronic device 360 is rotated (e.g., a corresponding amount) to the left (e.g., counterclockwise), the user of the second electronic device 370 would see the avatar 317 corresponding to the user of the first electronic device 360 rotate to the right (e.g., clockwise) relative to the viewpoint of the user of the second electronic device 370 in accordance with the movement of the first electronic device 360.

Additionally, in some examples, while in the multi-user communication session, a viewpoint of the three-dimensional environments 350A/350B and/or a location of the viewpoint of the three-dimensional environments 350A/350B optionally changes in accordance with movement of the electronic devices 360/370 (e.g., by the users of the electronic devices 360/370). For example, while in the communication session, if the first electronic device 360 is moved closer toward the representation of the table 306' and/or the avatar 315 (e.g., because the user of the first electronic device 360 moved forward in the physical environment surrounding the first electronic device 360), the viewpoint of the three-dimensional environment 350A would change accordingly, such that the representation of the table 306', the representation of the window 309' and the avatar 315 appear larger in the field of view. In some examples, each user may independently interact with the three-dimensional environment 350A/350B, such that changes in viewpoints of the three-dimensional environment 350A and/or interactions with virtual objects in the three-dimensional environment 350A by the first electronic device 360 optionally do not affect what is shown in the three-dimensional environment 350B at the second electronic device 370, and vice versa.

In some examples, the avatars 315/317 are representations (e.g., a full-body rendering) of the users of the electronic devices 370/360. In some examples, the avatar 315/317 is a representation of a portion (e.g., a rendering of a head, face, head and torso, etc.) of the users of the electronic devices 370/360. In some examples, the avatars 315/317 are user-personalized, user-selected, and/or user-created representations displayed in the three-dimensional environments 350A/350B that are representative of the users of the electronic devices 370/360. It should be understood that, while the avatars 315/317 illustrated in FIG. 3 correspond to full-body representations of the users of the electronic devices 370/360, respectively, alternative avatars may be provided, such as those described above.

As mentioned above, while the first electronic device 360 and the second electronic device 370 are in the multi-user communication session, the three-dimensional environments 350A/350B may be a shared three-dimensional environment that is presented using the electronic devices 360/370. In some examples, content that is viewed by one user at one electronic device may be shared with another user at another electronic device in the multi-user communication session. In some such examples, the content may be experienced (e.g., viewed and/or interacted with) by both users (e.g., via their respective electronic devices) in the shared three-dimensional environment. For example, as shown in FIG. 3, the three-dimensional environments 350A/350B include a shared virtual object 310 (e.g., which is optionally a three-dimensional virtual sculpture) that is viewable by and interactive to both users. As shown in FIG. 3, the shared virtual object 310 may be displayed with a grabber affordance (e.g., a handlebar) 335 that is selectable to initiate movement of the shared virtual object 310 within the three-dimensional environments 350A/350B.

In some examples, the three-dimensional environments 350A/350B include unshared content that is private to one user in the multi-user communication session. For example, in FIG. 3, the first electronic device 360 is displaying a private application window 330 in the three-dimensional environment 350A, which is optionally an object that is not shared between the first electronic device 360 and the second electronic device 370 in the multi-user communication session. In some examples, the private application window 330 may be associated with a respective application that is operating on the first electronic device 360 (e.g., such as a media player application, a web browsing application, a messaging application, etc.). Because the private application window 330 is not shared with the second electronic device 370, the second electronic device 370 optionally displays a representation of the private application window 330" in three-dimensional environment 350B. As shown in FIG. 3, in some examples, the representation of the private application window 330" may be a faded, occluded, discolored, and/or translucent representation of the private application window 330 that prevents the user of the second electronic device 370 from viewing contents of the private application window 330.

As mentioned previously above, in some examples, the user of the first electronic device 360 and the user of the second electronic device 370 are in a spatial group 340 within the multi-user communication session. In some examples, the spatial group 340 may be a baseline (e.g., a first or default) spatial group within the multi-user communication session. For example, when the user of the first electronic device 360 and the user of the second electronic device 370 initially join the multi-user communication session, the user of the first electronic device 360 and the user of the second electronic device 370 are automatically (and initially, as discussed in more detail below) associated with (e.g., grouped into) the spatial group 340 within the multi-user communication session. In some examples, while the users are in the spatial group 340 as shown in FIG. 3, the user of the first electronic device 360 and the user of the second electronic device 370 have a first spatial arrangement (e.g., first spatial template) within the shared three-dimensional environment. For example, the user of the first electronic device 360 and the user of the second electronic device 370, including objects that are displayed in the shared three-dimensional environment, have spatial truth within the spatial group 340. In some examples, spatial truth requires a consistent spatial arrangement between users (or representations thereof) and virtual objects. For example, a distance between the viewpoint of the user of the first electronic device 360 and the avatar 315 corresponding to the user of the second electronic device 370 may be the same as a distance between the viewpoint of the user of the second electronic device 370 and the avatar 317 corresponding to the user of the first electronic device 360. As described herein, if the location of the viewpoint of the user of the first electronic device 360 moves, the avatar 317 corresponding to the user of the first electronic device 360 moves in the three-dimensional environment 350B in accordance with the movement of the location of the viewpoint of the user relative to the viewpoint of the user of the second electronic device 370. Additionally, if the user of the first electronic device 360 performs an interaction on the shared virtual object 310 (e.g., moves the virtual object 310 in the three-dimensional environment 350A), the second electronic device 370 alters display of the shared virtual object 310 in the three-dimensional environment 350B in accordance with the interaction (e.g., moves the virtual object 310 in the three-dimensional environment 350B).

It should be understood that, in some examples, more than two electronic devices may be communicatively linked in a multi-user communication session. For example, in a situation in which three electronic devices are communicatively linked in a multi-user communication session, a first electronic device would display two avatars, rather than just one avatar, corresponding to the users of the other two electronic devices. It should therefore be understood that the various processes and exemplary interactions described herein with reference to the first electronic device 360 and the second electronic device 370 in the multi-user communication session optionally apply to situations in which more than two electronic devices are communicatively linked in a multi-user communication session.

In some examples, it may be advantageous to provide mechanisms for facilitating a multi-user communication session that includes collocated users (e.g., collocated electronic devices associated with the users). For example, it may be desirable to enable users who are collocated in a first physical environment to establish a multi-user communication session, such that virtual content may be shared and presented in a three-dimensional environment that is optionally viewable by and/or interactive to the collocated users in the multi-user communication session. As used herein, relative to a first electronic device, a collocated user corresponds to a local user and a non-collocated user corresponds to a remote user. As similarly discussed above, the three-dimensional environment optionally includes avatars corresponding to the remote users of the electronic devices that are non-collocated in the multi-user communication session. In some examples, the avatars corresponding to the remote users are generated and presented in the three-dimensional environment based on (e.g., using) skeletal data associated with the remote users. For example, as discussed in more detail herein, the skeletal data is used to, at least partially, define one or more visual characteristics of the avatars (e.g., a size (e.g., height) and/or relative thickness of portions of the avatar, such as hands and/or limbs) in the three-dimensional environment. Additionally, the skeletal data is optionally used to track movement of the remote users, which, as discussed above with reference to FIG. 3, causes their corresponding avatars to be shifted and/or moved in the three-dimensional environment relative to the viewpoint of a first electronic device. In some examples, as discussed below, the skeletal data associated with local users may also be tracked and shared among the collocated electronic devices in the multi-user communication session to help facilitate presentation of and interaction with virtual objects (e.g., avatars and shared virtual content) in the three-dimensional environment.

Figures 1, 4A:
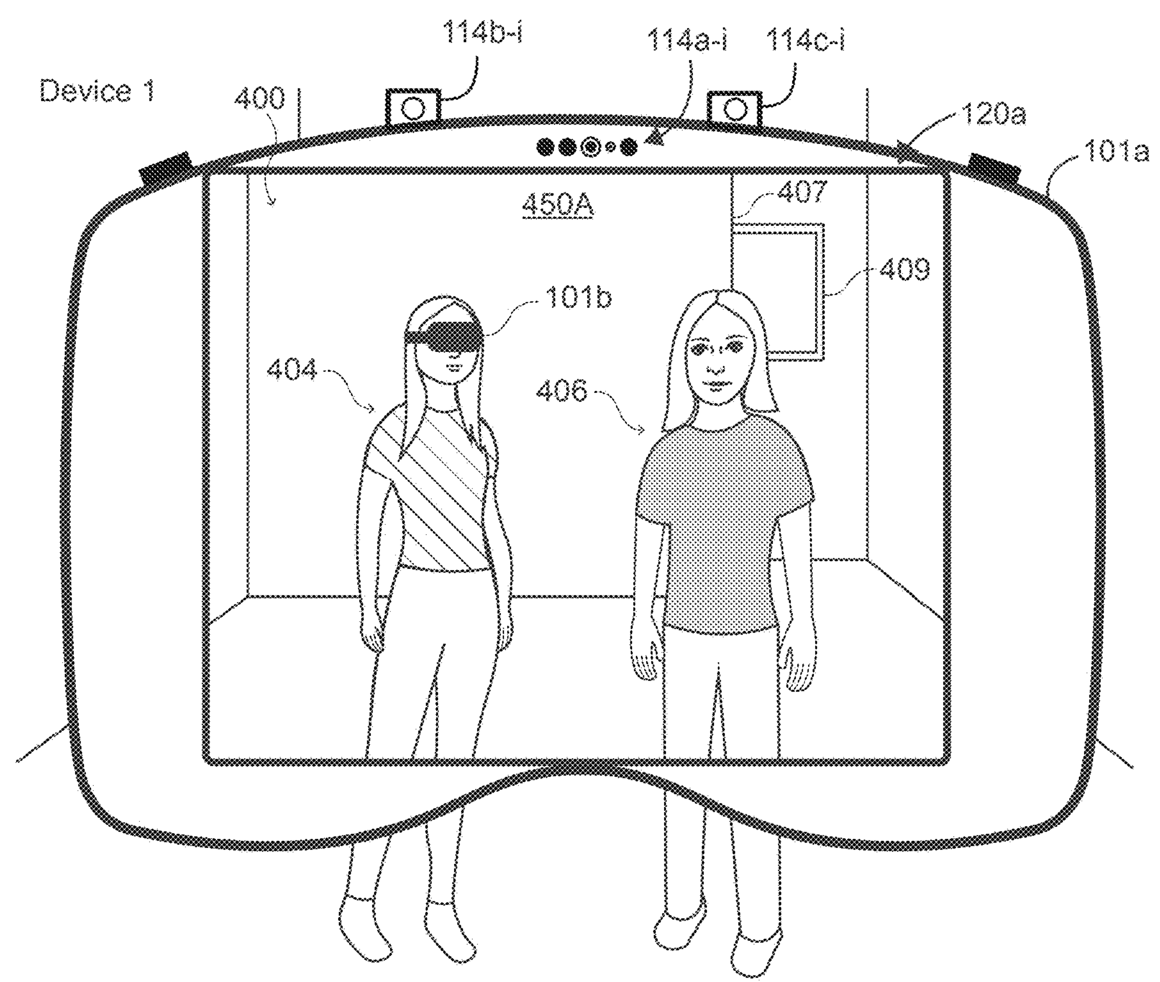
Figures 2, 4A:
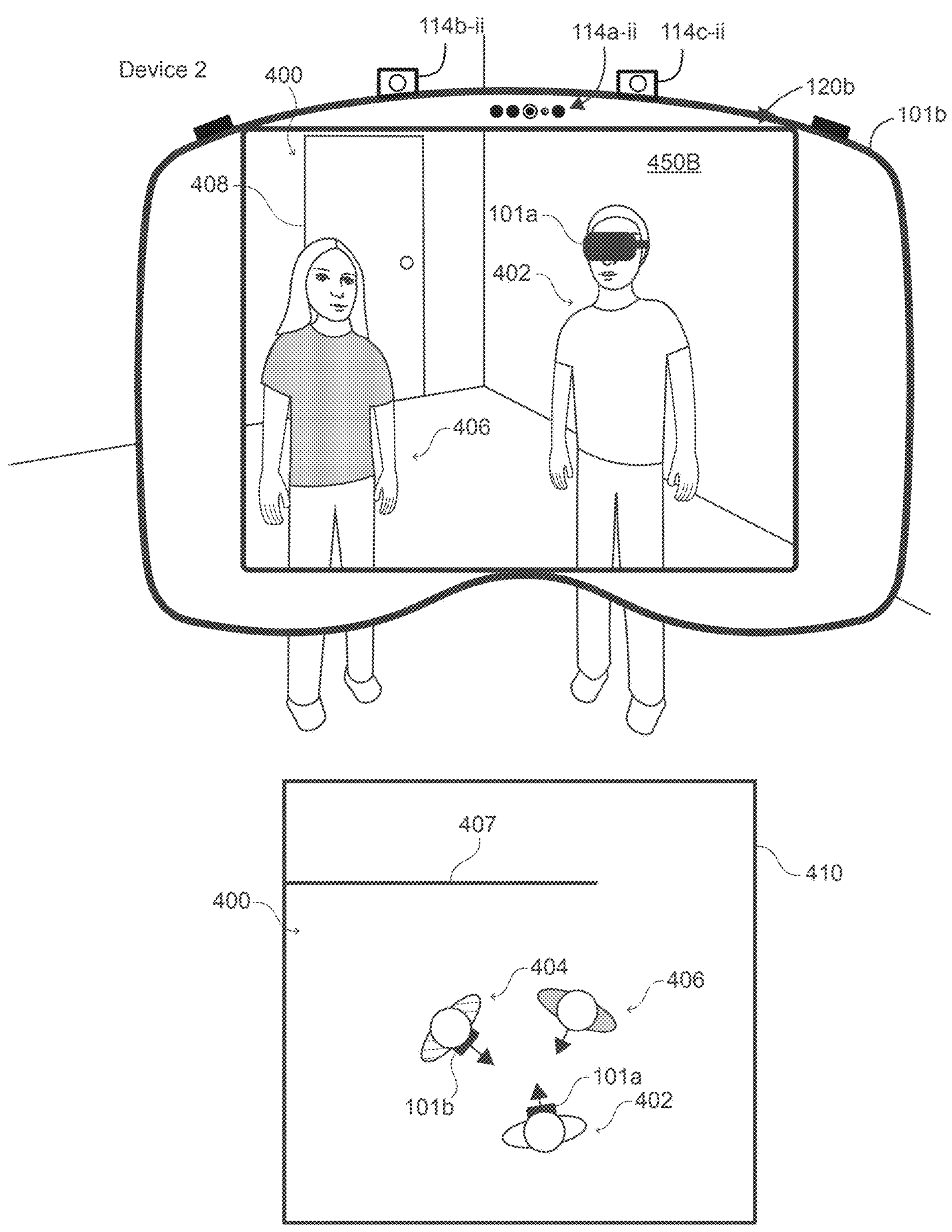
Figures 1, 4B:
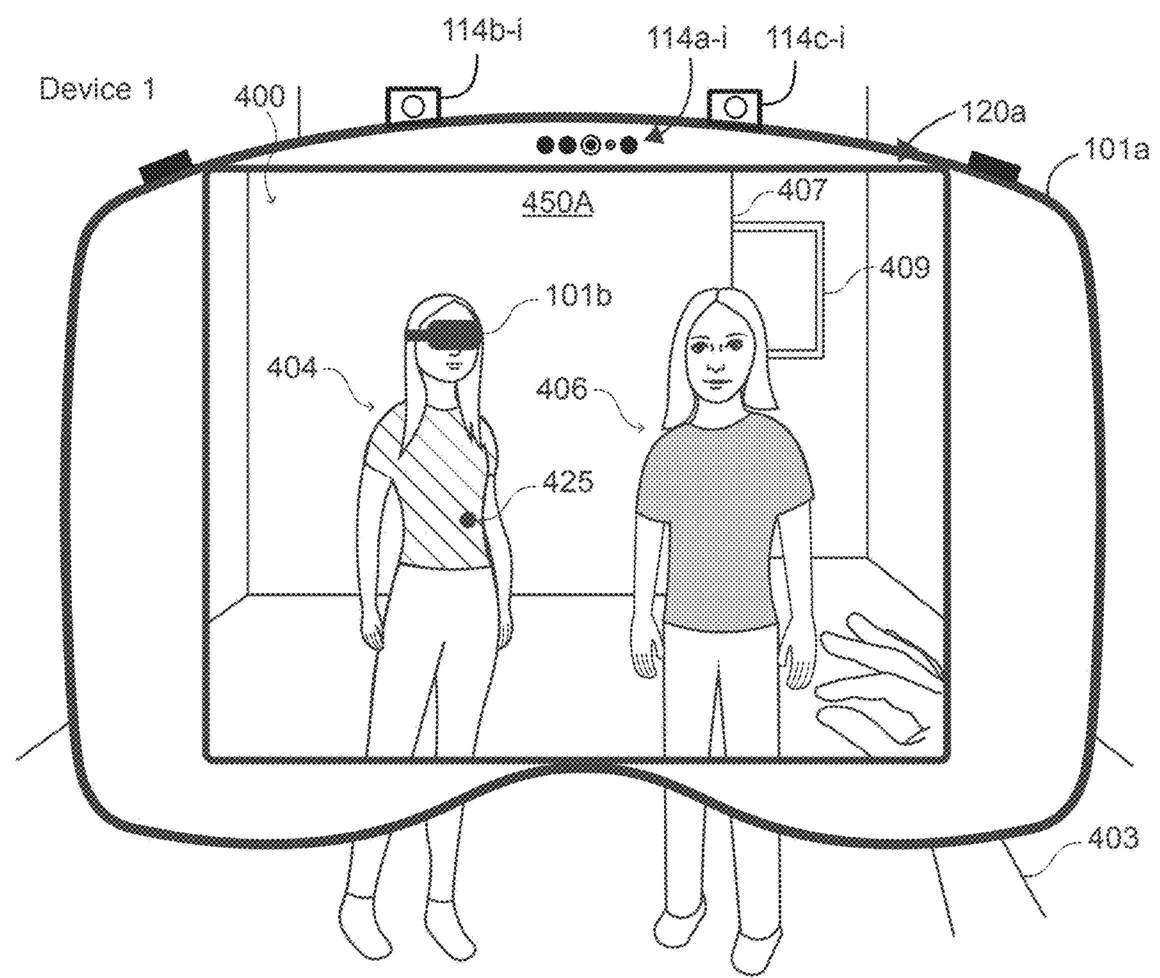
Figures 2, 4B:
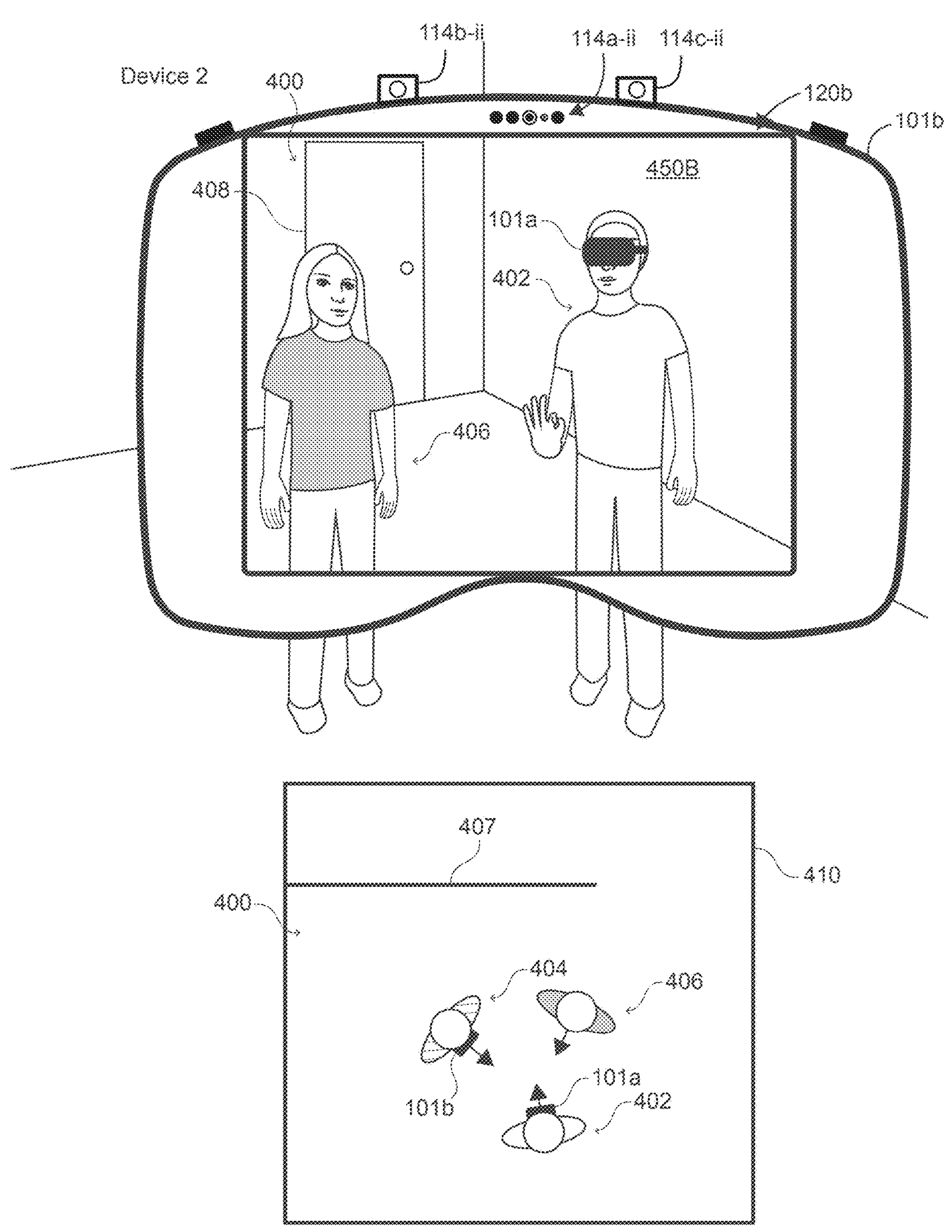
Figures 1, 4C:
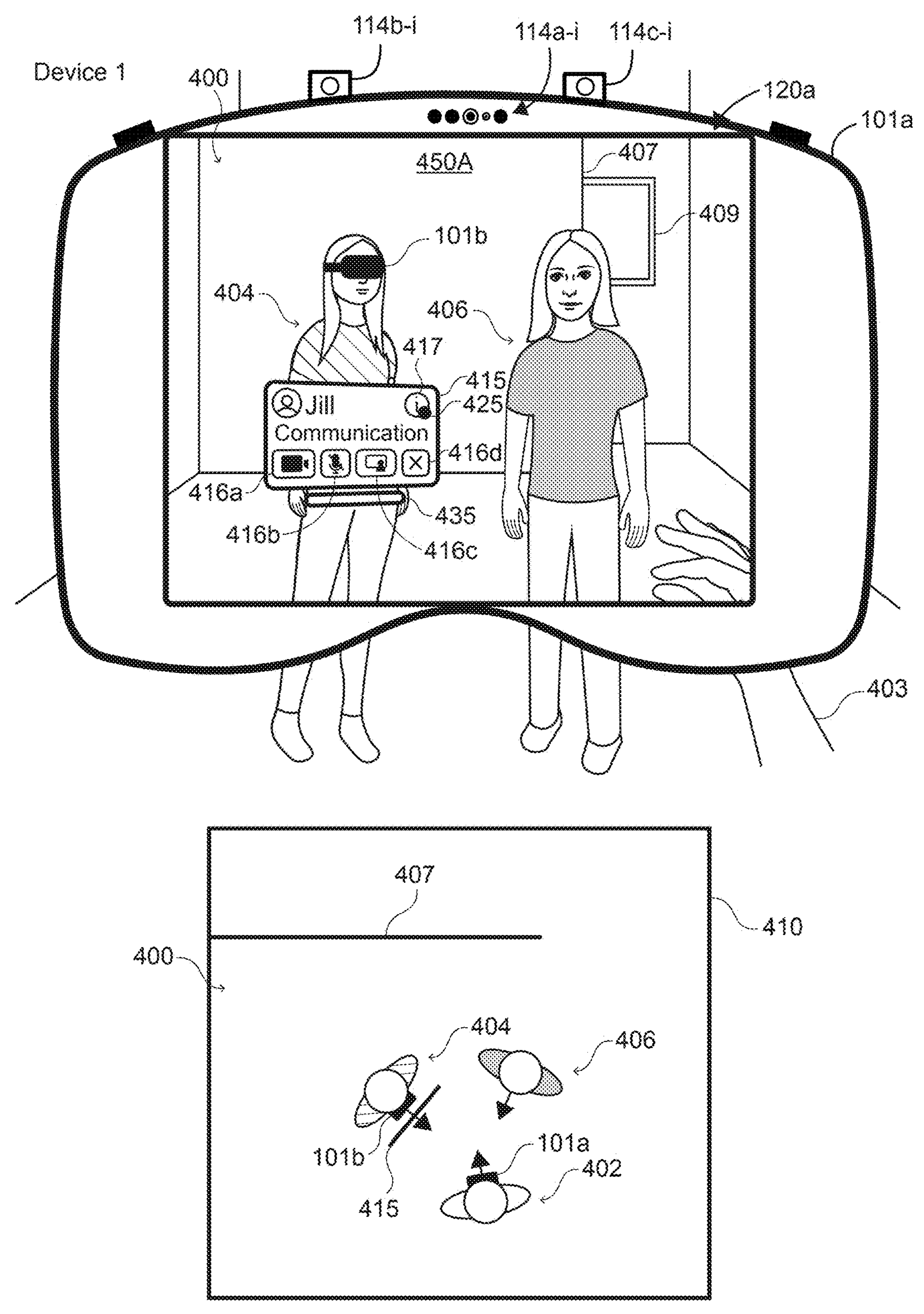
Figures 2, 4C:
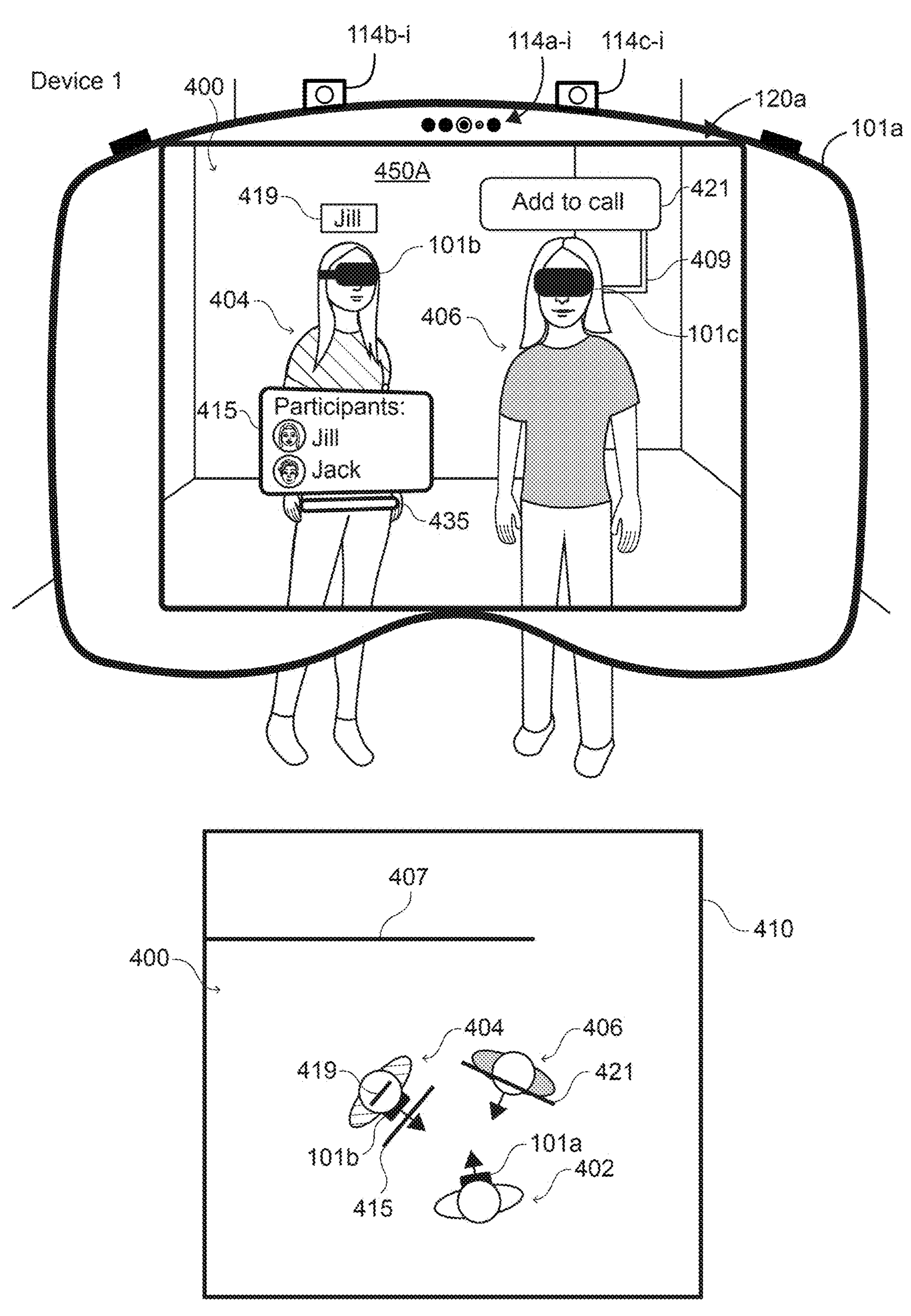
Figures 1, 4D:
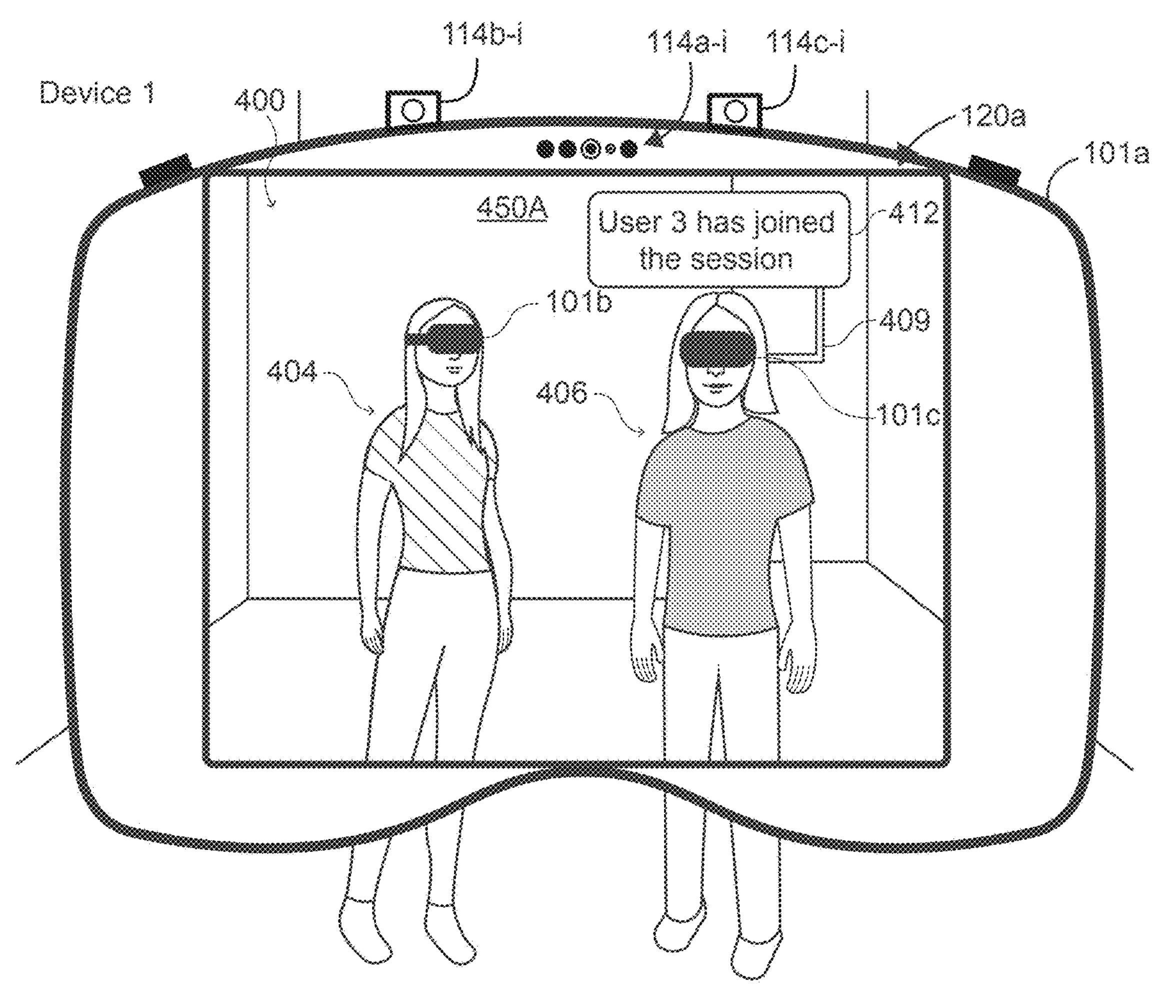
Figures 2, 4D:
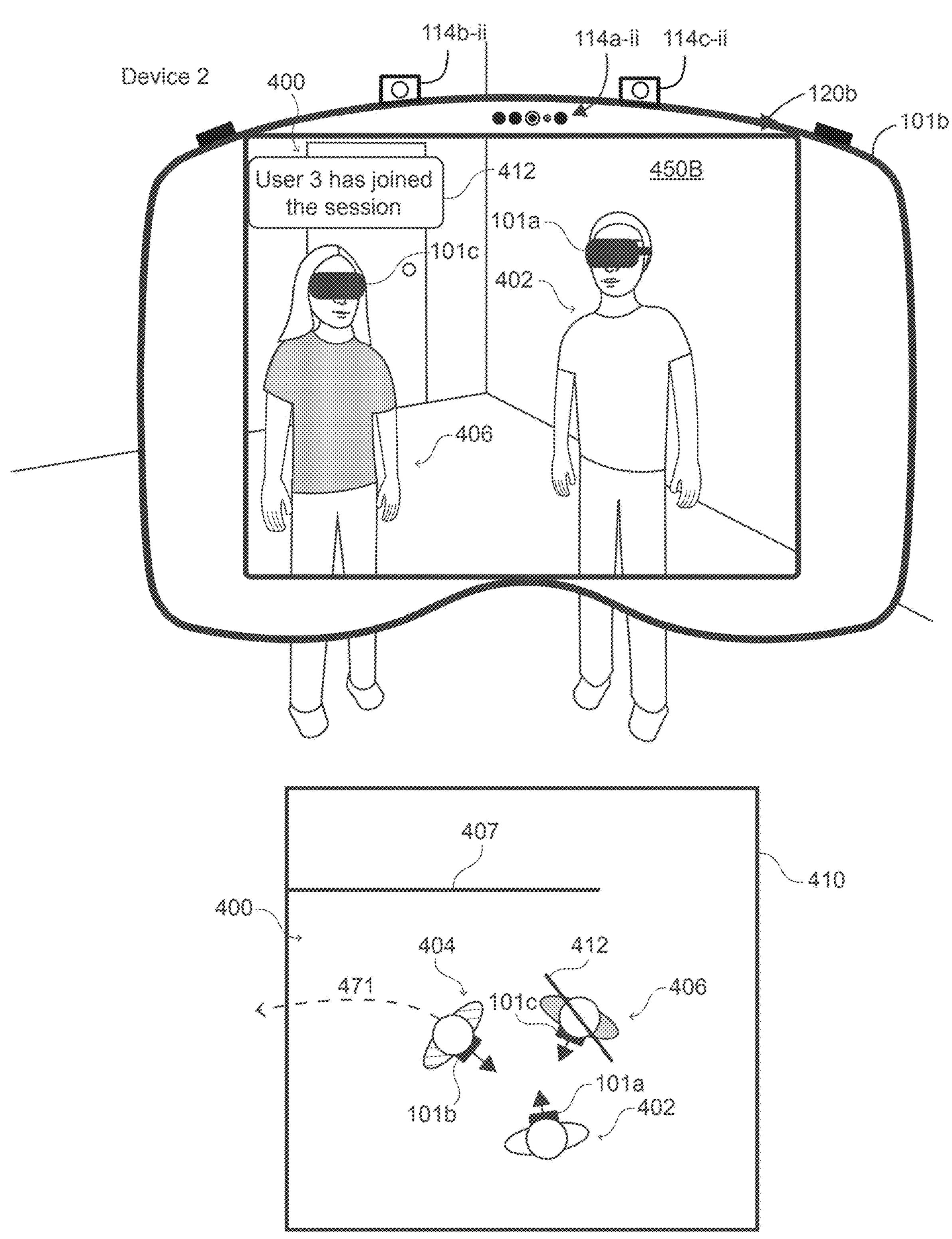
Figure 4E:
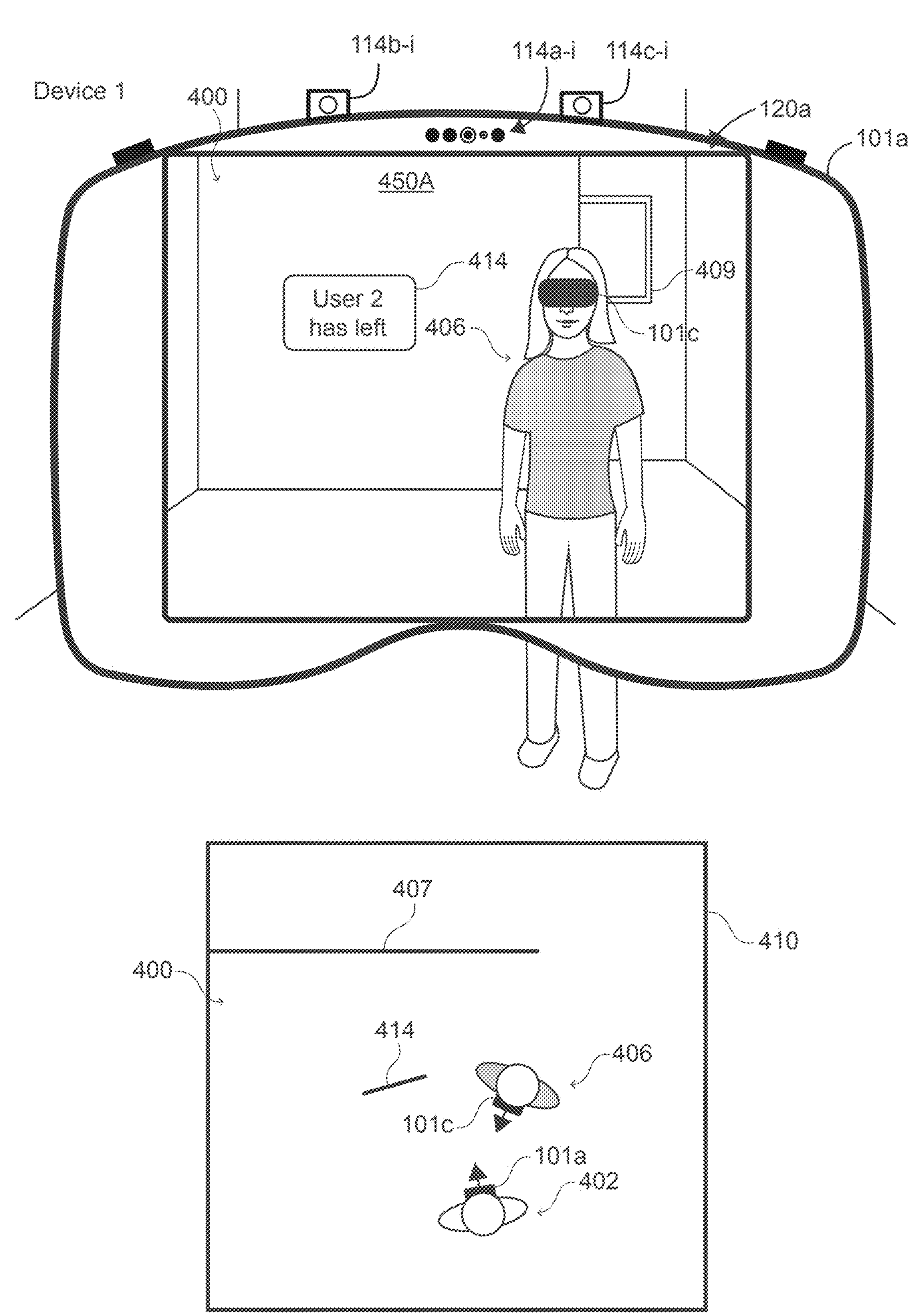
Figure 4F:
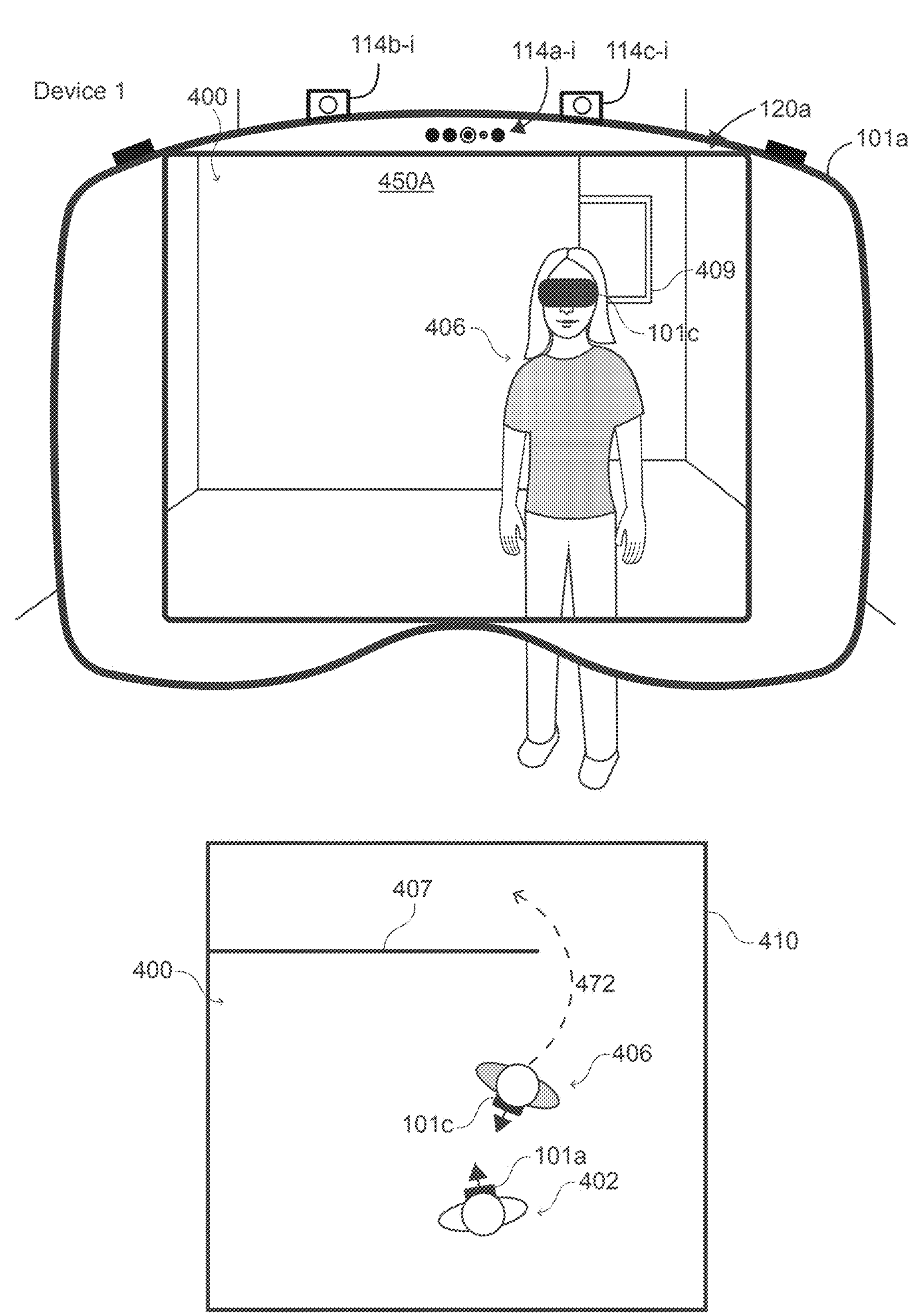
Figure 4G:
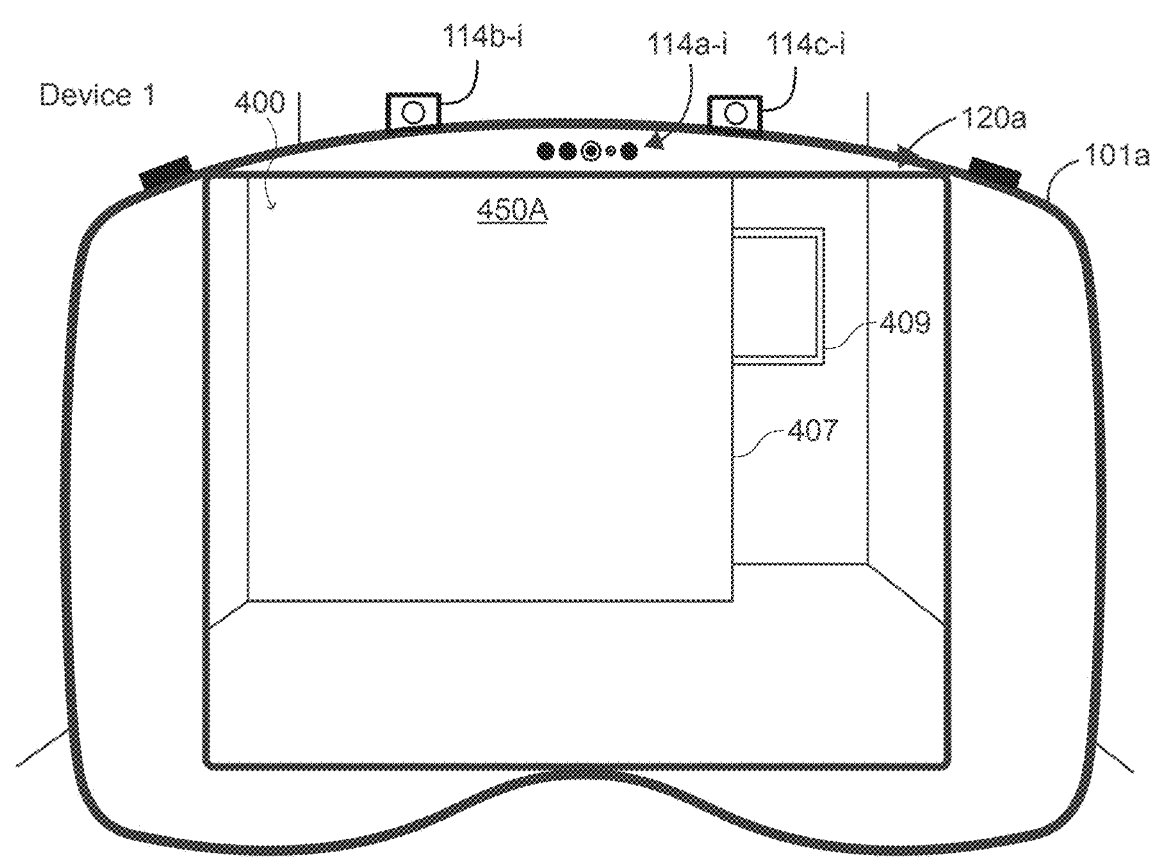
Figure 1:
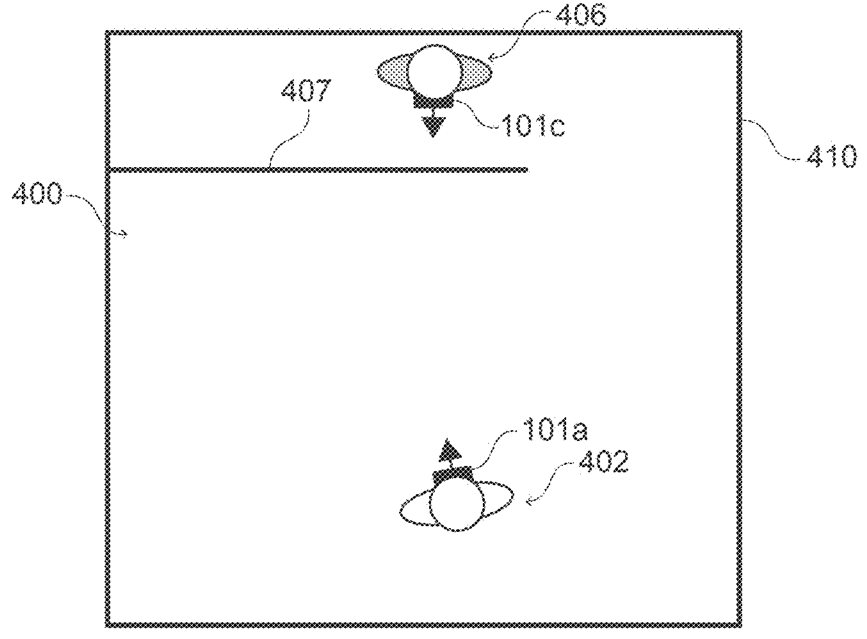
Figures 2, 4G:
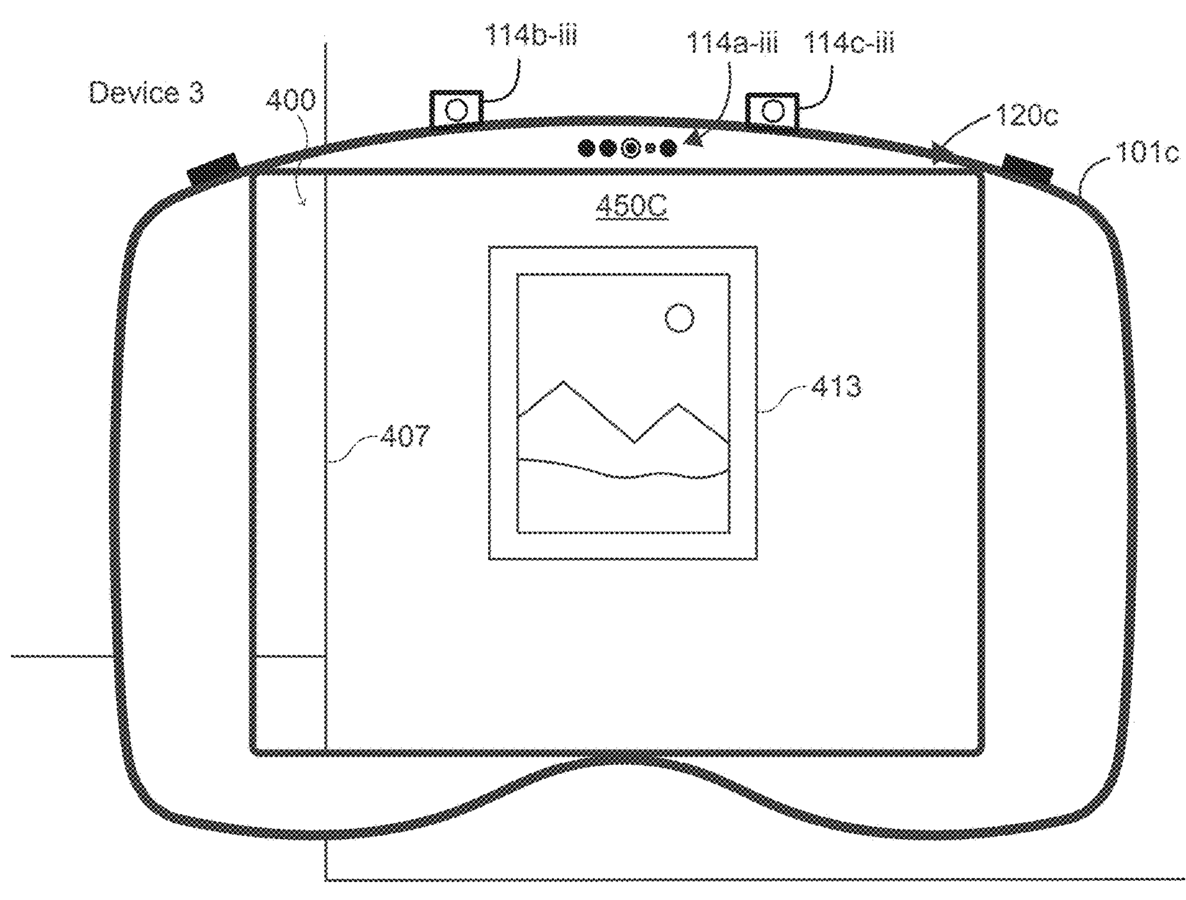
Figure 4H:
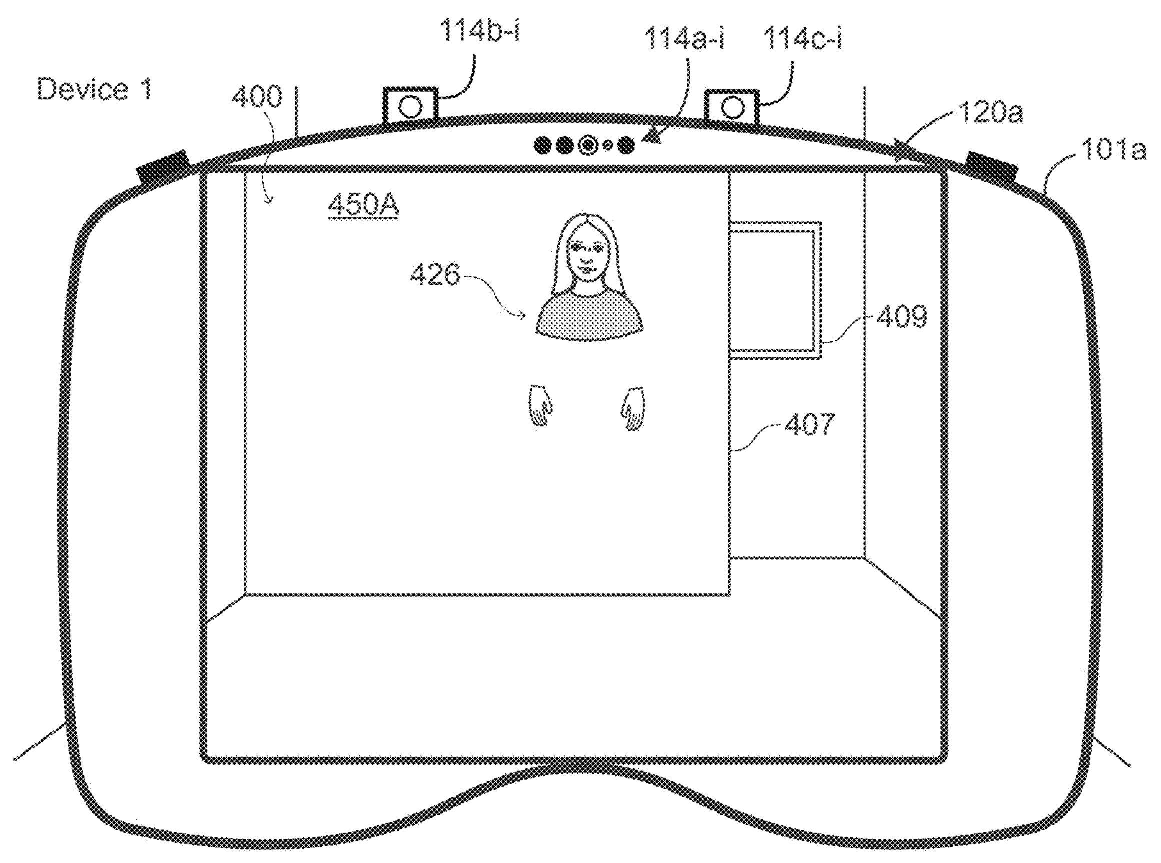
Figure 4H:
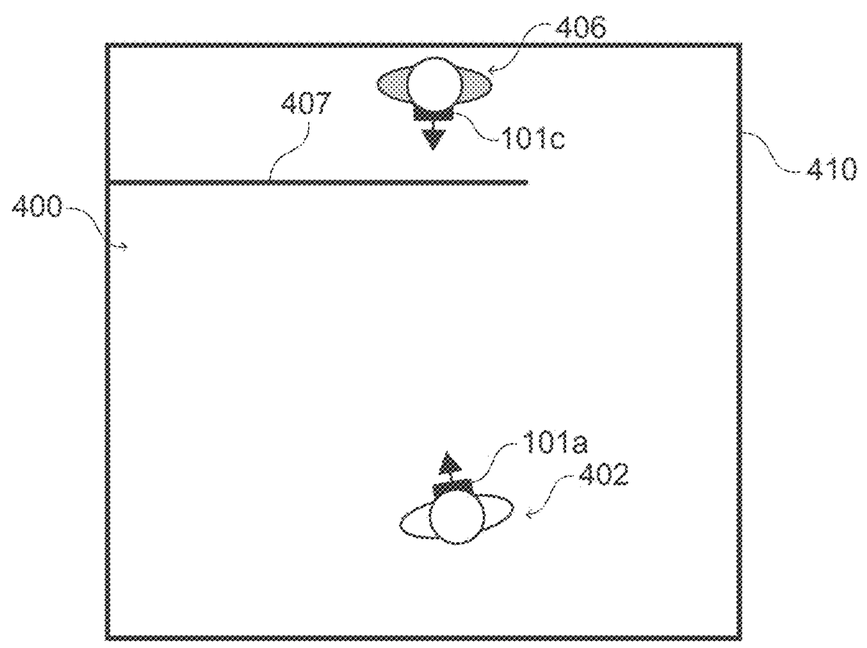
Figure 4I:
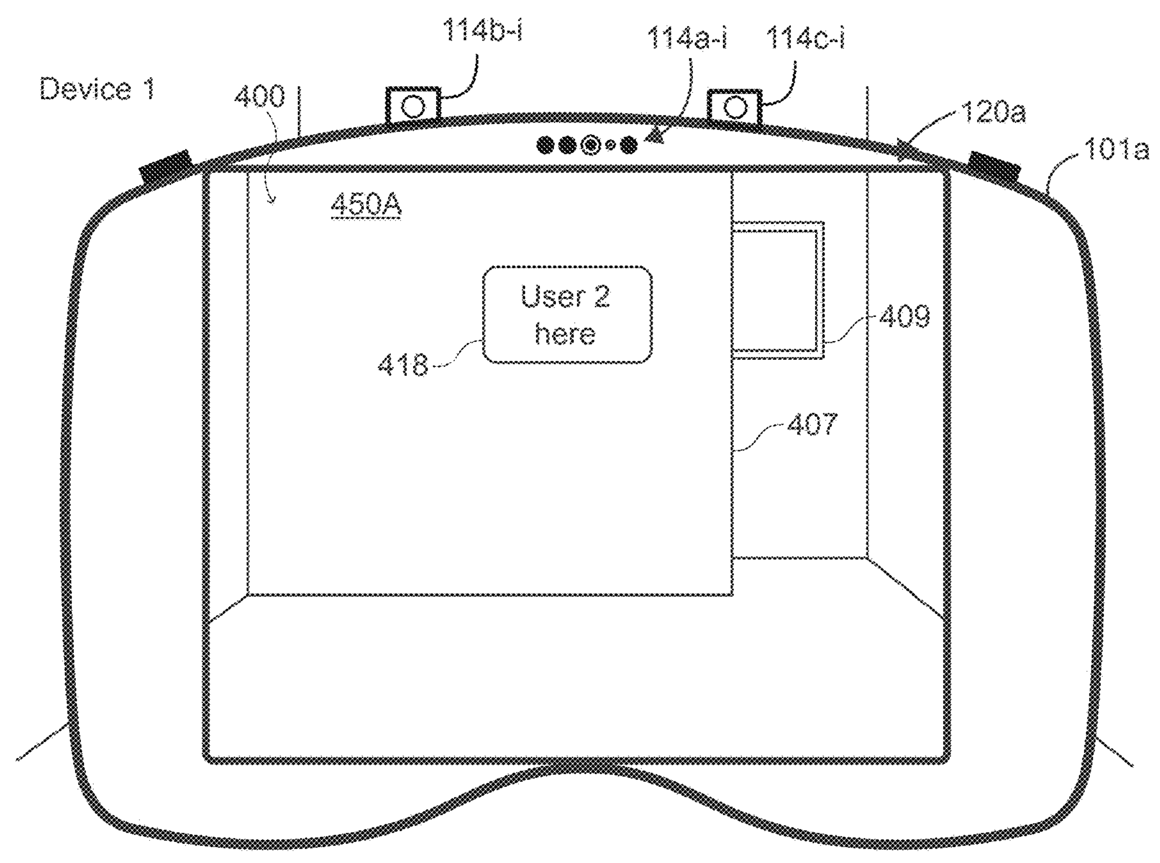
Figure 4I:
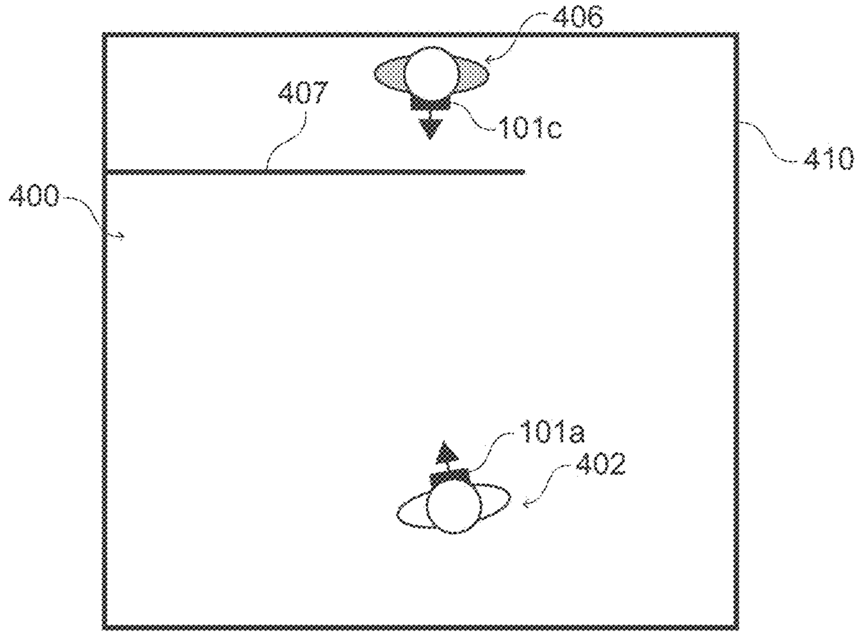

FIGS. 4A-1 through 4I illustrate example interactions with virtual content based on skeletal data associated with participants in a multi-user communication session according to some examples of the disclosure. In some examples, while a first electronic device 101*a* is in the multi-user communication session with a second electronic device 101*b*, three-dimensional environment 450A is presented using the first electronic device 101*a* (e.g., via display 120*a*), as shown in FIG. 4A-1, and three-dimensional environment 450B is presented using the second electronic device 101*b* (e.g., via display 120*b*), as shown in FIG. 4A-2. In some examples, the electronic devices 101*a*/101*b* optionally correspond to or are similar to electronic devices 360/370 discussed above and/or electronic devices 260/270 in FIG. 2. In some examples, as shown in FIGS. 4A-1 and 4A-2, the first electronic device 101*a* is being used by (e.g., worn on a head of) a first user 402 and the second electronic device 101*b* is being used by (e.g., worn on a head of) a second user 404.

In FIGS. 4A-1 and 4A-2, as indicated in overhead view 410, the first electronic device 101*a* and the second electronic device 101*b* are collocated in physical environment 400. For example, the first electronic device 101*a* and the second electronic device 101*b* are both located in a same room that includes wall/partition 407, window 409, and door 408. In some examples, the determination that the first electronic device 101*a* and the second electronic device 101*b* are collocated in the physical environment 400 is based on a distance between the first electronic device 101*a* and the second electronic device 101*b*. For example, in FIGS. 4A-1 and 4A-2, the first electronic device 101*a* and the second electronic device 101*b* are collocated in the physical environment 400 because the first electronic device 101*a* is within a threshold distance (e.g., 0.1, 0.5, 1, 2, 3, 5, 10, 15, 20, etc. meters) of the second electronic device 101*b*. In some examples, the determination that the first electronic device 101*a* and the second electronic device 101*b* are collocated in the physical environment 400 is based on communication between the first electronic device 101*a* and the second electronic device 101*b*. For example, in FIGS. 4A-1 and 4A-2, the first electronic device 101*a* and the second electronic device 101*b* are configured to communicate (e.g., wirelessly, such as via Bluetooth, Wi-Fi, or a server (e.g., wireless communications terminal)). In some examples, the first electronic device 101*a* and the second electronic device 101*b* are connected to a same wireless network in the physical environment 400. In some examples, the determination that the first electronic device 101*a* and the second electronic device 101*b* are collocated in the physical environment 400 is based on a strength of a wireless signal transmitted between the electronic device 101*a* and 101*b*. For example, in FIGS. 4A-1 and 4A-2, the first electronic device 101*a* and the second electronic device 101*b* are collocated in the physical environment 400 because a strength of a Bluetooth signal (or other wireless signal) transmitted between the electronic devices 101*a* and 101*b* is greater than a threshold strength. In some examples, the determination that the first electronic device 101*a* and the second electronic device 101*b* are collocated in the physical environment 400 is based on visual detection of the electronic devices 101*a* and 101*b* in the physical environment 400. For example, as shown in FIG. 4A-1, the second electronic device 101*b* is positioned in a field of view of the first electronic device 101*a* (e.g., because the second user 404 is standing in the field of view of the first electronic device 101*a*), which enables the first electronic device 101*a* to visually detect (e.g., identify or scan, such as via object detection or other image processing techniques) the second electronic device 101*b* (e.g., in one or more images captured by the first electronic device 101*a*, such as via external image sensors 114*b-i* and 114*c-i*). Similarly, as shown in FIG. 4A-2, the first electronic device 101*a* is optionally positioned in a field of view of the second electronic device 101*b* (e.g., because the first user 402 is standing in the field of view of the second electronic device 101*b*), which enables the second electronic device 101*b* to visually detect the first electronic device 101*a* (e.g., in one or more images captured by the second electronic device 101*b*, such as via external image sensors 11*b-ii* and 114*c-ii*).

In some examples, the three-dimensional environments 450A/450B include captured portions of the physical environment 400 in which the electronic devices 460/470 are located. For example, because the first electronic device 101*a* and the second electronic device 101*b* are collocated in the physical environment 400, the three-dimensional environments 450A and 450B include the wall 407 (e.g., a representation of the wall), the window 409 (e.g., a representation of the window), and the door 408 (e.g., a representation of the door), but from the unique viewpoints of the first electronic device 101*a* and the second electronic device 101*b*, as shown in FIGS. 4A-1 and 4A-2. In some examples, the representations can include portions of the physical environment 400 viewed through a transparent or translucent display of the electronic devices 101*a* and 101*b*. In some examples, the three-dimensional environments 450A/450B have one or more characteristics of the three-dimensional environments 350A/350B described above with reference to FIG. 3.

As described above with reference to FIG. 3, while electronic devices are communicatively linked in a multi-user communication session, users may be represented by avatars corresponding to the users of the electronic devices. In FIGS. 4A-1 and 4A-2, because the first electronic device 101*a* and the second electronic device 101*b* are collocated in the physical environment 400, the users of the electronic devices 101*a* and 101*b* are represented in the multi-user communication session via their physical personas (e.g., bodies) that are visible in passthrough of the physical environment 400 (e.g., rather than via virtual avatars). For example, as shown in FIG. 4A-1, the second user 404 is visible in the field of view of the first electronic device 101*a* and, as shown in FIG. 4A-2, the first user 402 is visible in the field of view of the second electronic device 101*b* while the first electronic device 101*a* and the second electronic device 101*b* are in the multi-user communication session. As similarly discussed above with reference to FIG. 3, if a third user who is non-collocated in the physical environment 400 (e.g., a remote user) joins the multi-user communication session, the third user is represented via an avatar (e.g., a visual representation) in the three-dimensional environments 450A and 450B.

As similarly described above with reference to FIG. 3, while the first user 402 of the first electronic device 101*a* and the second user 404 of the second electronic device 101*b* are collocated in the physical environment 400 and while the first electronic device 101*a* is in the multi-user communication session with the second electronic device 101*b*, the first user 402 and the second user 404 may be in a first spatial group within the multi-user communication session In some examples, the first spatial group has one or more characteristics of spatial group 340 discussed above with reference to FIG. 3. As similarly described above, while the first user 402 and the second user 404 are in the first spatial group within the multi-user communication session, the users have a first spatial arrangement in the shared three-dimensional environment (e.g., represented by the locations of and/or distance between the users 402 and 404 in the overhead view 410 in FIG. 4A) determined by the physical locations of the electronic devices 101*a* and 101*b* in the physical environment 440. Particularly, the first electronic device 101*a* and the second electronic device 101*b* experience spatial truth within the first spatial group as dictated by the physical locations of and/or orientations of the first user 402 and the second user 404, respectively.

In FIG. 4B, while the first electronic device 101*a* is collocated with the second electronic device 101*b* in the physical environment 400 (e.g., and optionally while the first electronic device 101*a* is in a multi-user communication session with the second electronic device 110*b*), the first electronic device 101*a* and the second electronic device 101*b* share skeletal data associated with the first user 402 and the second user 404, respectively (e.g., despite the first electronic device 101*a* and the second electronic device 101*b* being collocated in the physical environment 400). For example, as discussed herein below, the tracking of skeletal data associated with local users (e.g., in spite of avatars corresponding to the local users not necessarily being displayed as discussed above) enables the first electronic device 101*a* and the second electronic device 101*b* to more efficiently facilitate and synchronize operations within the multi-user communication session, such as interactions related to the display of and/or interaction with virtual content. Particularly, in some examples, the first electronic device 101*a* transmits (e.g., wirelessly directly or indirectly via a server) skeletal data associated with the first user 402 to the second electronic device 101*b*, and the second electronic device 101*b* transmits skeletal data associated with the second user 404 to the first electronic device 101*a*.

In some examples, the skeletal data associated with the first user 402 and the second user 404 include body (e.g., skeleton) pose data corresponding to the first user 402 and the second user 404. For example, the skeletal data associated with the first user 402 includes information corresponding to a position and/or orientation of the first user 402 relative to an origin of the first spatial group (e.g., a geometric center of the shared coordinate system of the first spatial group, such as origin 530 discussed with reference to FIG. 5B below), and the skeletal data associated with the second user 404 includes information corresponding to a position and/or orientation of the second user 404 relative to the origin of the first spatial group. For example, as indicated in the overhead view 410 in FIG. 4A-2, the first electronic device 101*a* is located at a first location relative to the origin of the first spatial group and the second electronic device 101*b* is located at a second location, different from the first location, relative to the origin 431. Furthermore, the first electronic device 101*a* is located a first distance from the origin and the second electronic device 101*b* is located a second distance (e.g., different from or equal to the first distance) from the origin. Additionally, in some examples, the origin enables virtual content (e.g., shared applications, user interfaces, three-dimensional objects/models, etc.) that is presented in the shared three-dimensional environment to be positioned at a same location within the first spatial group for all local users (e.g., by positioning the virtual content relative to the origin).

In some examples, the origin (e.g., and thus the shared coordinate system) discussed above is defined based on the physical environment 400 (e.g., the physical room in which the first electronic device 101*a* and the second electronic device 101*b* are located). In some examples, the first electronic device 101*a* and the second electronic device 101*b* are each configured to analyze the physical environment 400 to determine the origin (e.g., and the shared coordinate system) based on Simultaneous Localization and Mapping (SLAM) data exchanged between the first electronic device 101*a* and the second electronic device 101*b* (e.g., SLAM data individually stored on the electronic devices 101*a* and 101*b* or SLAM data stored on one of the electronic devices 101*a* and 101*b*). For example, the first electronic device 101*a* and the second electronic device 101*b* utilize the SLAM data to facilitate shared understanding of one or more physical properties of the physical environment 400, such as dimensions of the physical environment, physical objects within the physical environment, a visual appearance (e.g., color and lighting characteristics) of the physical environment, etc., according to which the origin may be defined in the first spatial group. In some examples, the first electronic device 101*a* and the second electronic device 101*b* are each configured to analyze the physical environment 400 to determine the origin based on one or more characteristics of the other electronic device as perceived by the electronic devices individually. For example, based on one or more images captured via the external image sensors 114*b-i* and 114*c-i*, the first electronic device 101*a* analyzes a position of the second electronic device 101*b* in the physical environment relative to the viewpoint of the first electronic device 101*a* and, based on one or more images captured via the external image sensors 114*b-ii* and 114*c-ii*, the second electronic device 101*b* analyzes a position of the first electronic device 101*a* in the physical environment 400 relative to the viewpoint of the second electronic device 101*b* to establish spatial truth within the first spatial group and thus define the origin.

In some examples, the skeletal data associated with the first user 402 and the second user 404 include information corresponding to one or more physical characteristics of the first user 402 and the second user 404. For example, the skeletal data associated with the first user 402 includes information corresponding to a height and/or size (e.g., weight) of the first user 402, and the skeletal data associated with the second user 404 includes information corresponding to a height and/or size of the second user 404. In some examples, the skeletal data associated with the first user 402 and the second user 404 include information corresponding to movement of one or more portions of the first user 402 and the second user 404. For example, the skeletal data associated with the first user 402 includes information corresponding to one or more joints of an upper body of the first user 402 (e.g., joints of the fingers, hands, and/or arms of the first user 402) in space, and the skeletal data associated with the second user 404 includes information corresponding to one or more joints of an upper body of the second user 404 (e.g., joints of the fingers, hands, and/or arms of the second user 404) in space. In some examples, the skeletal data associated with the first user 402 and the second user 404 include information corresponding to one or more physical objects associated with the first user 402 and the second user 404. For example, the one or more physical objects include glasses being worn by the first user 402 and/or the second user 404, a chair or wheelchair being sat in by the first user 402 and/or the second user 404, a cane, walker or other assistive object being used by the first user 402 and/or the second user 404, etc.

In some examples, the first electronic device 101*a* and the second electronic device 101*b* determine the skeletal data associated with the first user 402 and the second user 404, respectively, via one or more input devices and/or sensors (e.g., cameras) of the first electronic device 101*a* and the second electronic device 101*b*. For example, in FIG. 4A-1, the first electronic device 101*a* determines the skeletal data associated with the first user 402 based on images captured using one or more internal facing cameras (e.g., the one or more internal image sensors 114*a-i*) and/or one or more outward facing cameras (e.g., the one or more external image sensors 114*b-i* and 114*c-i*). Similarly, in FIG. 4A-2, the second electronic device 101*b* optionally determines the skeletal data associated with the second user 404 based on images captured using one or more internal facing cameras (e.g., the one or more internal image sensors 114*a-ii*) and/or one or more outward facing cameras (e.g., the one or more external image sensors 114*b-ii* and 114*c-ii*). It should be understood that, in some examples, the skeletal data associated with the first user 402 and the second user 404 may additionally or alternatively be determined using any one or combination of the sensors discussed with reference to FIG. 2. In some examples, the skeletal data associated with the first user 402 and the second user 404 is determined based on information provided by the first user 402 and the second user 404. For example, the information corresponding to the height and/or size (e.g., weight) of the first user 402 is provided by the first user 402 (e.g., via user input, such as when setting up a user profile associated with the first user 402) to the first electronic device 101*a* and is stored in memory of the first electronic device 101*a*. Similarly, the information corresponding to the height and/or size of the second user 404 is optionally provided by the second user 404 (e.g., via user input, such as when setting up a user profile associated with the second user 404) to the second electronic device 101*b* and is stored in memory of the second electronic device 101*b*.

In some examples, the skeletal data associated with the first user 402 and the second user 404 are exchanged between the first electronic device 101*a* and the second electronic device 101*b* when the first electronic device 101*a* initially enters the multi-user communication session with the second electronic device (e.g., upon generation and/or synchronization of the shared coordinate space of the first spatial group discussed above). In some examples, while the first electronic device 101*a* is in the multi-user communication session with the second electronic device 101*b*, the skeletal data associated with the first user 402 and the second user 404 are exchanged between the first electronic device 101*a* and the second electronic device 101*b* periodically (e.g., at regular and/or predetermined time intervals, such as multiple times a second or every 1 second, 5 seconds, 30 seconds, 60 seconds, 120 seconds, 3 minutes, 5 minutes, 10 minutes, 30 minutes, etc.). In some examples, while the first electronic device 101*a* is in the multi-user communication session with the second electronic device 101*b*, the skeletal data associated with the first user 402 and the second user 404 are exchanged between the first electronic device 101*a* and the second electronic device 101*b* in response to detecting user input (e.g., hand-based input and/or gaze-based input), as discussed in more detail herein.

In some examples, the skeletal data that is exchanged among electronic devices in a multi-user communication session that includes collocated participants (e.g., local users) corresponds to and/or is the same as the skeletal data that is exchanged among electronic devices in a multi-user communication session that includes non-collocated participants (e.g., remote users). For example, in FIGS. 4A-1 and 4A-2, if the multi-user communication session included a third electronic device associated with a third user, and the third electronic device is non-collocated with the first electronic device 101*a* and the second electronic device 101*b* in the physical environment 400 (e.g., the third user is located in a second, separate physical environment), the skeletal data exchanged between the first electronic device 101*a* and the second electronic device 101*b* (e.g., the collocated electronic devices) is the same as (e.g., includes the same information as) the skeletal data exchanged between the first electronic device 101*a* or the second electronic device 101*b* and the third electronic device (e.g., the non-collocated electronic device). Alternatively, in some examples, the skeletal data that is exchanged among electronic devices in a multi-user communication session that includes collocated participants (e.g., local users) does not correspond to and/or is at least partially different from the skeletal data that is exchanged among electronic devices in a multi-user communication session that includes non-collocated participants (e.g., remote users). For example, in FIGS. 4A-1 and 4A-2, if the multi-user communication session included a third electronic device associated with a third user, and the third electronic device is non-collocated with the first electronic device 101*a* and the second electronic device 101*b* in the physical environment 400 (e.g., the third user is located in a second, separate physical environment), the skeletal data exchanged between the first electronic device 101*a* and the second electronic device 101*b* (e.g., the collocated electronic devices) is different from (e.g., includes the different information from and/or includes a subset of the information of) the skeletal data exchanged between the first electronic device 101*a* or the second electronic device 101*b* and the third electronic device (e.g., the non-collocated electronic device). As another example, the skeletal data that is exchanged among electronic devices in a multi-user communication session that includes collocated participants is exchanged at different rates (e.g., faster or lower rates) than the skeletal data that is exchanged among electronic devices in a multi-user communication session that includes non-collocated participants. As an example, the skeletal data associated with the local users (e.g., the first user 402 and the second user 404) includes information related to the pose of the local users, the height and/or size of the local users, and/or movements of the joints of the upper bodies of the local users but does not include information related to facial texture and/or expression (e.g., smiles, frowns, laughs, etc.) of the local users (e.g., because the avatars corresponding to the local users are not rendered/displayed for the local users as discussed above). However, in such an instance, the skeletal data associated with the third user (e.g., the remote user) would include the information related to the facial texture and/or expression of the third user (e.g., in addition to the other information discussed above).

In some examples, as mentioned previously above, the skeletal data associated with the first user 402 and the second user 404 that are exchanged between the first electronic device 101*a* and the second electronic device 101*b* aids the first electronic device 101*a* and the second electronic device 101*b* in facilitating interactions within the multi-user communication session (e.g., by helping improve device responsiveness to user input). In FIGS. 4B-1 and 4B-2, while the first electronic device 101*a* and the second electronic device 101*b* are in the multi-user communication session, the first electronic device 101*a* detects an input provided by the first user 402 corresponding to a request to display one or more session controls for the multi-user communication session. For example, as shown in FIGS. 4B-1 and 4B-2, the first electronic device 101*a* detects an air gesture (e.g., an air pinch gesture, an air tap or touch gesture, etc.) provided by hand 403 of the first user 402, optionally while gaze 425 is directed to the second user 404 in the three-dimensional environment 450A. It should be understood that, in some examples, the first electronic device 101*a* detects an alternative input provided by the first user 402 that corresponds to a selection of the second user 404 in the three-dimensional environment 450A, such as a gaze dwell directed to the second user 404 or a verbal command.

In some examples, as shown in FIG. 4C-1, in response to detecting the input corresponding to a selection of the second user 404 in the three-dimensional environment 450A, the first electronic device 101*a* displays communication session user interface 415 in the three-dimensional environment 450A. In some examples, as indicated in FIG. 4C-1, the communication session user interface 415 includes one or more controls for the multi-user communication session. For example, as shown in FIG. 4C-1, the communication session user interface 415 includes video option 416*a* that is selectable to initiate video communication with the second user 404 (e.g., "Jill") while in the multi-user communication session (e.g., display a video conferencing user interface in the three-dimensional environment 450A that includes a (e.g., live) video stream of the second user 404 (e.g., captured via one or more cameras of the second electronic device 101*b*)). Additionally, in some examples, the communication session user interface 415 includes mute option 416*b* that is selectable to disable/enable audio captured by the first electronic device 101*a* (e.g., causing a microphone of the first electronic device 101*a* to be deactivated/activated), share option 416*c* that is selectable to initiate a process to share content in the multi-user communication session (e.g., with the second user 404), and end option 416*d* that is selectable to end the multi-user communication session between the first electronic device 101*a* and the second electronic device 101*b*. In some examples, as shown in FIG. 4C-1, the communication session user interface 415 is displayed with movement element 435 (e.g., a grabber bar) in the three-dimensional environment 450A. In some examples, the movement element 435 is selectable to trigger spatial refinement in the three-dimensional environment 450A/450B. In some examples, spatial refinement corresponds to movement and/or repositioning of avatars and/or shared objects (e.g., triggered by the movement of a shared object or the movement element 435) that enables spatial truth to be maintained within the first spatial group of the first user 402 and the second user 404. In some examples, the communication session user interface 415 (e.g., and the movement element 435) is displayed at a location in the three-dimensional environment 450A that is selected based on a location of the second user 404 in the three-dimensional environment 450A from the viewpoint of the first electronic device 101*a*. For example, as indicated in the overhead view 410 in FIG. 4C-1, the communication session user interface 415 is displayed in front of the second user 404 from the viewpoint of the first electronic device 101*a* and/or at a predetermined distance from the second user 404 from the viewpoint of the first electronic device 101*a* in the three-dimensional environment 450A.

Additionally, in some examples, the communication session user interface 415 includes information option or participant option 417, as shown in FIG. 4C-1. In some examples, the information option 417 is selectable to cause the first electronic device 101*a* to display a list and/or other visual indication of participants who are currently active in the multi-user communication session (e.g., within the communication session user interface 415), as described in more detail below.

In some examples, the display of the communication session user interface 415 (e.g., and the movement element 435) is performed using the skeletal data associated with the first user 402 and the second user 404. For example, in FIGS. 4B-1 and 4B-2, the first electronic device 101*a* uses the skeletal data associated with the first user 402 to determine the gaze direction and/or location in the three-dimensional environment 450A (e.g., to determine the location of gaze 425 in FIG. 4B-1), such as based on information corresponding to movement and/or focus of the eyes of the first user 402. In some examples, utilizing the skeletal data associated with the first user 402 to identify the second user 404 as the target of the selection input provided by the hand 403 discussed above with reference to FIGS. 4B-1 and 4B-2 (e.g., in addition to sensor input, such as input detected via the one or more internal image sensors 114*a*-i) aids the first electronic device 101*a* in distinguishing the second user 404 from other users (e.g., persons) present in the physical environment 400, such as third user 406. For example, as shown in FIGS. 4A-1 through 4C-1, the physical environment 400 includes the third user 406 who is located in the field of view of the first electronic device 101*a* and the second electronic device 101*b*. Additionally, as shown in FIG. 4B-1, for example, the third user 406 is located adjacent to (e.g., to the right of) the second user 404 in the three-dimensional environment 450A from the viewpoint of the first electronic device 101*a*. In FIG. 4B-1, when the first electronic device 101*a* detects the air gesture provided by the hand 403 of the first user 402, the third user 406 is not a participant in the multi-user communication session that includes the first electronic device 101*a* and the second electronic device 101*b*. Accordingly, the skeletal data associated with the first user 402 enables the first electronic device 101*a* to identify the second user 404 as the target of the input provided by the hand 403 of the first user 402 (e.g., as opposed to the third user 406). Additionally, in some examples, the skeletal data associated with the second user 404 (e.g., provided to the first electronic device 101*a* by the second electronic device 101*b*) further aids the first electronic device 101*a* in identifying the second user 404 as the target of the input provided by the hand 403 of the first user 402. For example, as previously discussed above, the skeletal data associated with the second user 404 includes information corresponding to the location of the second user 404 in the three-dimensional environment 450A relative to the viewpoint of the first electronic device 101*a* (e.g., relative to the origin of the first spatial group), which enables the first electronic device 101*a* to determine an intersection point from a gaze vector corresponding to the gaze 425 of the first user 402 extending to a point cloud or volumetric data map corresponding to the second user 404 in the three-dimensional environment 450A. In some examples, the communication session user interface 415 (e.g., and the movement element 435) is also positioned in the three-dimensional environment 450A using the skeletal data associated with the second user 404 (e.g., based on the information corresponding to the position of the second user 404).

In FIG. 4C-1, the first electronic device 101*a* detects a selection input directed to the information option 417 in the communication session user interface 415. For example, as shown in FIG. 4C-1, the first electronic device 101*a* detects an air gesture, such as an air pinch or air tap gesture, performed by the hand 403 of the first user 402, optionally while the gaze 425 of the first user 402 is directed to the information option 417 in the communication session user interface 415.

In some examples, as shown in FIG. 4C-2, in response to detecting the selection of the information option 417, the first electronic device 101*a* displays a list of the participants who are currently active in the multi-user communication session in the three-dimensional environment 450A. For example, as shown in FIG. 4C-2, the first electronic device 101*a* updates display of the communication session user interface 415 to include a visual indication of the second user 404 (e.g., Jill) and a visual indication of the first user 402 (e.g., Jack) because the first user 402 and the second user 404 are currently active in the multi-user communication session that includes the first electronic device 101*a* and the second electronic device 101*b*. In some examples, as shown in FIG. 4C-2, the list of the participants includes an image representing the users (e.g., a photograph, contact poster, icon, or other visual representation) and/or a name (or username) corresponding to the users who are currently active in the multi-user communication session. Alternatively, in some examples, the first electronic device 101*a* displays the list of participants as a separate and/or within a separate user interface element in the three-dimensional environment 450A. For example, the first electronic device 101*a* displays the list of participants within a user interface element that is overlaid on the communication session user interface 415 or adjacent to the communication session user interface 415 (e.g., above, below, or to a side of the communication session user interface 415) in the three-dimensional environment 450A from the viewpoint of the first electronic device 101*a*. As another example, the first electronic device 101*a* may update display of a portion of the communication session user interface 415 to include the list of participants (e.g., while maintaining display of other portions of the communication session user interface 415, such as the information option 417) in the three-dimensional environment 450A. In some examples, the first electronic device 101*a* reverts to the display of the communication session user interface 415 shown in FIG. 4C-1 in response to detecting a second selection of the information option 417 (e.g., if the information option 417 is displayed in the communication session user interface 415 when the list of participants is displayed) or in response to detecting a selection input directed to the second user 404 as similarly discussed above.

In some examples, as shown in FIG. 4C-2, when the first electronic device 101*a* updates display of the communication session user interface 415 to include the list of the participants who are currently active in the multi-user communication session, the first electronic device 101*a* displays a user interface element that provides a visual indication of where the participants who are currently active in the multi-user communication session are located spatially in the three-dimensional environment 450A relative to the viewpoint of the first electronic device 101*a*. For example, as shown in FIG. 4C-2, the first electronic device 101*a* displays user interface element 419 in the three-dimensional environment 450A that provides a visual indication that the second user 404 corresponds to "Jill" who is listed in the list of active participants in the communication session user interface 415. In some examples, as shown in FIG. 4C-2, the first electronic device 101*a* displays the user interface element 419 at a location in the three-dimensional environment 450A that is based on a physical location of the second user 404 (e.g., and/or the second electronic device 101*b*) in the physical environment 400 from the viewpoint of the first electronic device 101*a*. For example, as shown in the overhead view 410 in FIG. 4C-2, the first electronic device 101*a* displays the user interface element 419 spatially above the second user 404 in the three-dimensional environment 450A from the viewpoint of the first electronic device 101*a*. In some examples, as similarly described above, the first electronic device 101*a* displays the user interface element 419 in the three-dimensional environment 450A based on and/or using the skeletal data provided by the second electronic device 101*b*.

Additionally, in some examples, as shown in FIG. 4C-2, when the first electronic device 101*a* displays the user interface element 419 (e.g., concurrently with the list of active participants in the communication session user interface 415), the first electronic device 101*a* displays add option 421 in the three-dimensional environment 450A. In some examples, the add option 421 is selectable to initiate a process to add a third electronic device 101*c* (e.g., associated with the third user 406) to the current multi-user communication session between the first electronic device 101*a* and the second electronic device 101*b*, as described in more detail below. In some examples, as shown in FIG. 4C-2, the first electronic device 101*a* displays the add option 421 at a location in the three-dimensional environment 450A that is based on a physical location of the third user 406 (e.g., and/or the third electronic device 101*c*) in the physical environment 400 from the viewpoint of the first electronic device 101*a*. For example, as shown in the overhead view 410 in FIG. 4C-2, the first electronic device 101*a* displays the add option 421 spatially above the third user 406 in the three-dimensional environment 450A from the viewpoint of the first electronic device 101*a*. In some examples, the first electronic device 101*a* displays the add option 421 in the three-dimensional environment 450A when displaying the list of active participants in the multi-user communication session in the communication session user interface 415 in FIG. 4C-2 because the third user 406 (e.g., and/or the third electronic device 101*c*) is known to and/or is recognized by the first electronic device 101*a*. For example, the third user 406 is associated with a contact within a contacts list (e.g., associated with a respective application, such as a phone application, messaging application, email application, social media application, contacts application, etc.) on the first electronic device 101*a*, and the first electronic device 101*a* recognizes that the third user 406 is associated with the contact within the contacts list based on a recognition of the third electronic device 101*c* (e.g., as previously discussed herein) and/or a visual association between a face of the second user 404 and the image included in the list of participants in the communication session user interface

415. In some examples, the first electronic device 101*a* displays the add option 421 in the three-dimensional environment 450A because the first electronic device 101*a* and the third electronic device 101*c* had previously engaged and/or communicated within a multi-user communication session. In some examples, the first electronic device 101*a* displays the add option 421 in the three-dimensional environment 450A because the third electronic device 101*c* is collocated with the first electronic device 101*a* in the physical environment 400, as similarly described herein. In some examples, as similarly described above, the first electronic device 101*a* displays the add option 421 in the three-dimensional environment 450A based on and/or using the skeletal data provided by the third electronic device 101*c*. Alternatively, in some examples, the first electronic device 101*a* displays the add option 421 in the three-dimensional environment 450A based on image data captured via the external image sensors 114*b-i* and/or 114*c-i*. For example, the first electronic device 101*a* utilizes the image data to determine a location and/or orientation of the third user 406 (e.g., and/or the third electronic device 101*c*) in the three-dimensional environment 450A relative to the viewpoint of the first electronic device 101*a*, and displays the add option 421 in the three-dimensional environment 450A based on the determined position and/or orientation of the third user 406.

It should be understood that, although the user interface element 419 and the add option 421 are illustrated in FIG. 4C-2 as being displayed above the second user 404 and the third user 406, respectively, alternative display locations are possible. For example, the first electronic device 101*a* may alternatively display the user interface element 419 and/or the add option 421 in front of (e.g., overlaid on a portion of the body of), besides, and/or below the second user 404 and/or the third user 406, respectively, from the viewpoint of the first electronic device 101*a* in the three-dimensional environment 450A.

In FIGS. 4D-1 and 4D-2, the first electronic device 101*a* and the second electronic device 101*b* detect an indication of a request to add the third electronic device 101*c* (e.g., associated with the third user 406) to the current multi-user communication session between the first electronic device 101*a* and the second electronic device 101*b*. For example, in FIGS. 4D-1 and 4D-2, the third user 406 discussed above has donned the third electronic device 101*c* (e.g., such that the third electronic device 101*c* is powered on and is in use by the third user 406) and has provided input to the third electronic device 101*c* for joining the current multi-user communication session. In some examples, the indication corresponds to a selection of an affordance that is displayed by the third electronic device 101*c* for joining the multi-user communication session that includes the first electronic device 101*a* and the second electronic device 101*b*. In some examples, the first electronic device 101*a* and the second electronic device 101*b* generate a notification corresponding to the request prompting the first user 402 and/or the second user 404 to accept/approve of the request from the third electronic device 101*c* to join the multi-user communication session. Alternatively, in some examples, the indication corresponds to a selection of an affordance displayed by the first electronic device 101*a* and/or the second electronic device 101*b* that is selectable to add the third electronic device 101*c* to the multi-user communication session, such as a selection of the add option 421 in FIG. 4C-2 discussed above.

In some examples, in FIGS. 4D-1 and 4D-2, when the third electronic device 101*c* joins the multi-user communication session, the third electronic device is collocated with the first electronic device 101*a* and the second electronic device 101*b*. For example, as shown in overhead view 410 in FIG. 4D-2, the third electronic device 101*c* is located (e.g., with the third user 406) in the physical environment 400 in which the first electronic device 101*a* and the second electronic device 101*b* are both located. In some examples, as similarly discussed above, while the third electronic device 101*c* is in the physical environment 400, the third electronic device 101*c* is within the threshold distance (e.g., discussed above) of the first electronic device 101*a* and/or the second electronic device 101*b*. Additionally, in some examples, as shown in FIGS. 4D-1 and 4D-2, the third electronic device 101*c* is in the field of view of the first electronic device 101*a* and/or the second electronic device 101*b*.

In some examples, as similarly described above, when the third electronic device 101*c* joins the multi-user communication session that includes the first electronic device 101*a* and the second electronic device 101*b*, the third electronic device 101*c* shares (e.g., transmits) skeletal data associated with the third user 406 with the first electronic device 101*a* and the second electronic device 101*b*. For example, as similarly discussed herein, the third electronic device 101*c* provides (e.g., wirelessly) to the first electronic device 101*a* and the second electronic device 101*b* information corresponding to a pose (e.g., orientation and/or position) of the third user 406 relative to the origin in the first spatial group, a height and/or size (e.g., weight) of the third user 406, one or more physical objects associated with the third user 406 (e.g., glasses, wheelchairs or wheel scooters, canes, etc.), and/or positions of and/or movement of one or more joints of the upper body of the third user 406 (e.g., the joints of the fingers, hands, and/or arms of the third user 406). In some examples, the third electronic device 101*c* determines the skeletal data associated with the third user 406 in a same or similar manner as discussed above with reference to the first electronic device 101*a* and the second electronic device 101*b* determining the skeletal data associated with the first user 402 and the second user 404. Additionally, in some examples, as similarly discussed above, the third electronic device 101*c* receives the skeletal data associated with the first user 402 and the skeletal data associated with the second user 404 (e.g., from the first electronic device 101*a* and the second electronic device 101*b*) when the third electronic device 101*c* joins the multi-user communication session.

In some examples, as shown in FIGS. 4D-1 and 4D-2, when the third electronic device 101*c* joins the multi-user communication session that includes the first electronic device 101*a* and the second electronic device 101*b*, the first electronic device 101*a* and the second electronic device 101*b* display message element 412 (e.g., a notification) indicating that the third electronic device 101*c* has joined the multi-user communication session (e.g., that the third user 406 is now participating in the multi-user communication session). In some examples, the first electronic device 101*a* and the second electronic device 101*b* display the message element 412 in the three-dimensional environment 450A/450B using the skeletal data associated with the third user 406. For example, as shown in FIGS. 4D-1 and 4D-2, the first electronic device 101*a* and the second electronic device 101*b* display the message element 412 at a location that corresponds to the location of the third user 406 in the three-dimensional environment 450A/450B using the information corresponding to the location of the third user 406 included in the skeletal data associated with the third user 406 (e.g., rather than and/or in addition to positioning the message element 412 based on the approximated location of the third user 406 visually detected via the one or more cameras of the first electronic device 101*a* and the second electronic device 101*b*). Particularly, the first electronic device 101 and the second electronic device 101*b* optionally display the message element 412 above the third user 406 in the three-dimensional environment 450A/450B from the viewpoints of the first electronic device 101*a* and the second electronic device 101*b*, as indicated in the overhead view 410.

In FIG. 4D-2, the first electronic device 101*a* and the third electronic device 101*c* detect an indication that the second electronic device 101*b* is and/or has exited (e.g., is no longer engaged in) the multi-user communication session. For example, as shown in the overhead view 410 in FIG. 4D-2, the second electronic device 101*b* detects movement of the second electronic device 101*b* in the physical environment 400, as indicated by arrow 471, optionally caused by movement of the second user 404 in the physical environment 400. In some examples, the movement the second user 404 in the physical environment 400 causes the second electronic device 101*b* to be located more than a threshold distance (e.g., 1, 2, 5, 10, 15, 20, 30, 40, etc. meters) from the first electronic device 101*a* and the second electronic device 101*b*, which causes the second electronic device 101*b* to leave the multi-user communication session. In some examples, the second electronic device 101*b* detects disassociation from the second user 404 (e.g., the second user 404 doffs the second electronic device 101*b* and/or logs off/out of a user profile associated with the second user 404 on the second electronic device 101*b*, such that the second electronic device 101*b* is no longer in use), which causes the second electronic device 101*b* to leave the multi-user communication session. In some examples, the second electronic device 101*b* is powered off (e.g., by the second user 404), which causes the second electronic device 101*b* to leave the multi-user communication session. In some examples, the second electronic device 101*b* detects selection of the end option 416*d* of the communication session user interface 415 discussed above with reference to FIG. 4C-1, which causes the second electronic device 101*b* to leave the multi-user communication session.

In some examples, as shown in FIG. 4E, in response to detecting the indication that the second electronic device 101 has left the multi-user communication session, the first electronic device 101*a* (e.g., and the third electronic device 101*c*) displays message element 414 (e.g., a notification) in the three-dimensional environment 450A indicating that the second electronic device 101*b* has left the multi-user communication session (e.g., that the second user 404 is no longer participating in the multi-user communication session). In some examples, the first electronic device 101*a* (e.g., and the third electronic device 101*c*) displays the message element 414 in the three-dimensional environment 450A using the skeletal data associated with the second user 404. For example, as shown in FIG. 4E, the first electronic device 101*a* displays the message element 414 at a location that corresponds to the prior location of the second user 404 in the three-dimensional environment 450A (e.g., the location of the second user 404 before leaving the multi-user communication session) using the information corresponding to the location of the second user 404 included in the skeletal data associated with the second user 404 (e.g., rather than and/or in addition to positioning the message element 414 based on the last approximated location of the second user 404 visually detected via the one or more cameras of the first electronic device 101*a* prior to the second electronic device 101*b* leaving the multi-user communication session). Particularly, as indicated in the overhead view 410 in FIG. 4E, the first electronic device 101*a* (e.g., and the third electronic device 101*c*) optionally displays the message element 414 at the location of the second user 404 shown in the overhead view 410 in FIG. 4D-2.

In FIG. 4F, the third electronic device 101*c* detects movement of the third electronic device 101*c* in the physical environment 400. For example, as indicated in the overhead view 410 in FIG. 4F, the third user 406 moves in the physical environment 400, as indicated by arrow 472, which causes the third electronic device 101*c* to be moved relative to the viewpoint of the first electronic device 101*a* in the physical environment 400. In some examples, as indicated in the overhead view 410 in FIG. 4F, the movement corresponds to movement of the third electronic device 101*c* (e.g., and the third user 406) to behind the wall 407 in the physical environment 400 relative to the viewpoint of the first electronic device 101*a*.

In some examples, as shown in FIG. 4G-1, when the third user 406 moves in the physical environment 400 to behind the wall 407, the third user 406 (e.g., and the third electronic device 101*c*) is no longer visible from the viewpoint of the first electronic device 101*a*. For example, as shown in FIG. 4G-1, the third user 406 and the third electronic device 101*c* are blocked/occluded by the wall 407 relative to the viewpoint of the first electronic device 101*a*. Additionally, as shown in FIG. 4G-2, after the third user 406 has moved to behind the wall 407 in the physical environment 400 relative to the viewpoint of the first electronic device 101*a*, the field of view of three-dimensional environment 450C is updated at the third electronic device 101*c* based on the updated viewpoint of the third electronic device 101*c*. For example, as shown in FIG. 4G-2, the three-dimensional environment 450C includes painting 413 (e.g., a representation of the painting) that is visible (e.g., in passthrough), via display 120*c*, from the viewpoint of the third electronic device 101*c*.

In some examples, while in a multi-user communication session, in accordance with a determination that movement of a respective user in the physical environment 400 causes the respective user to at least partially be occluded by a portion of the physical environment 400 (e.g., by a physical object in the physical environment 400), the first electronic device 101*a* provides a visual indication of the respective user that indicates presence of the respective user through/behind the portion of the physical environment 400. In some examples, as discussed below, the visual indication of the respective user is presented in the three-dimensional environment using skeletal data associated with the respective user.

In FIG. 4G-1, as discussed above, when the third user 406 moves behind the wall 407 in the physical environment 400, the third user 406 is occluded by the wall 407 from the viewpoint of the first electronic device 101*a*. Accordingly, as alluded to above, the first electronic device 101*a* optionally displays a visual indication of the third user 406 in the three-dimensional environment 450A that indicates the location of the third user 406 relative to the viewpoint of the first electronic device 101*a*. In some examples, as shown in FIG. 4H, displaying the visual indication of the third user 406 includes presenting an avatar 426 corresponding to the third user 406 in the three-dimensional environment 450A, as shown in FIG. 4H. For example, as shown in FIG. 4H, the first electronic device 101*a* displays the avatar 426 in the three-dimensional environment 450A at a location and/or with an orientation corresponding to the location and/or orientation of the third user 406 in the physical environment

400. Thus, in some examples, the avatar 426 provides the first user 402 with a visual indication of the position of the third user 406 in the three-dimensional environment 450A while the first electronic device 101*a* and the third electronic device 101*c* are in the multi-user communication session, despite the third user 406 being physically occluded by the wall 407 from the viewpoint of the first electronic device 101*a*. In some examples, the avatar 426 has one or more characteristics of the avatars 315/317 discussed above with reference to FIG. 3.

In some examples, as shown in FIG. 4I, displaying the visual indication of the third user 406 alternatively includes displaying a user interface object 418 in the three-dimensional environment 450A. For example, as shown in FIG. 4I, the first electronic device 101*a* displays the user interface object 418 at a location in the three-dimensional environment 450A that corresponds to the location of the third user 406 in the physical environment 400. In some examples, the first electronic device 101*a* displays the user interface object 418 rather than the avatar 426 discussed above based on user activity of the third user 406. For example, the third user 406 may be interacting with an application that is private to the third user 406 on the third electronic device 101*c* and/or may be engaged in a private phone or video call on the third electronic device 101*c*, which causes the first electronic device 101*a* to display the user interface object 418 rather than the avatar 426 to preserve privacy of the third user 406. As another example, the third user 406 may be speaking with another person in the physical environment 400 (e.g., who may not necessarily be participating in the multi-user communication session), which causes the first electronic device 101*a* to display the user interface object 418 rather than the avatar 426 to preserve privacy of the third user 406 and/or the other person.

In some examples, as mentioned above, the first electronic device 101*a* displays the visual indication of the third user 406 (e.g., the avatar 426 in FIG. 4H or the user interface object 418 in FIG. 4I) based on the skeletal data associated with the third user 406 (e.g., provided to the first electronic device 101*a* from the third electronic device 101*c*). For example, as similarly discussed herein above, the skeletal data associated with the third user 406 includes information corresponding to the position and/or orientation of the third user 406 relative to the viewpoint of the first electronic device 101*a* (e.g., relative to the origin in the first spatial group). Accordingly, the skeletal data associated with the third user 406 enables the first electronic device 101*a* to determine the precise location and/or orientation of the third user 406 behind the wall 407, despite the third user 406 not being visible from the viewpoint of the first electronic device 101*a*, thereby enabling the first electronic device 101*a* to display the visual indication (e.g., the avatar 426 or the user interface object 418) at a location in the three-dimensional environment 450A that indicates the physical location of the third user 406 in the physical environment 400 relative to the viewpoint of the first electronic device 101*a*. For example, the information corresponding to the location and/or orientation of the third user 406 enables the first electronic device 101*a* to precisely render the avatar 426 corresponding to the third user 406 as being located at the same location and/or having the same orientation in the three-dimensional environment 450A. It should be understood that, in some examples, the third electronic device 101*c* similarly displays a visual indication of the first user 402 (e.g., an avatar corresponding to the first user 402 or a user interface object) in the three-dimensional environment 450C (e.g., in FIG. 4G-2) based on the skeletal data associated with the first user 402 that is provided to the third electronic device 101*c* by the first electronic device 101*a*.

Accordingly, as outlined above, providing systems and methods for displaying and/or interacting with virtual objects (e.g., avatars and/or virtual content) in a shared three-dimensional environment while in a multi-user communication session based on skeletal data associated with collocated participants in the multi-user communication session advantageously enables the collocated participants in the multi-user communication session to experience synchronized interaction with content and other users, thereby improving user-device interaction. Additionally, presenting a visual indication of a respective participant using the skeletal data associated with the respective participant in the multi-user communication session in accordance with a determination that the respective participant is at least partially occluded by a portion of the physical environment of the collocated participants enables the other participants to retain spatial awareness of the respective participant, as another benefit. Attention is now directed toward additional examples of displaying and/or interacting with virtual objects within a multi-user communication session that includes collocated users and electronic devices based on the skeletal data associated with the collocated participants.

Figures 1, 5A:
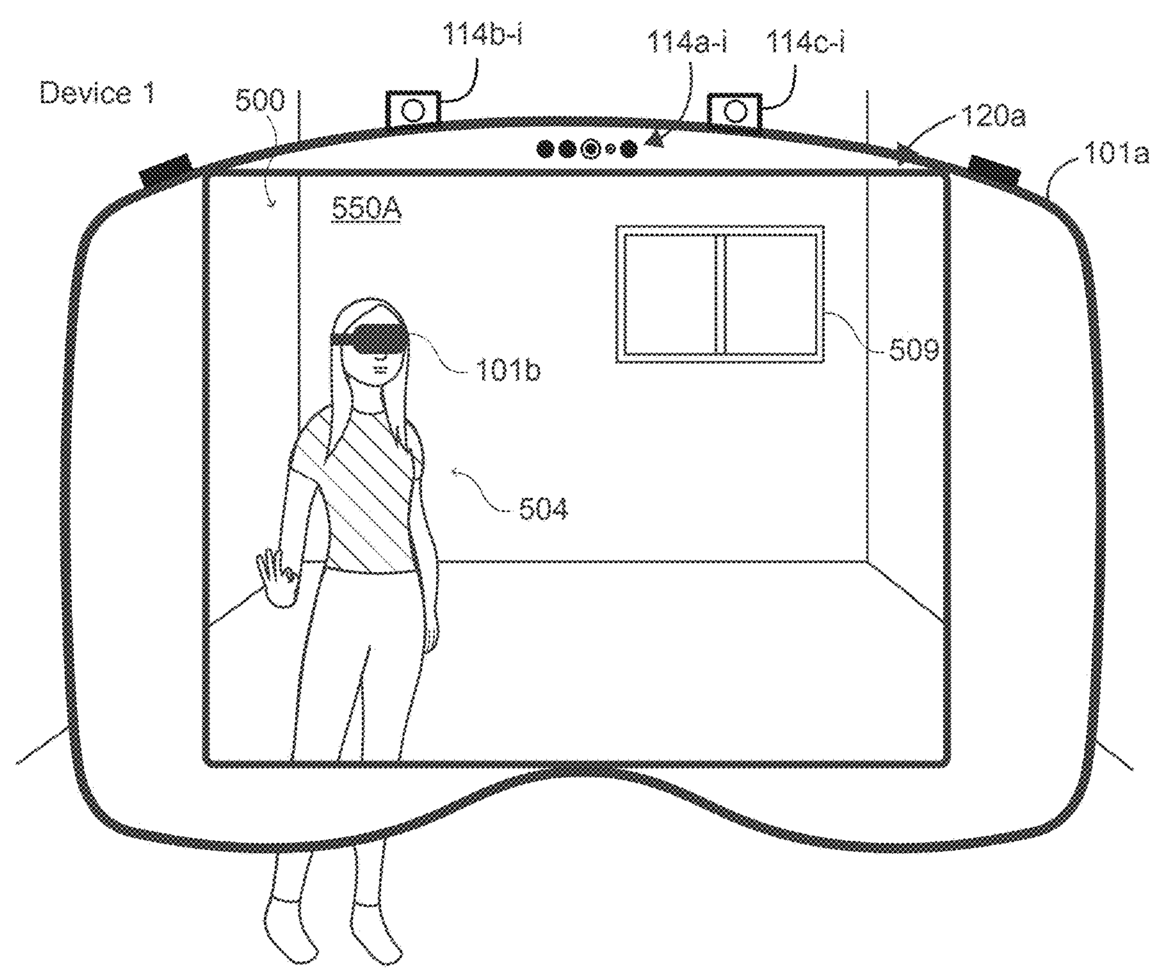
Figures 2, 5A:
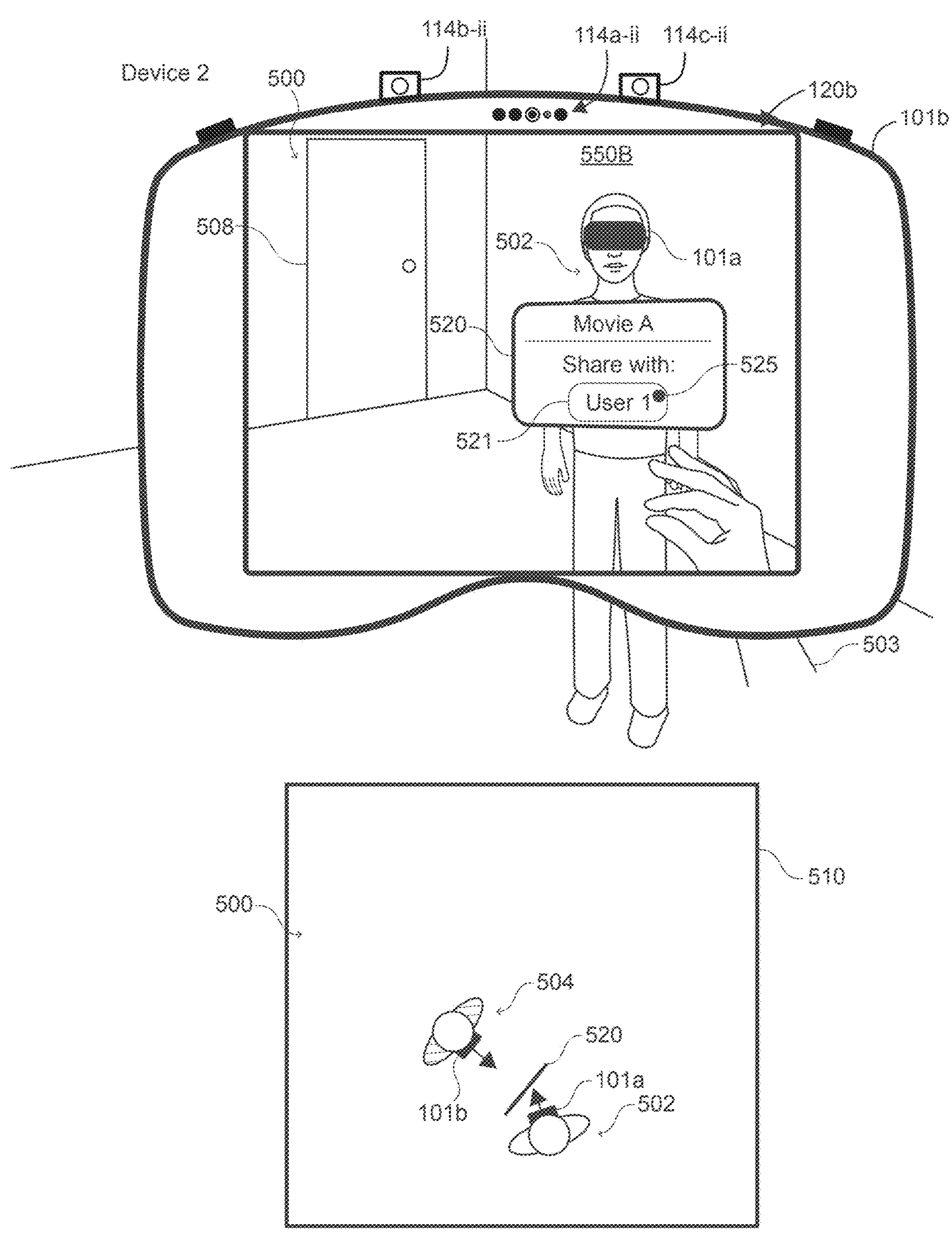
Figure 5B:
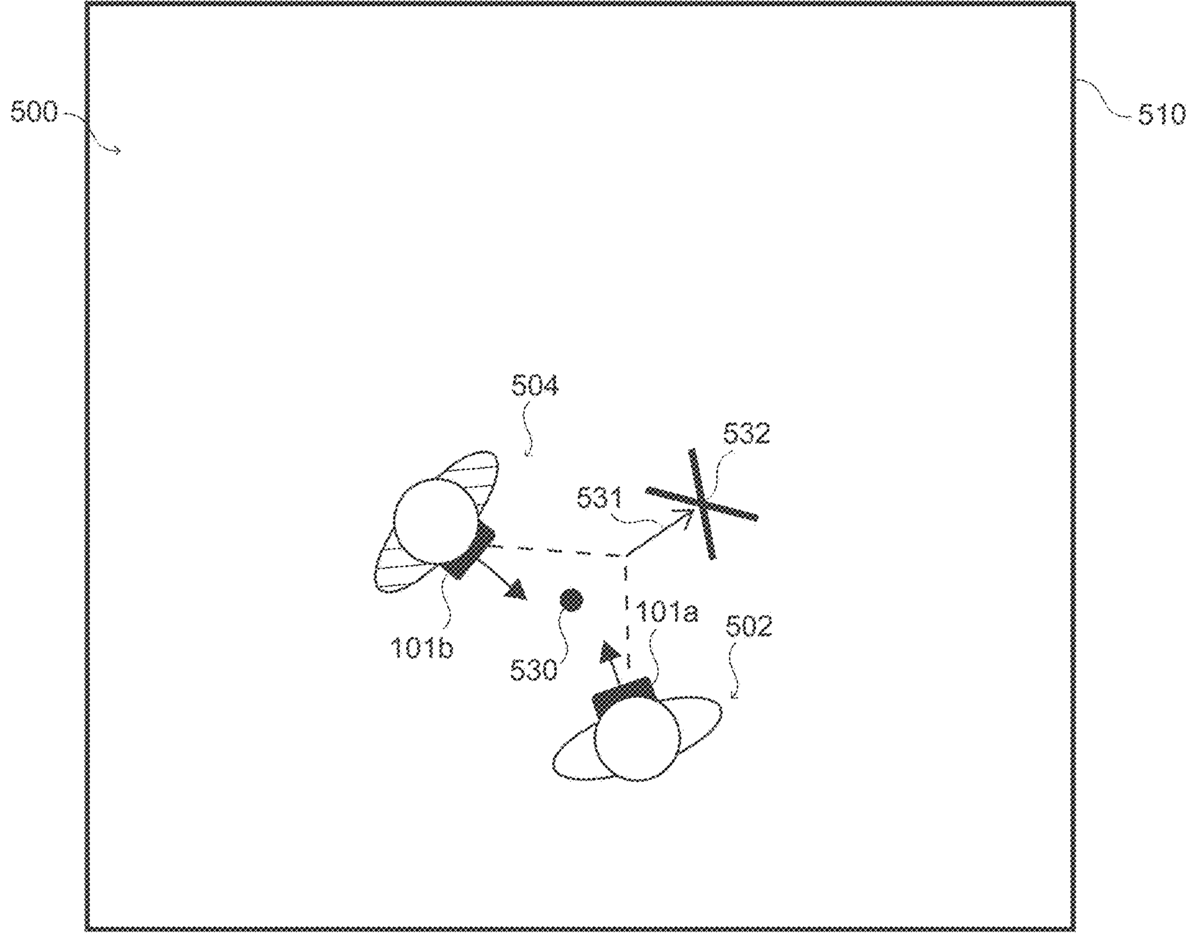
Figure 5C:
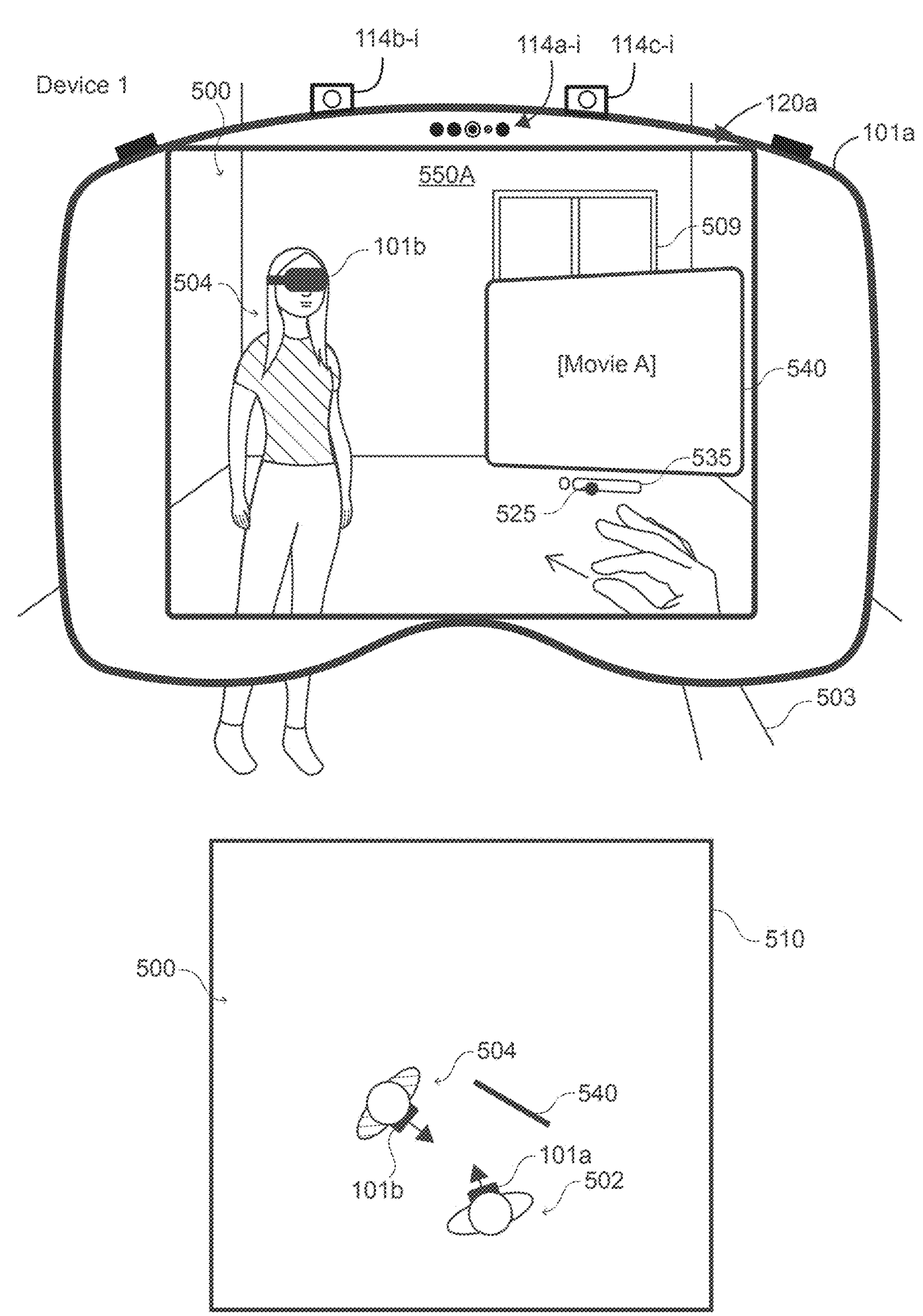
Figure 5D:
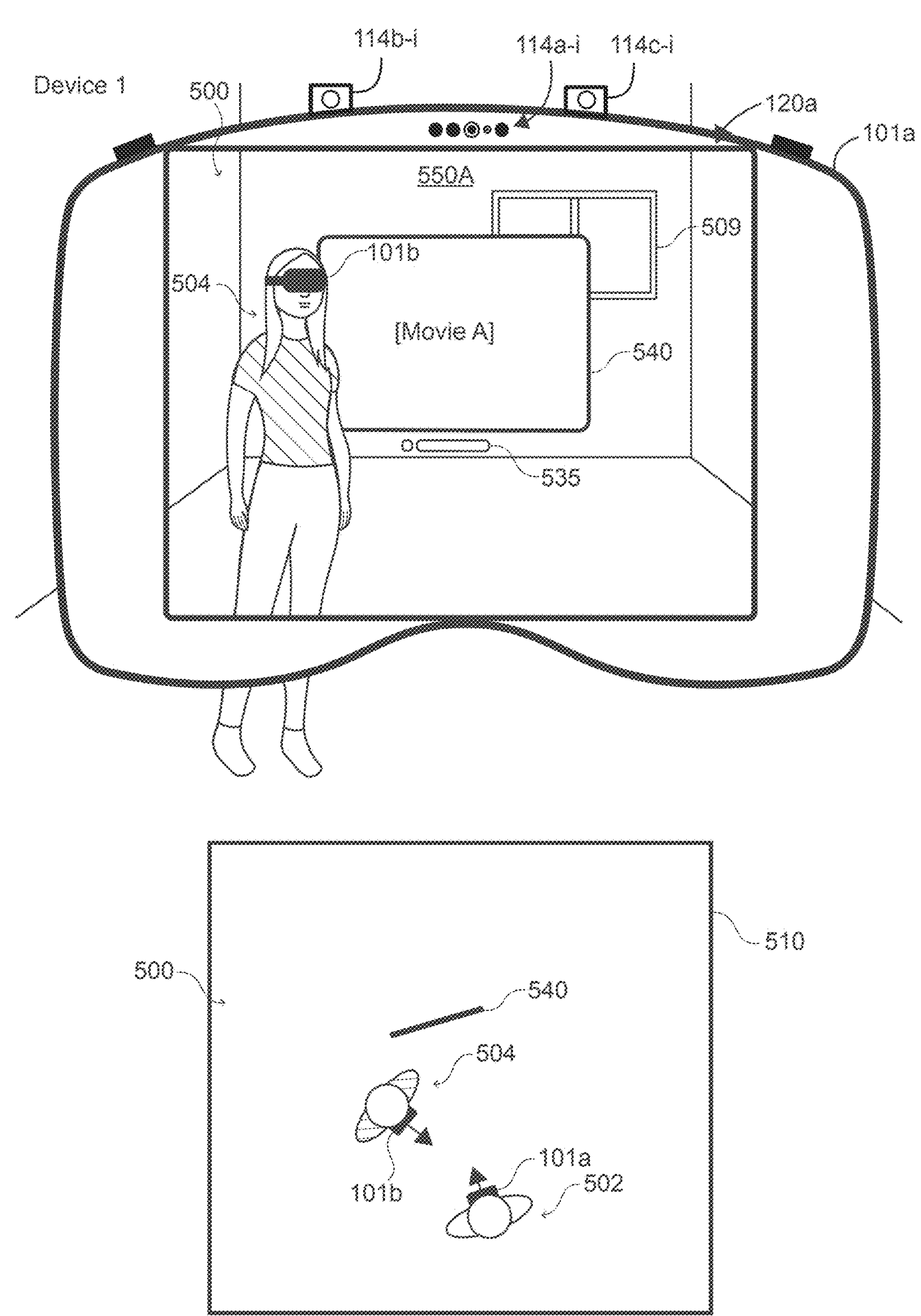
Figure 5E:
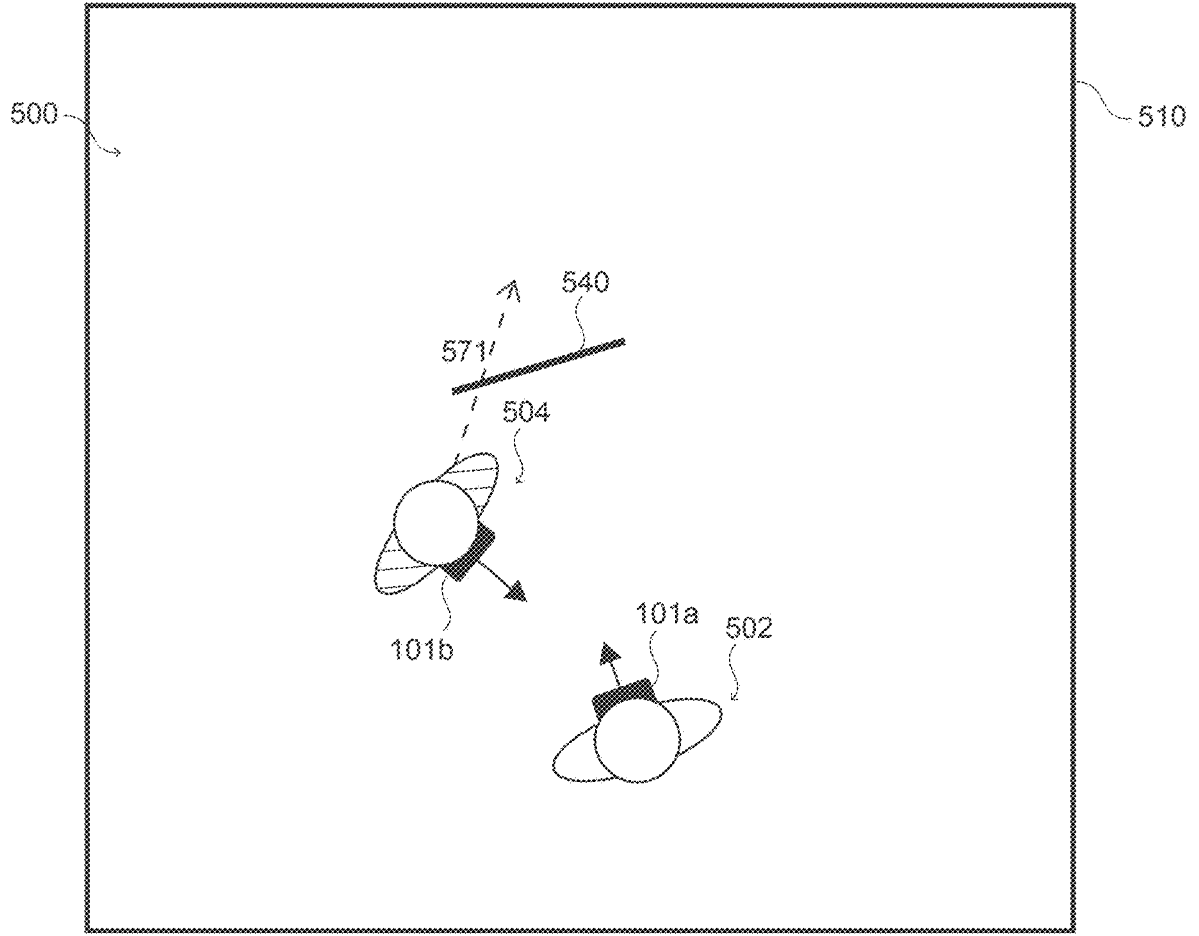
Figure 5F:
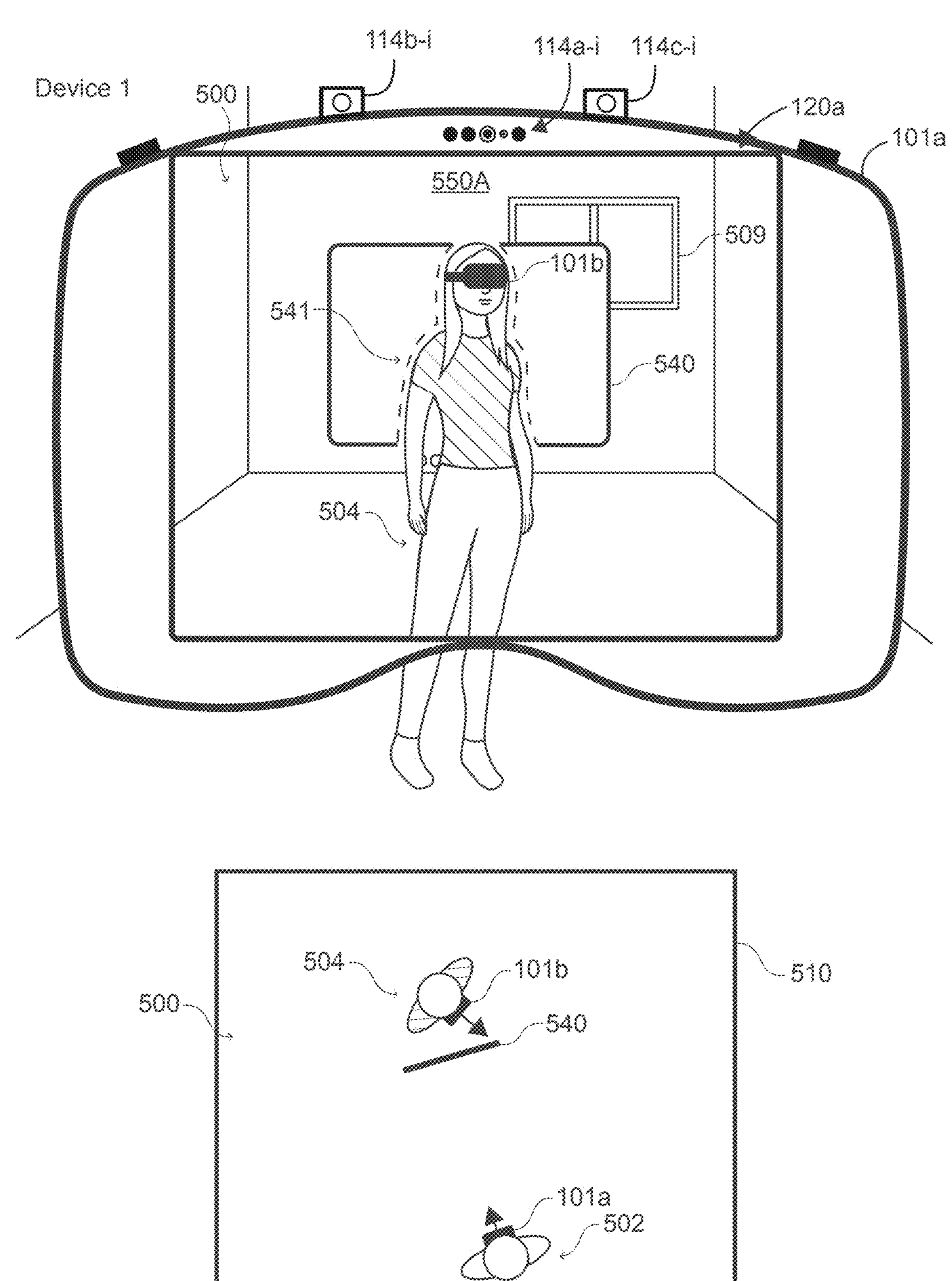
Figure 5G:
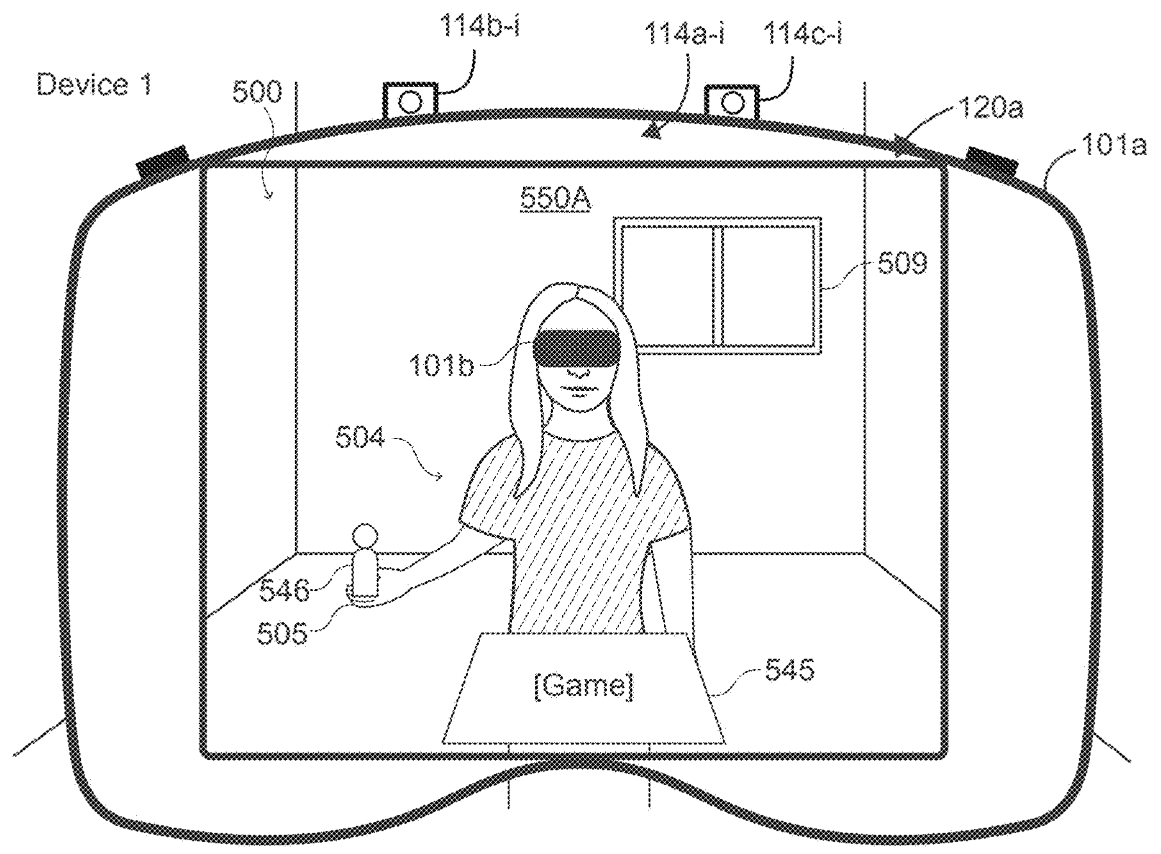
Figure 5G:
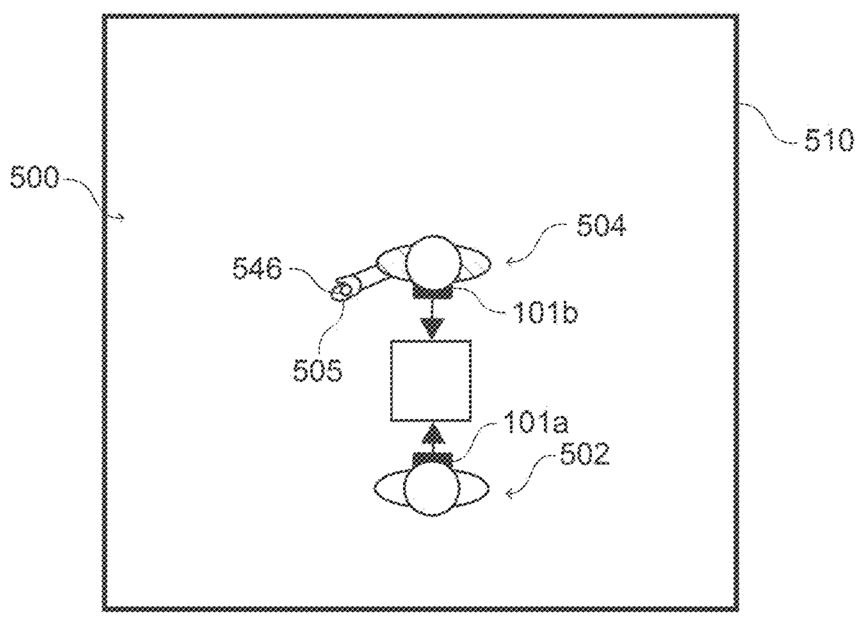

FIGS. 5A-1 through 5G illustrate example interactions with virtual content based on skeletal data associated with participants in a multi-user communication session according to some examples of the disclosure. In FIGS. 5A-1 and 5A-2, first electronic device 101*a* (e.g., associated with first user 502) and second electronic device 101*b* (e.g., associated with second user 504) are in a multi-user communication session. In some examples, the first user 502 and the second user 504 correspond to first user 402 and second user 404, respectively, of FIGS. 4A-1 through 4I. As shown in overhead view 510 in FIG. 5A-2, the first electronic device 101*a* and the second electronic device 101*b* are collocated in physical environment 500, as similarly discussed above.

As shown in FIG. 5A-1, the first electronic device 101*a* is presenting (e.g., via display 120*a*) three-dimensional environment 550A. In FIG. 5A-1, as similarly discussed above, the three-dimensional environment 550A includes representations (e.g., passthrough representations or computer-generated representations) of the physical environment 500 of the first electronic device 101*a*. Accordingly, as shown in FIG. 5A-1, the three-dimensional environment 550A presented using the first electronic device 101*a* includes representations of window 509 and the rear and side walls of the physical environment 500 (e.g., the window 509 and the rear and side walls are visible in a field of view of the first electronic device 101*a*). Additionally, as shown in FIG. 5A-1, the second user 504 (e.g., and the second electronic device 101*b*) is currently visible in the three-dimensional environment 550A from a current viewpoint of the first electronic device 101*a*. In some examples, the three-dimensional environment 550A has one or more characteristics of three-dimensional environment 450A discussed above.

Similarly, as shown in FIG. 5A-2, the second electronic device 101*b* is presenting (e.g., via display 120*b*) three-dimensional environment 550B. In FIG. 5A-2, as similarly discussed above, the three-dimensional environment 550B includes representations (e.g., passthrough representations or computer-generated representations) of the physical environment 500 of the second electronic device 101*b*. Accordingly, as shown in FIG. 5A-2, the three-dimensional environment 550B presented using the second electronic device 101*b* includes representations of door 508 and the side walls of the physical environment 500 (e.g., the door 508 and the side walls are visible in a field of view of the second electronic device 101*b*). Additionally, as shown in FIG. 5A-2, the first user 502 (e.g., and the first electronic device 101*a*) is currently visible in the three-dimensional environment 550B from a current viewpoint of the second electronic device 101*b*. In some examples, the three-dimensional environment 550B has one or more characteristics of three-dimensional environment 450B discussed above.

In FIGS. 5A-1 and 5A-2, the second electronic device 101*b* detects an input corresponding to a request to share content in the multi-user communication session (e.g., share content with the first electronic device 101*a* in the shared three-dimensional environment). As shown in FIG. 5A-2, the second electronic device 101*b* is optionally displaying user interface object 520 in the three-dimensional environment 550B. In some examples, the user interface object 520 is associated with a media player application (e.g., a movie player application) running on the second electronic device 101*b*. In some examples, the user interface object 520 includes one or more selectable options for sharing content (e.g., Movie A) in the multi-user communication session. For example, as shown in FIG. 5A-2, the user interface object 520 includes selectable option 521 that is selectable to share Movie A with "User 1" in the multi-user communication session (e.g., the first user 502). In some examples, the input corresponding to the request to share content in the multi-user communication session corresponds to a selection of the selectable option 521. For example, as shown in FIG. 5A-2, the second electronic device 101*b* detects hand 503 of the second user 504 provided an air pinch gesture, optionally while gaze 525 of the second user 504 is directed to the option 521 in the user interface object 520.

In some examples, in response to detecting the selection of the selectable option 521, the second electronic device 101*b* initiates a process to display a shared virtual object in the shared three-dimensional environment. In some examples, when displaying a shared virtual object in the shared three-dimensional environment, the first electronic device 101*a* and the second electronic device 101*b* coordinate to select a placement location for the shared virtual object within the shared three-dimensional environment (e.g., based on a spatial arrangement of the first electronic device 101*a* and the second electronic device 101*b* in a first spatial group of the first user 502 and the second user 504). In some examples, as shown in FIG. 5B, when the first electronic device 101*a* and the second electronic device 101*b* identify a placement location 532 for the shared virtual object in the first spatial group, as shown in the overhead view 510, the first electronic device 101*a* and the second electronic device 101*b* analyze/identify physical locations of the first electronic device 101*a* and the second electronic device 101*b* within a shared (e.g., synchronized) coordinate space/system of the first spatial group. For example, as indicated in the overhead view 510 in FIG. 5B, the first electronic device 101*a* is located at a first location relative to an origin 530 (e.g., a geometric center, as discussed previously above with reference to FIGS. 4A-4I) of the first spatial group and the second electronic device 101*b* is located at a second location, different from the first location, relative to the origin 530. Furthermore, the first electronic device 101*a* is located a first distance from the origin 530 and the second electronic device 101*b* is located a second distance (e.g., different from or equal to the first distance) from the origin 530. In some examples, as discussed above with reference to FIGS. 4A-4I, the location of the first electronic device 101*a* relative to the origin 530 is determined using skeletal data associated with the first user 502 (e.g., provided by the first electronic device 101*a*) and the location of the second electronic device 101*b* relative to the origin 530 is determined using skeletal data associated with the second user 504 (e.g., provided by the second electronic device 101*b*).

In some examples, as shown in FIG. 5B, when the first electronic device 101*a* and the second electronic device 101*b* identify the placement location 532 for the shared virtual object in the first spatial group, as shown in the overhead view 510, the first electronic device 101*a* and the second electronic device 101*b* analyze/identify one or more physical properties of the physical environment 500. For example, as discussed above, the physical environment 500 includes physical walls, door 508 and window 509. In some examples, the first electronic device 101*a* and the second electronic device 101*b* select a placement location for the avatar corresponding to the user of the third electronic device based on the one or more physical properties of the physical environment 400. For example, the location at which the shared virtual object is positioned in the shared three-dimensional environment is selected to not correspond to (e.g., not intersect with and/or not extend beyond) the boundaries of the walls (e.g., including the door 508 and the window 509) in the physical environment 500.

In some examples, as shown in FIG. 5B, when the first electronic device 101*a* and the second electronic device 101*b* identify the placement location 532 for the shared virtual object in the first spatial group, as shown in the overhead view 510, the first electronic device 101*a* and the second electronic device 101*b* analyze/identify orientations of the first electronic device 101*a* and the second electronic device 101*b* within the first spatial group. For example, the orientation of the first electronic device 101*a* defines a forward direction of the first electronic device 101*a* (e.g., a forward head direction of the first user 502) and the orientation of the second electronic device 101*b* defines a forward direction of the second electronic device 101*b* (e.g., a forward head direction of the second user 504). In FIG. 5B, as an example, the forward direction of the first electronic device 101*a* and the forward direction of the second electronic device 101*b* are indicated by the arrows extending from the first electronic device 101*a* and the second electronic device 101*b*, respectively, in the overhead view 510. In some examples, the first electronic device 101*a* and the second electronic device 101*b* utilize the forward directions of the electronic devices 101*a* and 101*b* to determine an average forward direction of the electronic devices 101*a* and 101*b* in the first spatial group (e.g., an average forward head direction of the users 502 and 504). For example, as indicated in the overhead view 510 in FIG. 5B, the first electronic device 101*a* and the second electronic device 101*b* determine average forward direction 531 in the first spatial group based on averaging the forward directions of the first electronic device 101*a* and the second electronic device 101*b*. In some examples, as discussed above with reference to FIGS. 4A-4I, the orientation of the first electronic device 101*a* relative to the origin 530 is determined using the skeletal data associated with the first user 502 (e.g., provided by the first electronic device 101*a*) and the orientation of the second electronic device 101*b* relative to the origin 530 is determined using the skeletal data associated with the second user 504 (e.g., provided by the second electronic device 101*b*).

In some examples, the first electronic device 101*a* and the second electronic device 101*b* select/coordinate a placement location for the shared virtual object based on any one or combination of the factors described above. In FIG. 5C, after selecting the placement location 532 for the shared virtual object, the first electronic device 101*a* and the second electronic device 101*b* display the shared virtual object at the selected placement location. For example, as shown in FIG. 5C, the shared virtual object is displayed as shared application window 540 in the shared three-dimensional environment (e.g., a media player user interface that is displaying Movie A). Additionally, in some examples, the shared application window 540 is displayed with and/or includes grabber bar 535 in the three-dimensional environment 550A. In some examples, the grabber bar 535 is selectable to initiate movement of the shared application window 540 in the three-dimensional environment 550A. In some examples, when the shared application window 540 is displayed in the three-dimensional environment 550A, the shared application window 540 is displayed at a first location (e.g., corresponding to the placement location 532 discussed above) and with a first orientation relative to the viewpoint of the first electronic device 101*a*. In some examples, the shared application window 540 has one or more characteristics of shared virtual object 310 discussed above with reference to FIG. 3.

In FIG. 5C, the first electronic device 101*a* detects a movement input directed to the shared application window 540 in the three-dimensional environment 550A. For example, as shown in FIG. 5C, the first electronic device 101*a* detects the hand 503 of the first user 502 provide an air pinch gesture while the gaze 525 of the first user 502 is directed to the grabber bar 535 in the three-dimensional environment 550A. In some examples, as shown in FIG. 5C, the movement input includes movement of the hand 503 of the first user 502 (e.g., forward and leftward in space relative to the viewpoint of the first electronic device 101*a*).

In some examples, as shown in FIG. 5D, in response to detecting the movement input directed to the shared application window 540, the first electronic device 101*a* moves the shared application window 540 in the three-dimensional environment 550A in accordance with the movement input. For example, as indicated in the overhead view 510 in FIG. 5D, the shared application window 540 is moved backward and leftward in space relative to the viewpoint of the first electronic device 101*a* (e.g., and is positioned farther than the second user 504 (e.g., behind the second user 504) relative to the viewpoint of the first electronic device 101*a* in the three-dimensional environment 550A). In some examples, as shown in FIG. 5D, when the shared application window 540 is moved in the three-dimensional environment 550A in accordance with the movement input discussed above, the shared application window 540 is displayed at a second location, different from the first location in FIG. 5C, and with a second orientation, different from the first orientation in FIG. 5C, relative to the viewpoint of the first electronic device 101*a*.

In some examples, the display of the shared application window 540 at the second location and/or with the second orientation in the three-dimensional environment 550A relative to the viewpoint of the first electronic device 101*a* is based on the skeletal data associated with the first user 502 and the skeletal data associated with the second user 504. For example, when the shared application window 540 is moved in the shared three-dimensional environment in accordance with the movement input provided by the first user 502 in the manner discussed above, the orientation of the shared application window 540 is updated to face toward an average location of the first user 502 (e.g., and the first electronic device 101*a*) and the second user 504 (e.g., and the second electronic device 101*b*) in the shared three-dimensional environment. For example, when the shared application window 540 is moved in accordance with the movement input, the shared application window 540 is rotated, such that a vector extending from the front-facing surface of the shared application window 540 (e.g., extending from a point at a center of the front-facing surface) intersects with and/or extends to the average location of the first user 502 and the second user 504 in the shared three-dimensional environment of the overhead view 510. As discussed previously above, the locations of the first user 502 and the second user 504 (e.g., according to which the average location above is determined) are determined/known based on the skeletal data associated with the first user 502 and the second user 504, respectively. Additionally, as illustrated in FIGS. 5D and 5E, the skeletal data associated with the first user 502 and the second user 504 is utilized by the first electronic device 101*a* and/or the second electronic device 101*b* to determine which portions of the shared application window 540 are occluded by a respective user relative to the unique viewpoints of the first electronic device 101*a* and the second electronic device 101*b*. For example, in FIG. 5D, based on the skeletal data associated with the second user 504, the first electronic device 101*a* determines that the user 504 is located spatially in front of and overlapping a portion (e.g., the right edge) of the shared application window 540 relative to the viewpoint of the first electronic device 101*a*, which enables the first electronic device 101*a* to render/display the portion of the shared application window 540 as being occluded by the second user 504 relative to the viewpoint of the first electronic device 101*a*.

In FIG. 5E, the second electronic device 101*b* detects movement of the viewpoint of the second electronic device 101*b* within the shared three-dimensional environment. For example, as illustrated in the overhead view 510 in FIG. 5E, the second user 504 moves within the physical environment 500, as indicated by arrow 571, causing the viewpoint of the second electronic device 101*b* to be updated in accordance with the movement of the second user 504. In some examples, as indicated in the overhead view 510, the movement of the second user 504 (e.g., and thus the second electronic device 101*b*) is in a direction of the shared application window 540 relative to the viewpoint of the first electronic device 101*a*.

In some examples, as shown in FIG. 5F, after the second user 504 moves within the physical environment 500 as discussed above, the second user 504 (e.g., and the second electronic device 101*b*) is located behind the shared application window 540 relative to the viewpoint of the first electronic device 101*a*, as indicated in the overhead view 510. In some examples, the movement of the second user 504 to behind the shared application window 540 in the three-dimensional environment 550A relative to the viewpoint of the first electronic device 101*a* may cause and/or produce a depth/spatial conflict between the second user 504 and the shared application window 540 from the viewpoint of the first electronic device 101*a*. For example, because the second user 504 has moved to behind the shared application window 540 relative to the viewpoint of the first electronic device 101*a*, at least a portion of the second user 504 is overlapped by (e.g., occluded by) the shared application window 540 in the three-dimensional environment 550A from the viewpoint of the first electronic device 101*a*.

Accordingly, to address (e.g., mitigate) and/or help prevent instances of depth conflict in the three-dimensional environment 550A from the viewpoint of the first electronic device 101*a*, the first electronic device 101*a* applies a breakthrough effect 541 to the shared application window 540 in the three-dimensional environment 550A. Particularly, as shown in FIG. 5F, the first electronic device 101*a* changes a visual appearance of the shared application window 540 such that the second user 504 remains visible and/or perceivable through the shared application window 540 relative to the viewpoint of the first electronic device 101*a* in the three-dimensional environment 550A. In some examples, as shown in FIG. 5F, applying the breakthrough effect 541 includes feathering (e.g., ceasing display of) one or more portions of the shared application window 540 that visually overlap and/or correspond to the second user 504 from the viewpoint of the first electronic device 101*a* in the three-dimensional environment 550A, such that the one or more portions of the shared application window 540 visually appear to no longer obscure/overlap the second user 504 from the viewpoint of the first electronic device 101*a* in the three-dimensional environment 550A. In some examples, as shown in FIG. 5F, applying the breakthrough effect 541 includes adjusting an opacity (e.g., decreasing the opacity) of one or more portions of the shared application window 540 that visually overlap and/or correspond to the second user 504 from the viewpoint of the first electronic device 101*a* in the three-dimensional environment 550A, such that the one or more portions of the shared application window 540 visually appear to no longer obscure/overlap the second user 504 the viewpoint of the first electronic device 101*a* in the three-dimensional environment 550A. In some examples, as shown in FIG. 5F, applying the breakthrough effect 541 includes adjusting a brightness (e.g., decreasing the brightness) of one or more portions of the shared application window 540 that visually overlap and/or correspond to the second user 504 from the viewpoint of the first electronic device 101*a* in the three-dimensional environment 550A, such that the one or more portions of the shared application window 540 visually appear to no longer obscure/overlap the second user 504 from the viewpoint of the first electronic device 101*a* in the three-dimensional environment 550A.

In some examples, the first electronic device 101*a* applies the breakthrough effect 541 to the shared application window 540 using the skeletal data associated with the second user 504. For example, as previously discussed herein, the skeletal data associated with the second user 504 includes information corresponding to a location of the second user 504 relative to the viewpoint of the first electronic device 101*a* (e.g., relative to the origin 530 in the first spatial group discussed above). Accordingly, the first electronic device 101*a* optionally determines that the second user 504 is at least partially being overlapped by and/or obscured by the shared application window 540 relative to the viewpoint of the first electronic device 101*a* in accordance with the determination that the location of the second user 504, known from the skeletal data associated with the second user 504 that is provided by the second electronic device 101*b*, at least partially corresponds to (e.g., intersects, overlaps, etc.) the location of the shared application window 540 relative to the viewpoint of the first electronic device 101*a* in the three-dimensional environment 550A.

In addition to using the skeletal data associated with the second user 504 to determine that a depth conflict has occurred as discussed above (e.g., based on the location of the second user 504 relative to the viewpoint of the first electronic device 101*a*), the first electronic device 101*a* utilizes the skeletal data associated with the second user 504 to determine an amount of the shared application window 540 to apply the breakthrough effect 541 to. For example, as previously described herein, the skeletal data associated with the second user 504 includes information corresponding to a size of the second user 504 (e.g., a height and/or weight), as well as volumetric data associated with portions of the body of the second user 504, such as a size (e.g., volume or thickness) of the limbs, torso, and/or head of the second user 504. In some examples, the skeletal data associated with the second user 504 thus enables the first electronic device 101*a* to apply the breakthrough effect 541 to one or more portions of the shared application window 540 based on the size and/or volumetric data associated with the portions of the body of the second user 504 (e.g., such that the amount of the shared application window 540 that has the breakthrough effect 541 in the three-dimensional environment 550A corresponds to the size and/or volume of the body of the second user 504, as shown in FIG. 5F).

It should be understood that the above-described approaches to applying breakthrough effect 541 to the shared application window 540 are also applied in instances of direct spatial intersection between the second user 504 and the shared application window 540. For example, in the example of FIG. 5F, if the second user 504 moves within the physical environment 500 such that at least a portion of the second user 504 intersects with the shared application window 540 relative to the viewpoint of the first electronic device 101*a* in the three-dimensional environment 550A (e.g., such as when the second user 504 walks through and/or into the shared application window 540 as indicated by the arrow 571 in the overhead view 510 in FIG. 5E, the first electronic device 101*a* applies the breakthrough effect 541 discussed above to one or more portions of the shared application window 540 corresponding to the at least the portion of the second user 504 in the three-dimensional environment 550A. Additionally, the breakthrough effect 541 is optionally also provided to a private virtual object (e.g., such as private application window 330 in FIG. 3) in accordance with a determination that the second user 504 has a depth/spatial conflict with the private virtual object from the viewpoint of the first electronic device 101*a*, as similarly discussed above. Furthermore, it should be understood that, in the example of FIG. 5F, as indicated in the overhead view 510, after the second user 504 has moved within the physical environment 500, the second electronic device 101*b* optionally determines that a depth conflict exists between the shared application window 540 and the first user 502 relative to the updated viewpoint of the second electronic device 101*b* (e.g., the shared application window 540 at least partially overlaps and/or obscures the first user 502 in the three-dimensional environment presented at the second electronic device 101*b*). Accordingly, in some such examples, the second electronic device 101*b* applies a breakthrough effect (e.g., similar to the breakthrough effect 541 discussed above) to the shared application window 540 displayed at the second electronic device 101*b* to resolve the depth conflict between the shared application window 540 and the first user 502 relative to the viewpoint of the second electronic device 101*b* (e.g., using the skeletal data associated with the first user 502 in a similar manner as above).

It should be understood that, in some examples, in response to detecting the depth/spatial conflict between the second user 504 and the shared application window 540 from the viewpoint of the first electronic device 101*a*, the first electronic device 101*a* alternatively forgoes applying the breakthrough effect 541 to the shared application window 540 in the manner discussed above. Rather, in some examples, the shared application window 540 is allowed to occlude the second user 504 in the three-dimensional environment 550A from the viewpoint of the first electronic device 101*a*. In such an instance, the first electronic device 101*a* utilizes the skeletal data associated with the second user 504 to determine the portions of shared application window 540 to render/display as occluding the second user 504 after detecting the depth/spatial conflict between the second user 504 and the shared application window 540 from the viewpoint of the first electronic device 101*a*.

In some examples, skeletal data associated with one or more users participating in a multi-user communication session may be utilized to generate and display one or more virtual objects associated with the one or more users within the multi-user communication session. For example, the skeletal data associated with a respective user may be utilized to display a virtual object on, within, or otherwise associated with a portion of the respective user within the shared three-dimensional environment. As an example, in FIG. 5G, the first electronic device 101*a* (e.g., and the second electronic device 101*b*) is displaying shared game board 545 in the three-dimensional environment 550A. In some examples, the shared game board 545 corresponds to a shared virtual object that is visible to and interactive to the first user 502 and the second user 504 within the multi-user communication session. As indicated in the overhead view 510 in FIG. 5G, the first user 502 (e.g., and the first electronic device 101*a*) and the second user 504 (e.g., and the second electronic device 101*b*) are positioned on opposite sides of the shared game board 545 within the shared three-dimensional environment.

In some examples, the shared game board 545 may include and/or may be associated with one or more virtual game pieces. For example, in FIG. 5G, if the shared game board 545 corresponds to a virtual chessboard in the three-dimensional environment 550A, the shared game board 545 optionally includes and/or is associated with a plurality of virtual chess pieces. As another example, if the shared game board 545 is associated with a virtual card game in the three-dimensional environment 550A, the shared game board 545 includes and/or is associated with a plurality of virtual playing cards. As shown in FIG. 5G, the three-dimensional environment 550A optionally includes virtual object 546 that is associated with the shared game board 545. For example, the virtual object 546 corresponds to a virtual game piece (e.g., a virtual chess piece) as discussed above. In some examples, because the virtual object 546 is associated with the shared game board 545, the virtual object 546 also corresponds to a shared virtual object (e.g., such that the virtual object 546 is visible to and/or interactive to the first user 502 and the second user 504). As shown in FIG. 5G, in some examples, the virtual object 546 is displayed relative to a portion of the second user 504 from the viewpoint of the first electronic device 101*a* in the three-dimensional environment 550A. For example, as shown in FIG. 5G, the virtual object 546 is displayed at a location in the three-dimensional environment 550A corresponding to hand 505 of the second user 504, such that, from the viewpoint of the first electronic device 101*a*, the virtual object 546 appears to be located on and/or within hand 505 of the second user 504 (e.g., as if the second user 504 were holding the virtual object 546), as indicated in the overhead view 510.

In some examples, as similarly discussed herein above, the first electronic device 101*a* and the second electronic device 101*b* display the virtual object 546 relative to the hand 505 of the second user 504 using skeletal data associated with the second user 504. For example, as previously discussed above, the skeletal data associated with the second user 504 includes information corresponding to one or more joints of the upper body of the second user 504 (e.g., joints of the fingers, hands, and/or arms of the second user 504) in space. In some examples, the first electronic device 101*a* and the second electronic device 101*b* utilize the information corresponding to the one or more joints of the hand 505 to display (e.g., position) the virtual object 546 within the hand 505 of the second user 504 relative to the unique viewpoints of the first electronic device 101*a* and the second electronic device 101*b*. Additionally, in some examples, the skeletal data associated with the second user 504 enables one or more fingers of the hand 505 to remain visible relative to the unique viewpoints of the first electronic device 101*a* and the second electronic device 101*b* while the virtual object 546 is displayed on and/or within the hand 505. For example, the display of the virtual object 546 adheres to the joints of the fingers of the hand 505, which optionally indicate whether the hand 505 is in an outstretched orientation (e.g., with the fingers and palm facing up) as shown in FIG. 5G or whether the hand 505 is in a gripping orientation (e.g., with the fingers curled, as if gripping/holding a cup or a glass). It should be understood that other examples of the above manner of displaying the virtual object 546 relative to a portion of the second user 504 (e.g., the hand 505) based on the skeletal data associated with the second user 504 similarly apply for displaying a virtual object (e.g., similar to the virtual object 546) relative to a portion of the first user 502 based on the skeletal data associated with the first user 502.

Accordingly, as outlined above, providing systems and methods for changing a visual appearance of a virtual content in response to user input directed to the virtual content in a shared three-dimensional environment while in a multi-user communication session based on skeletal data associated with the user advantageously enables collocated users in the multi-user communication session to experience synchronized interaction with the virtual content and other users, thereby improving user-device interaction. Additionally, changing a visual appearance of virtual content based on skeletal data associated with a respective participant in the multi-user communication session in accordance with a determination that the respective participant is at least partially occluded by a portion of the virtual content enables the other participants to retain spatial awareness of the respective participant, as another benefit.

It is understood that the examples shown and described herein are merely exemplary and that additional and/or alternative elements may be provided within the three-dimensional environment for interacting with the illustrative content. It should be understood that the appearance, shape, form and size of each of the various user interface elements and objects shown and described herein are exemplary and that alternative appearances, shapes, forms and/or sizes may be provided. For example, the virtual objects representative of application windows (e.g., virtual objects 330, 540 and 545) may be provided in an alternative shape than a rectangular shape, such as a circular shape, triangular shape, etc. In some examples, the various selectable options (e.g., options 416*a*-416*d* and 521) described herein may be selected verbally via user verbal commands (e.g., "select option" verbal command). Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

Figure 6:
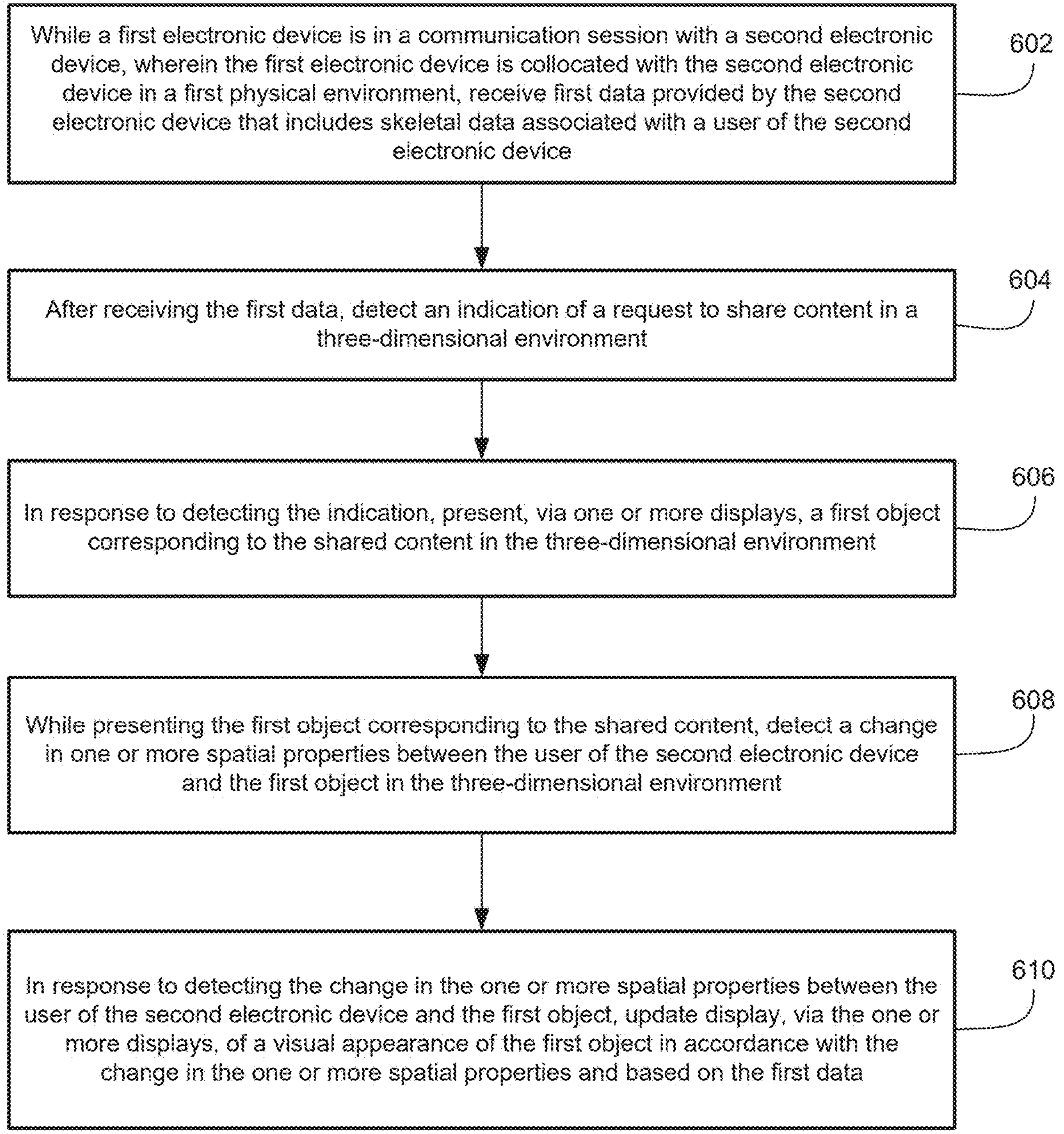
FIG. 6 is a flow diagram illustrating an example process for updating a visual appearance of a virtual object using skeletal data associated with one or more participants in a multi-user communication session according to some examples of the disclosure.

FIG. 6 is a flow diagram illustrating an example process for updating a visual appearance of a virtual object using skeletal data associated with one or more participants in a multi-user communication session according to some examples of the disclosure. In some examples, process 600 begins at a first electronic device in communication with one or more displays and one or more input devices, wherein the first electronic device is collocated with a second electronic device in a first physical environment. In some examples, the first electronic device and the second electronic device are optionally a head-mounted display, respectively, similar or corresponding to devices 260/270 of FIG. 2. As shown in FIG. 6, in some examples, at 602, while the first electronic device is in a communication session with the second electronic device, the first electronic device receives first data provided by the second electronic device that includes skeletal data associated with a user of the second electronic device. For example, as described with reference to FIGS. 4A-1 and 4A-2, the first electronic device 101*a* receives skeletal data associated with second user 504 from the second electronic device 101*b*.

In some examples, at 604, after receiving the first data, the first electronic device detects an indication of a request to share content in a three-dimensional environment. For example, as shown in FIG. 5A-2, the second electronic device 101*b* detects a selection of option 521 (e.g., provided by hand 503 of the second user 504) corresponding to a request to share content (e.g., Movie A) with the first user 502 at the first electronic device 101*a*. In some examples, at 606, in response to detecting the indication, the first electronic device presents, via the one or more displays, a first object corresponding to the shared content in the three-dimensional environment. For example, as shown in FIG. 5C, the first electronic device 101*a* displays shared application window 540 in three-dimensional environment 550A.

In some examples, at 608, while presenting the first object corresponding to the shared content, the first electronic device detects a change in one or more spatial properties between the user of the second electronic device and the first object in the three-dimensional environment. For example, as indicated in overhead view 510 in FIG. 5E, the first electronic device 101*a* detects movement of the second user 504, indicated by arrow 571, relative to the shared application window 540. In some examples, at 610, in response to detecting the change in the one or more spatial properties between the user of the second electronic device and the first object, the first electronic device updates display, via the one or more displays, of a visual appearance of the first object in accordance with the change in the one or more spatial properties and based on the first data. For example, as shown in FIG. 5F, the movement of the second user 504 causes at least a portion of the shared application window 540 to overlap the second user 504 relative to the viewpoint of the first electronic device 101*a*, which causes the first electronic device 101*a* to apply breakthrough effect 541 to the at least the portion of the shared application window 540 in the three-dimensional environment 550A.

It is understood that process 600 is an example and that more, fewer, or different operations can be performed in the same or in a different order. Additionally, the operations in process 600 described above are, optionally, implemented by running one or more functional modules in an information processing apparatus such as general-purpose processors (e.g., as described with respect to FIG. 2) or application specific chips, and/or by other components of FIG. 2.

Figure 7:
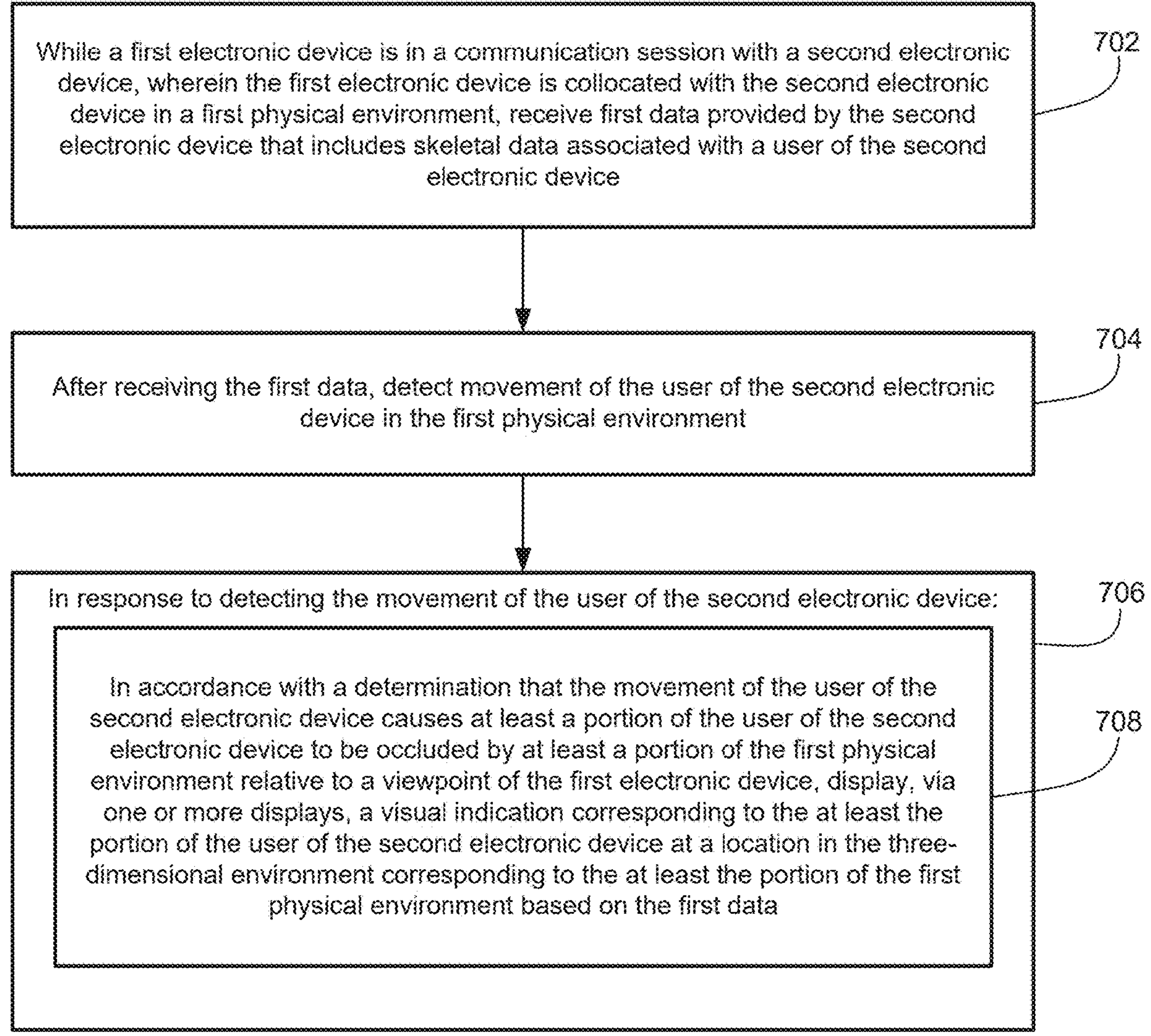
FIG. 7 is a flow diagram illustrating an example process for presenting a visual indication of a participant in a multi-user communication session based on skeletal data associated with the participant according to some examples of the disclosure.

FIG. 7 is a flow diagram illustrating an example process for presenting a visual indication of a participant in a multi-user communication session based on skeletal data associated with the participant according to some examples of the disclosure. In some examples, process 700 begins at a first electronic device in communication with one or more displays and one or more input devices, wherein the first electronic device is collocated with a second electronic device in a first physical environment. In some examples, the first electronic device and the second electronic device are optionally a head-mounted display, respectively, similar or corresponding to devices 260/270 of FIG. 2. As shown in FIG. 7, in some examples, at 702, while the first electronic device is in a communication session with the second electronic device, the first electronic device receives first data provided by the second electronic device that includes skeletal data associated with a user of the second electronic device. For example, as described with reference to FIGS. 4A-1 and 4A-2, the first electronic device 101*a* receives skeletal data associated with second user 504 from the second electronic device 101*b*.

In some examples, at 704, after receiving the first data, the first electronic device detects movement of the user of the second electronic device in the first physical environment. For example, as indicated in overhead view 410 in FIG. 4F, the first electronic device 101*a* detects movement of third user 406 in physical environment 400, as indicated by arrow 472. In some examples, at 706, in response to detecting the movement of the user of the second electronic device, in accordance with a determination that the movement of the user of the second electronic device causes at least a portion of the user of the second electronic device to be occluded by at least a portion of the first physical environment relative to a viewpoint of the first electronic device, the first electronic device displays, via the one or more displays, a visual indication corresponding to the at least the portion of the user of the second electronic device at a location in the three-dimensional environment corresponding to the at least the portion of the first physical environment based on the first data. For example, as shown in FIG. 4G-1, the movement of the third user 406 causes the third user 406 to be at least partially occluded by wall 407 in the physical environment 400 relative to the viewpoint of the first electronic device 101*a*, which causes the first electronic device 101*a* to display avatar 426 corresponding to the third user as shown in FIG. 4H or user interface object 418 as shown in FIG. 4I indicating the location of the third user 406 relative to the viewpoint of the first electronic device 101*a* in three-dimensional environment 450A.

It is understood that process 700 is an example and that more, fewer, or different operations can be performed in the same or in a different order. Additionally, the operations in process 700 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method comprising at a first electronic device in communication with one or more displays and one or more input devices, wherein the first electronic device is collocated with a second electronic device in a first physical environment: while the first electronic device is in a communication session with the second electronic device, receiving first data provided by the second electronic device that includes skeletal data associated with a user of the second electronic device; after receiving the first data, detecting an indication of a request to share content in a three-dimensional environment; in response to detecting the indication, presenting, via the one or more displays, a first object corresponding to the shared content in the three-dimensional environment; while presenting the first object corresponding to the shared content, detecting a change in one or more spatial properties between the user of the second electronic device and the first object in the three-dimensional environment; and in response to detecting the change in the one or more spatial properties between the user of the second electronic device and the first object, updating display, via the one or more displays, of a visual appearance of the first object in accordance with the change in the one or more spatial properties and based on the first data.

Additionally or alternatively, in some examples, the method further comprises, while the first electronic device is in the communication session with the second electronic device, forgoing presenting an avatar corresponding to the user of the second electronic device in the three-dimensional environment based on the skeletal data associated with the user of the second electronic device. Additionally or alternatively, in some examples, the method further comprises: while the first electronic device is in the communication session with the second electronic device, detecting an indication to add a third electronic device, different from the first electronic device and the second electronic device, to the communication session, wherein the third electronic device is non-collocated with the first electronic device and the second electronic device in the first physical environment; and in response to detecting the indication, entering a communication session with the second electronic device and the third electronic device, and presenting, via the one or more displays, an avatar corresponding to a user of the third electronic device in the three-dimensional environment, wherein the avatar is presented based on skeletal data associated with the user of the third electronic device that is provided by the third electronic device. Additionally or alternatively, in some examples, the first electronic device being collocated with the second electronic device in the physical environment is in accordance with a determination that the second electronic device is within a threshold distance of the first electronic device in the physical environment. Additionally or alternatively, in some examples, the second electronic device being collocated with the first electronic device in the physical environment is in accordance with a determination that the second electronic device is located in a field of view of the first electronic device.

Additionally or alternatively, in some examples, the second electronic device being collocated with the first electronic device in the physical environment is in accordance with a determination that the second electronic device is located in a same physical room as the first electronic device. Additionally or alternatively, in some examples, the skeletal data associated with the user of the second electronic device indicates a pose of a plurality of body parts of the user of the second electronic device. Additionally or alternatively, in some examples, the first data provided by the second electronic device includes object data corresponding to one or more physical objects associated with the user of the second electronic device. Additionally or alternatively, in some examples, the first data provided by the second electronic device includes information corresponding to at least one of a location of the second user and an orientation of the second user in the three-dimensional environment. Additionally or alternatively, in some examples, the first data provided by the second electronic device includes information indicating a size of a plurality of body parts of the user of the second electronic device. Additionally or alternatively, in some examples, presenting the first object corresponding to the shared content in the three-dimensional environment comprises presenting the first object at a first location in the three-dimensional environment that is selected based on a viewpoint of the first electronic device and the first data. Additionally or alternatively, in some examples, the method further comprises, while the first electronic device is in a communication session with the second electronic device, transmitting second data to the second electronic device that includes skeletal data associated with a user of the first electronic device.

Additionally or alternatively, in some examples, detecting the change in the one or more spatial properties between the user of the second electronic device and the first object in the three-dimensional environment includes detecting a change in at least one of a location and an orientation of the first object relative to the user of the second electronic device in the three-dimensional environment determined based on the skeletal data associated with the user of the second electronic device. Additionally or alternatively, in some examples, detecting the change in the one or more spatial properties between the user of the second electronic device and the first object in the three-dimensional environment includes detecting a request to move the first object in the three-dimensional environment, and updating display of the visual appearance of the first object in accordance with the change in the one or more spatial properties and based on the first data includes moving the first object in the three-dimensional environment relative to a viewpoint of the first electronic device. Additionally or alternatively, in some examples, updating display of the visual appearance of the first object in accordance with the change in the one or more spatial properties and based on the first data further includes updating an orientation of the first object relative to the viewpoint of the first user, such that the first object is oriented to face toward an average of locations of the viewpoint of the first user and the second electronic device in the three-dimensional environment. Additionally or alternatively, in some examples, detecting the change in the one or more spatial properties between the user of the second electronic device and the first object in the three-dimensional environment includes detecting movement of the second user that causes at least a portion of the second user to overlap with at least a portion of the first object from a viewpoint of the first electronic device, and updating display of the visual appearance of the first object in accordance with the change in the one or more spatial properties and based on the first data includes adjusting at least one of a brightness and an opacity of the at least the portion of the first object, such that the at least the portion of the second user remains visible in the three-dimensional environment from the viewpoint of the first electronic device. Additionally or alternatively, in some examples, the three-dimensional environment further includes a respective user, different from the user of the second electronic device, who is visible from a viewpoint of the first electronic device, and wherein the respective user is not participating in the communication session. In some examples, the method further comprises: while the first electronic device is in the communication session with the second electronic device, receiving, via the one or more input devices, a selection input; and in response to receiving the selection input, in accordance with a determination that the selection input is directed toward the user of the second electronic device in the three-dimensional environment, displaying, via the one or more displays, a communication session user interface in the three-dimensional environment, and in accordance with a determination that the selection input is directed toward the respective user in the three-dimensional environment, forgoing displaying the communication session user interface in the three-dimensional environment.

Additionally or alternatively, in some examples, the determination that the selection input is directed toward the user of the second electronic device is in accordance with a determination that a gaze of a user of the first electronic device is directed toward the user of the second electronic device when the selection input is detected, the determination that the selection input is directed toward the respective user is in accordance with a determination that the gaze of the user of the first electronic device is directed toward the respective user when the selection input is detected, and a location of the gaze of the user of the first electronic device in the three-dimensional environment is determined based on skeletal data associated with the user of the first electronic device. Additionally or alternatively, in some examples, the determination that the gaze of the user of the first electronic device is directed toward the user of the second electronic device when the selection input is detected is in accordance with a determination that the location of the gaze of the user of the first electronic device corresponds to a location of the user of the second electronic device, and the location of the user of the second electronic device is determined based on the skeletal data associated with the user of the second electronic device. Additionally or alternatively, in some examples, the method further comprises: while the first electronic device is in the communication session with the second electronic device, detecting an indication that the second electronic device is leaving the communication session; and in response to detecting the indication, displaying, via the one or more displays, a visual indication that the second electronic device is leaving the communication session in the three-dimensional environment, wherein the visual indication is displayed at a location in the three-dimensional environment based on the skeletal data associated with the user of the second electronic device.

Additionally or alternatively, in some examples, the method further comprises: while the first electronic device is in the communication session with the second electronic device, detecting movement of the user of the second electronic device in the first physical environment; and in response to detecting the movement of the user of the second electronic device, in accordance with a determination that the movement of the user of the second electronic device causes at least a portion of the user of the second electronic device to be occluded by at least a portion of the first physical environment relative to a viewpoint of the first electronic device, displaying, via the one or more displays, a visual indication corresponding to the at least the portion of the user of the second electronic device at a location in the three-dimensional environment corresponding to the at least the portion of the first physical environment based on the skeletal data associated with the user of the second electronic device. Additionally or alternatively, in some examples, the method further comprises: while the first electronic device is in the communication session with the second electronic device, detecting an indication of a request to add a third electronic device, different from the second electronic device, to the communication session; and in response to detecting the indication, adding the third electronic device to the communication session, including displaying, via the one or more displays, a visual indication that the third electronic device has joined the communication session in the three-dimensional environment, wherein the visual indication is displayed at a location in the three-dimensional environment that is based on skeletal data associated with a user of the third electronic device provided by the third electronic device.

Some examples of the disclosure are directed to a method comprising at a first electronic device in communication with one or more displays and one or more input devices, wherein the first electronic device is collocated with a second electronic device in a first physical environment: while the first electronic device is in a communication session with the second electronic device, receiving first data provided by the second electronic device that includes skeletal data associated with a user of the second electronic device; after receiving the first data, detecting movement of the user of the second electronic device in the first physical environment; and in response to detecting the movement of the user of the second electronic device, in accordance with a determination that the movement of the user of the second electronic device causes at least a portion of the user of the second electronic device to be occluded by at least a portion of the first physical environment relative to a viewpoint of the first electronic device, displaying, via the one or more displays, a visual indication corresponding to the at least the portion of the user of the second electronic device at a location in a three-dimensional environment corresponding to the at least the portion of the first physical environment based on the first data.

Additionally or alternatively, in some examples, the method further comprises, while the first electronic device is in the communication session with the second electronic device, forgoing presenting an avatar corresponding to the user of the second electronic device in the three-dimensional environment based on the skeletal data associated with the user of the second electronic device. Additionally or alternatively, in some examples, the method further comprises: while the first electronic device is in the communication session with the second electronic device, detecting an indication to add a third electronic device, different from the first electronic device and the second electronic device, to the communication session, wherein the third electronic device is non-collocated with the first electronic device and the second electronic device in the first physical environment; and in response to detecting the indication, entering a communication session with the second electronic device and the third electronic device, and presenting, via the one or more displays, an avatar corresponding to a user of the third electronic device in the three-dimensional environment, wherein the avatar is presented based on skeletal data associated with the user of the third electronic device that is provided by the third electronic device. Additionally or alternatively, in some examples, the first electronic device being collocated with the second electronic device in the physical environment is in accordance with a determination that the second electronic device is within a threshold distance of the first electronic device in the physical environment. Additionally or alternatively, in some examples, the second electronic device being collocated with the first electronic device in the physical environment is in accordance with a determination that the second electronic device is located in a field of view of the first electronic device. Additionally or alternatively, in some examples, the second electronic device being collocated with the first electronic device in the physical environment is in accordance with a determination that the second electronic device is located in a same physical room as the first electronic device. Additionally or alternatively, in some examples, the skeletal data associated with the user of the second electronic device indicates a pose of a plurality of body parts of the user of the second electronic device. Additionally or alternatively, in some examples, the first data provided by the second electronic device includes object data corresponding to one or more physical objects associated with the user of the second electronic device.

Additionally or alternatively, in some examples, the first data provided by the second electronic device includes information corresponding to at least one of a location of the second user and an orientation of the second user in the three-dimensional environment. Additionally or alternatively, in some examples, the first data provided by the second electronic device includes information indicating a size of a plurality of body parts of the user of the second electronic device. Additionally or alternatively, in some examples, the visual indication corresponding to the at least the portion of the user of the second electronic device includes a visual representation corresponding to the at least the portion of the user of the second electronic device. Additionally or alternatively, in some examples, the visual indication corresponding to the at least the portion of the user of the second electronic device includes a user interface object that indicates presence of the user of the second electronic device at the location in the three-dimensional environment. Additionally or alternatively, in some examples, the at least the portion of the first physical environment includes one or more physical objects in the first physical environment. Additionally or alternatively, in some examples, the at least the portion of the first physical environment includes a first partition in the first physical environment. Additionally or alternatively, in some examples, the at least the portion of the user of the second electronic device includes one or more hands of the user of the second electronic device. Additionally or alternatively, in some examples, the at least the portion of the user of the second electronic device includes a face of the user of the second electronic device.

Additionally or alternatively, in some examples, the method further comprises: while displaying the visual indication corresponding to the at least the portion of the user of the second electronic device at the location in the three-dimensional environment corresponding to the at least the portion of the first physical environment after detecting the movement of the user of the second electronic device, detecting, via the one or more input devices, movement of the viewpoint of the first electronic device in the three-dimensional environment; and in response to detecting the movement of the viewpoint of the first electronic device, in accordance with a determination that the movement of the viewpoint of the first electronic device causes the at least the portion of the user of the second electronic device to no longer be occluded by the at least the portion of the first physical environment relative to the viewpoint of the first electronic device, ceasing display of the visual indication corresponding to the at least the portion of the user of the second electronic device in the three-dimensional environment. Additionally or alternatively, in some examples, the method further comprises: while displaying the visual indication corresponding to the at least the portion of the user of the second electronic device at the location in the three-dimensional environment corresponding to the at least the portion of the first physical environment after detecting the movement of the user of the second electronic device, detecting, via the one or more input devices, second movement of the user of the second electronic device in the first physical environment; and in response to detecting the second movement of the user of the second electronic device, in accordance with a determination that the second movement of the user of the second electronic device causes the at least the portion of the user of the second electronic device to no longer be occluded by the at least the portion of the first physical environment relative to the viewpoint of the first electronic device, ceasing display of the visual indication corresponding to the at least the portion of the user of the second electronic device in the three-dimensional environment. Additionally or alternatively, in some examples, the method further comprises, in response to detecting the second movement of the user of the second electronic device, in accordance with a determination that the second movement of the user of the second electronic device causes at least a second portion, different from the at least the portion, of the user of the second electronic device to be occluded by the at least the portion of the first physical environment relative to the viewpoint of the first electronic device, displaying, via the one or more displays, a second visual indication corresponding to the at least the second portion of the user of the second electronic device in the three-dimensional environment at the location in the three-dimensional environment corresponding to the at least the portion of the first physical environment based on the first data.

Some examples of the disclosure are directed to a first electronic device comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of a first electronic device, cause the first electronic device to perform any of the above methods.

Some examples of the disclosure are directed to a first electronic device, comprising one or more processors, memory, and means for performing any of the above methods.

Some examples of the disclosure are directed to an information processing apparatus for use in a first electronic device, the information processing apparatus comprising means for performing any of the above methods.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the disclosure and its practical applications, to thereby enable others skilled in the art to best use the disclosure and various described examples with various modifications as are suited to the particular use contemplated.

What is claimed is:

1. A method comprising:

at a first electronic device in communication with one or more displays and one or more input devices, wherein the first electronic device is collocated with a second electronic device in a first physical environment:

while the first electronic device is in a communication session with the second electronic device, receiving first data provided by the second electronic device that includes skeletal data associated with a user of the second electronic device;

after receiving the first data, detecting an indication of a request to share content in a three-dimensional environment;

in response to detecting the indication, presenting, via the one or more displays, a first object corresponding to the shared content in the three-dimensional environment;

while presenting the first object corresponding to the shared content, detecting a change in one or more spatial properties between the user of the second electronic device and the first object in the three-dimensional environment; and in response to detecting the change in the one or more spatial properties between the user of the second electronic device and the first object, updating display, via the one or more displays, of a visual appearance of the first object in accordance with the change in the one or more spatial properties and based on the first data.

2. The method of claim 1, further comprising:

while the first electronic device is in the communication session with the second electronic device, detecting an indication to add a third electronic device, different from the first electronic device and the second electronic device, to the communication session, wherein the third electronic device is non-collocated with the first electronic device and the second electronic device in the first physical environment; and in response to detecting the indication:

entering a communication session with the second electronic device and the third electronic device; and presenting, via the one or more displays, an avatar corresponding to a user of the third electronic device in the three-dimensional environment, wherein the avatar is presented based on skeletal data associated with the user of the third electronic device that is provided by the third electronic device.

3. The method of claim 1, wherein the first electronic device being collocated with the second electronic device in the first physical environment is in accordance with a determination that:

the second electronic device is within a threshold distance of the first electronic device in the first physical environment;

the second electronic device is located in a field of view of the first electronic device; and/or the second electronic device is located in a same physical room as the first electronic device.

4. The method of claim 1, wherein the skeletal data associated with the user of the second electronic device indicates a pose of a plurality of body parts of the user of the second electronic device.

5. The method of claim 1, wherein the first data provided by the second electronic device includes:

object data corresponding to one or more physical objects associated with the user of the second electronic device;

information corresponding to at least one of a location of the user of the second electronic device and an orientation of the user of the second electronic device in the three-dimensional environment; and/or information indicating a size of a plurality of body parts of the user of the second electronic device.

6. The method of claim 1, wherein detecting the change in the one or more spatial properties between the user of the second electronic device and the first object in the three-dimensional environment includes detecting a change in at least one of a location and an orientation of the first object relative to the user of the second electronic device in the three-dimensional environment determined based on the skeletal data associated with the user of the second electronic device.

7. The method of claim 1, wherein:

detecting the change in the one or more spatial properties between the user of the second electronic device and the first object in the three-dimensional environment includes detecting a request to move the first object in the three-dimensional environment; and updating display of the visual appearance of the first object in accordance with the change in the one or more spatial properties and based on the first data includes moving the first object in the three-dimensional environment relative to a viewpoint of the first electronic device.

8. The method of claim 1, wherein:

detecting the change in the one or more spatial properties between the user of the second electronic device and the first object in the three-dimensional environment includes detecting movement of the user of the second electronic device that causes at least a portion of the user of the second electronic device to overlap with at least a portion of the first object from a viewpoint of the first electronic device; and updating display of the visual appearance of the first object in accordance with the change in the one or more spatial properties and based on the first data includes adjusting at least one of a brightness and an opacity of the at least the portion of the first object, such that the at least the portion of the user of the second electronic device remains visible in the three-dimensional environment from the viewpoint of the first electronic device.

9. A first electronic device comprising:

one or more processors;

memory; and one or more programs stored in the memory and configured to be executed by the one or more processors, the one or more programs including instructions for performing a method comprising:

while the first electronic device is in a communication session with a second electronic device, wherein the first electronic device is collocated with the second electronic device in a first physical environment, receiving first data provided by the second electronic device that includes skeletal data associated with a user of the second electronic device;

after receiving the first data, detecting an indication of a request to share content in a three-dimensional environment;

in response to detecting the indication, presenting, via one or more displays, a first object corresponding to the shared content in the three-dimensional environment;

while presenting the first object corresponding to the shared content, detecting a change in one or more spatial properties between the user of the second electronic device and the first object in the three-dimensional environment; and in response to detecting the change in the one or more spatial properties between the user of the second electronic device and the first object, updating display, via the one or more displays, of a visual appearance of the first object in accordance with the change in the one or more spatial properties and based on the first data.

10. The first electronic device of claim 9, wherein the method further comprises:

while the first electronic device is in the communication session with the second electronic device, detecting an indication to add a third electronic device, different from the first electronic device and the second electronic device, to the communication session, wherein the third electronic device is non-collocated with the first electronic device and the second electronic device in the first physical environment; and in response to detecting the indication:

entering a communication session with the second electronic device and the third electronic device; and presenting, via the one or more displays, an avatar corresponding to a user of the third electronic device in the three-dimensional environment, wherein the avatar is presented based on skeletal data associated with the user of the third electronic device that is provided by the third electronic device.

11. The first electronic device of claim 9, wherein the first electronic device being collocated with the second electronic device in the first physical environment is in accordance with a determination that:

the second electronic device is within a threshold distance of the first electronic device in the first physical environment;

the second electronic device is located in a field of view of the first electronic device; and/or the second electronic device is located in a same physical room as the first electronic device.

12. The first electronic device of claim 9, wherein the skeletal data associated with the user of the second electronic device indicates a pose of a plurality of body parts of the user of the second electronic device.

13. The first electronic device of claim 9, wherein the first data provided by the second electronic device includes:

object data corresponding to one or more physical objects associated with the user of the second electronic device;

information corresponding to at least one of a location of the user of the second electronic device and an orientation of the user of the second electronic device in the three-dimensional environment; and/or information indicating a size of a plurality of body parts of the user of the second electronic device.

14. The first electronic device of claim 9, wherein detecting the change in the one or more spatial properties between the user of the second electronic device and the first object in the three-dimensional environment includes detecting a change in at least one of a location and an orientation of the first object relative to the user of the second electronic device in the three-dimensional environment determined based on the skeletal data associated with the user of the second electronic device.

15. The first electronic device of claim 9, wherein:

detecting the change in the one or more spatial properties between the user of the second electronic device and the first object in the three-dimensional environment includes detecting a request to move the first object in the three-dimensional environment; and updating display of the visual appearance of the first object in accordance with the change in the one or more spatial properties and based on the first data includes moving the first object in the three-dimensional environment relative to a viewpoint of the first electronic device.

16. The first electronic device of claim 9, wherein:

detecting the change in the one or more spatial properties between the user of the second electronic device and the first object in the three-dimensional environment includes detecting movement of the user of the second electronic device that causes at least a portion of the user of the second electronic device to overlap with at least a portion of the first object from a viewpoint of the first electronic device; and updating display of the visual appearance of the first object in accordance with the change in the one or more spatial properties and based on the first data includes adjusting at least one of a brightness and an opacity of the at least the portion of the first object, such that the at least the portion of the user of the second electronic device remains visible in the three-dimensional environment from the viewpoint of the first electronic device.

17. A non-transitory computer readable storage medium storing one or more programs, the one or more programs comprising instructions, which when executed by one or more processors of a first electronic device, cause the first electronic device to perform a method comprising:

while the first electronic device is in a communication session with a second electronic device, wherein the first electronic device is collocated with the second electronic device in a first physical environment, receiving first data provided by the second electronic device that includes skeletal data associated with a user of the second electronic device;

after receiving the first data, detecting an indication of a request to share content in a three-dimensional environment;

in response to detecting the indication, presenting, via one or more displays, a first object corresponding to the shared content in the three-dimensional environment;

while presenting the first object corresponding to the shared content, detecting a change in one or more spatial properties between the user of the second electronic device and the first object in the three-dimensional environment; and in response to detecting the change in the one or more spatial properties between the user of the second electronic device and the first object, updating display, via the one or more displays, of a visual appearance of the first object in accordance with the change in the one or more spatial properties and based on the first data.

18. The non-transitory computer readable storage medium of claim 17, wherein the method further comprises:

while the first electronic device is in the communication session with the second electronic device, detecting an indication to add a third electronic device, different from the first electronic device and the second electronic device, to the communication session, wherein the third electronic device is non-collocated with the first electronic device and the second electronic device in the first physical environment; and in response to detecting the indication:

entering a communication session with the second electronic device and the third electronic device; and presenting, via the one or more displays, an avatar corresponding to a user of the third electronic device in the three-dimensional environment, wherein the avatar is presented based on skeletal data associated with the user of the third electronic device that is provided by the third electronic device.

19. The non-transitory computer readable storage medium of claim 17, wherein the first electronic device being collocated with the second electronic device in the first physical environment is in accordance with a determination that:

the second electronic device is within a threshold distance of the first electronic device in the first physical environment;

the second electronic device is located in a field of view of the first electronic device; and/or the second electronic device is located in a same physical room as the first electronic device.

20. The non-transitory computer readable storage medium of claim 17, wherein the skeletal data associated with the user of the second electronic device indicates a pose of a plurality of body parts of the user of the second electronic device.

21. The non-transitory computer readable storage medium of claim 17, wherein the first data provided by the second electronic device includes:

object data corresponding to one or more physical objects associated with the user of the second electronic device;

information corresponding to at least one of a location of the user of the second electronic device and an orientation of the user of the second electronic device in the three-dimensional environment; and/or information indicating a size of a plurality of body parts of the user of the second electronic device.

22. The non-transitory computer readable storage medium of claim 17, wherein detecting the change in the one or more spatial properties between the user of the second electronic device and the first object in the three-dimensional environment includes detecting a change in at least one of a location and an orientation of the first object relative to the user of the second electronic device in the three-dimensional environment determined based on the skeletal data associated with the user of the second electronic device.

23. The non-transitory computer readable storage medium of claim 17, wherein:

detecting the change in the one or more spatial properties between the user of the second electronic device and the first object in the three-dimensional environment includes detecting a request to move the first object in the three-dimensional environment; and updating display of the visual appearance of the first object in accordance with the change in the one or more spatial properties and based on the first data includes moving the first object in the three-dimensional environment relative to a viewpoint of the first electronic device.

24. The non-transitory computer readable storage medium of claim 17, wherein:

detecting the change in the one or more spatial properties between the user of the second electronic device and the first object in the three-dimensional environment includes detecting movement of the user of the second electronic device that causes at least a portion of the user of the second electronic device to overlap with at least a portion of the first object from a viewpoint of the first electronic device; and updating display of the visual appearance of the first object in accordance with the change in the one or more spatial properties and based on the first data includes adjusting at least one of a brightness and an opacity of the at least the portion of the first object, such that the at least the portion of the user of the second electronic device remains visible in the three-dimensional environment from the viewpoint of the first electronic device.

* * * * *